US008787712B2

(12) United States Patent
Grondin et al.

(10) Patent No.: US 8,787,712 B2
(45) Date of Patent: Jul. 22, 2014

(54) LOW LOSS DIRECTIONAL COUPLING BETWEEN HIGHLY DISSIMILAR OPTICAL WAVEGUIDES FOR HIGH REFRACTIVE INDEX INTEGRATED PHOTONIC CIRCUITS

(75) Inventors: Etienne Grondin, Sherbrooke (CA); Guillaume Beaudin, Sherbrooke (CA); Vincent Aimez, Sherbrooke (CA); Richard Ares, Sherbrooke (CA); Paul G. Charette, Sherbrooke (CA)

(73) Assignee: Socpra Sciences et Genie S.E.C., Sherbrooke, QC (CA)

( * ) Notice: Subject to any disclaimer, the term of this patent is extended or adjusted under 35 U.S.C. 154(b) by 0 days.

(21) Appl. No.: 13/977,341

(22) PCT Filed: Dec. 29, 2011

(86) PCT No.: PCT/CA2011/050814
§ 371 (c)(1),
(2), (4) Date: Aug. 22, 2013

(87) PCT Pub. No.: WO2012/088610
PCT Pub. Date: Jul. 5, 2012

(65) Prior Publication Data
US 2013/0322813 A1    Dec. 5, 2013

Related U.S. Application Data

(60) Provisional application No. 61/428,216, filed on Dec. 29, 2010.

(51) Int. Cl.
*G02B 6/122*    (2006.01)

(52) U.S. Cl.
USPC ............ 385/30; 385/14; 385/28; 385/42; 385/50

(58) Field of Classification Search
CPC ............ G02B 6/12004; G02B 6/1223; G02B 6/1228; G02B 6/2932; G02B 6/29331; G02B 6/29332; G02B 6/305; G02B 6/43; G02B 27/56
USPC ............ 385/14, 28, 30, 42, 43, 49, 50
See application file for complete search history.

(56) References Cited

U.S. PATENT DOCUMENTS

| | | | | |
|---|---|---|---|---|
| 6,310,995 B1 * | 10/2001 | Saini et al. | ...... | 385/28 |
| 6,631,225 B2 * | 10/2003 | Lee et al. | ...... | 385/28 |
| 7,233,713 B2 | 6/2007 | Blauvelt et al. | | |
| 7,428,358 B2 * | 9/2008 | Lu et al. | ...... | 385/49 |
| 7,546,007 B2 * | 6/2009 | Little | ...... | 385/30 |
| 7,783,146 B2 | 8/2010 | Blauvelt et al. | | |

(Continued)

OTHER PUBLICATIONS

PCT/CA2011/050814 international preliminary report with the related claims 1-60, Mar. 18, 2013.

(Continued)

*Primary Examiner* — Daniel Petkovsek
(74) *Attorney, Agent, or Firm* — Anglehart et al.

(57) ABSTRACT

An optocoupler, an optical interconnect and method of manufacture providing same are provided for coupling an optical signal between a high refractive index waveguide of an integrated circuit and a waveguide external to the integrated circuit. The optocoupler includes a thinned high refractive index waveguide having a thickness configured to exhibit an effective refractive index substantially matching a refractive index of the external waveguide.

20 Claims, 50 Drawing Sheets

(56) References Cited

U.S. PATENT DOCUMENTS

| | | | |
|---|---|---|---|
| 8,031,991 B2 * | 10/2011 | Webster et al. | 385/28 |
| 8,320,721 B2 * | 11/2012 | Cevini et al. | 385/28 |
| 8,483,528 B2 * | 7/2013 | Socci et al. | 385/50 |
| 8,615,148 B2 * | 12/2013 | Chen et al. | 385/43 |
| 2004/0037497 A1 * | 2/2004 | Lee | 385/28 |
| 2004/0202429 A1 | 10/2004 | Margalit et al. | |
| 2010/0074571 A1 | 3/2010 | Gomyo | |

OTHER PUBLICATIONS

PCT/CA2011/050814 international search report, Apr. 17, 2012.
PCT/CA2011/050814 written opinion, Apr. 17, 2012.

* cited by examiner

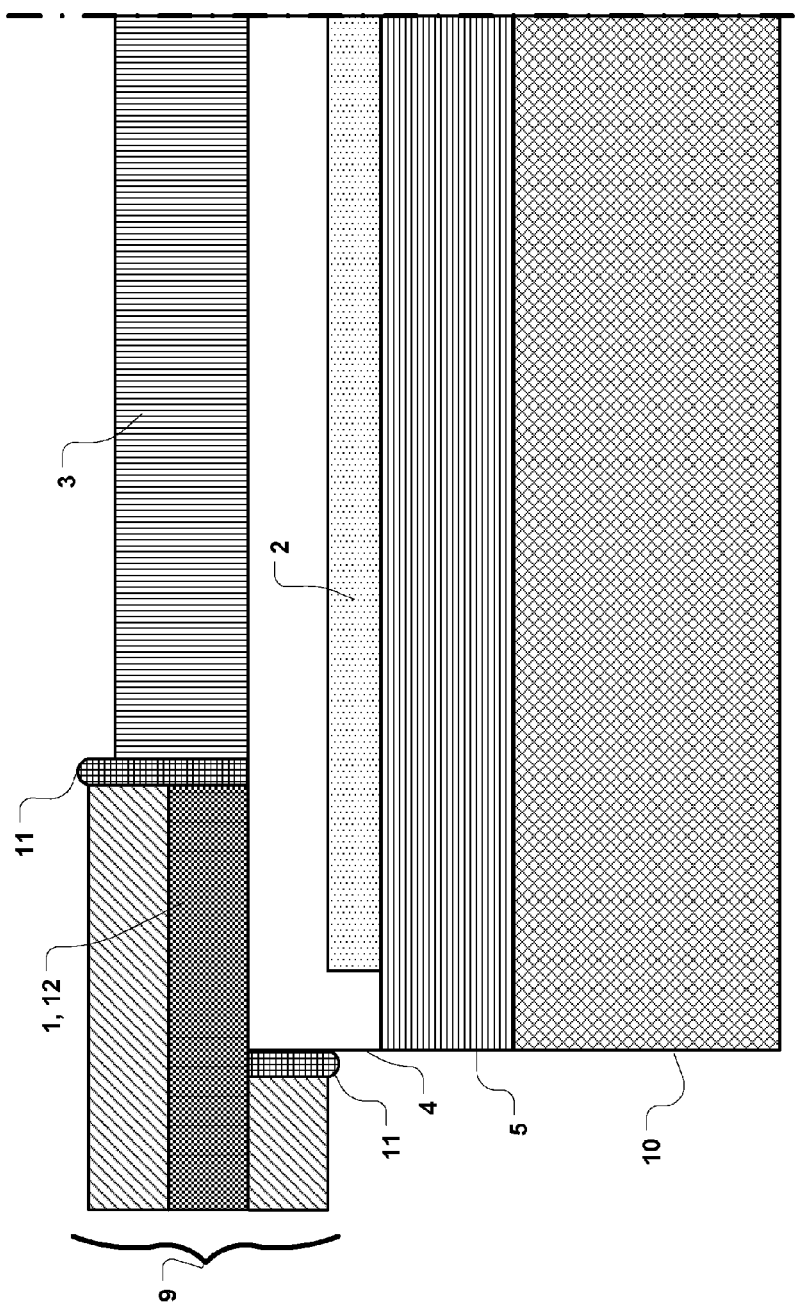

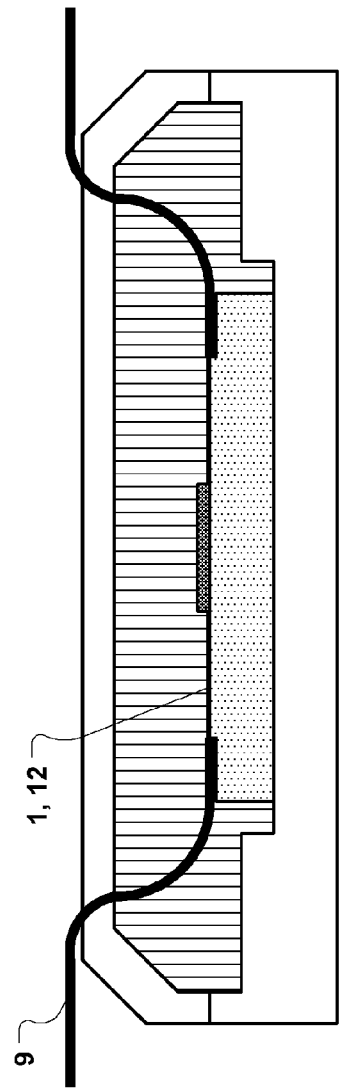
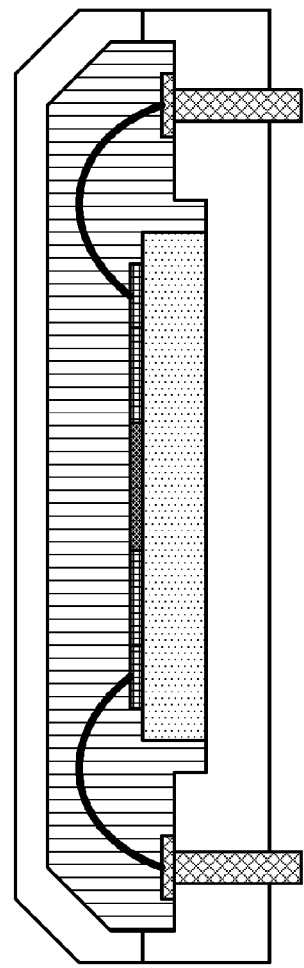
FIG. 5b
FIG. 5c

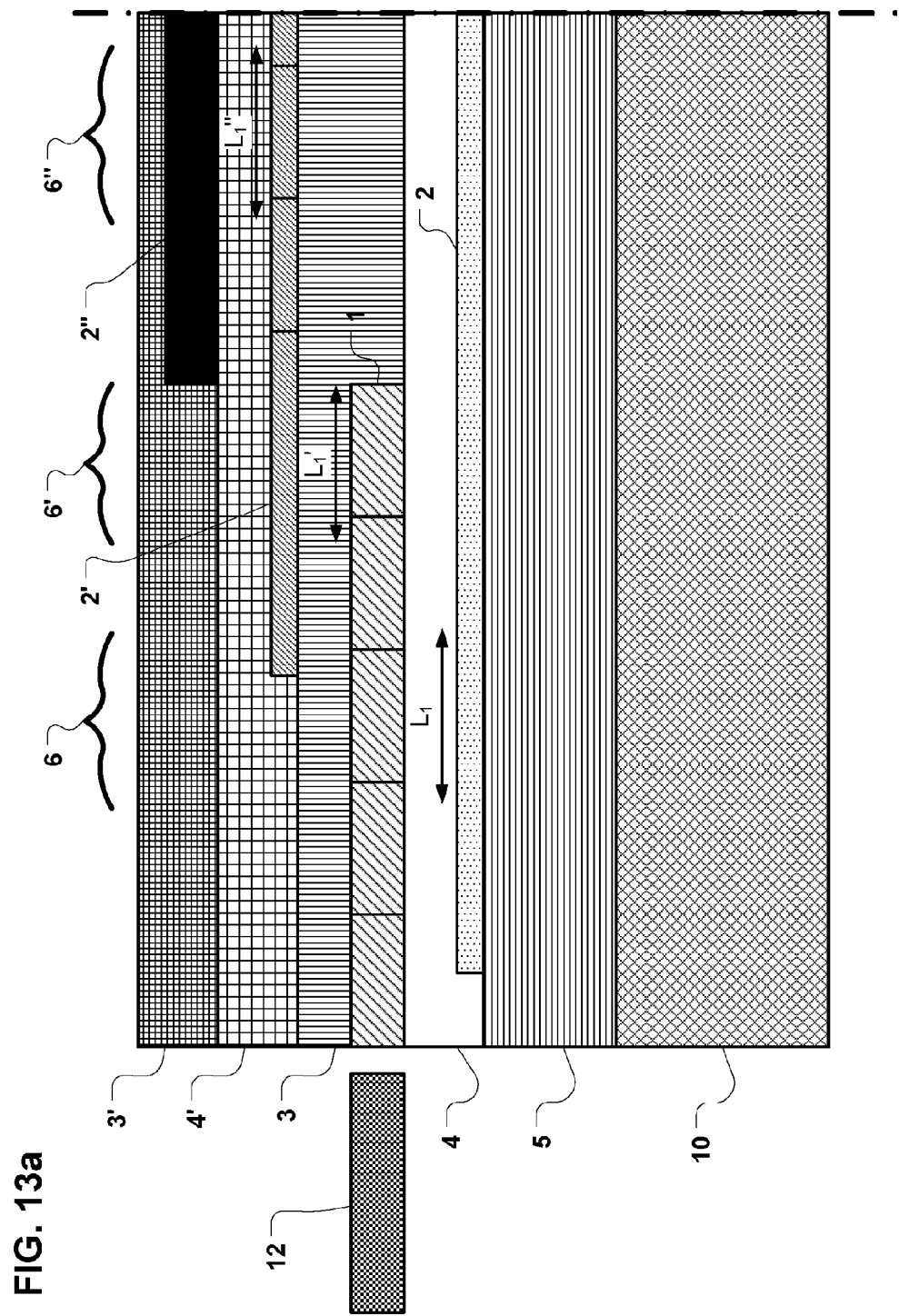

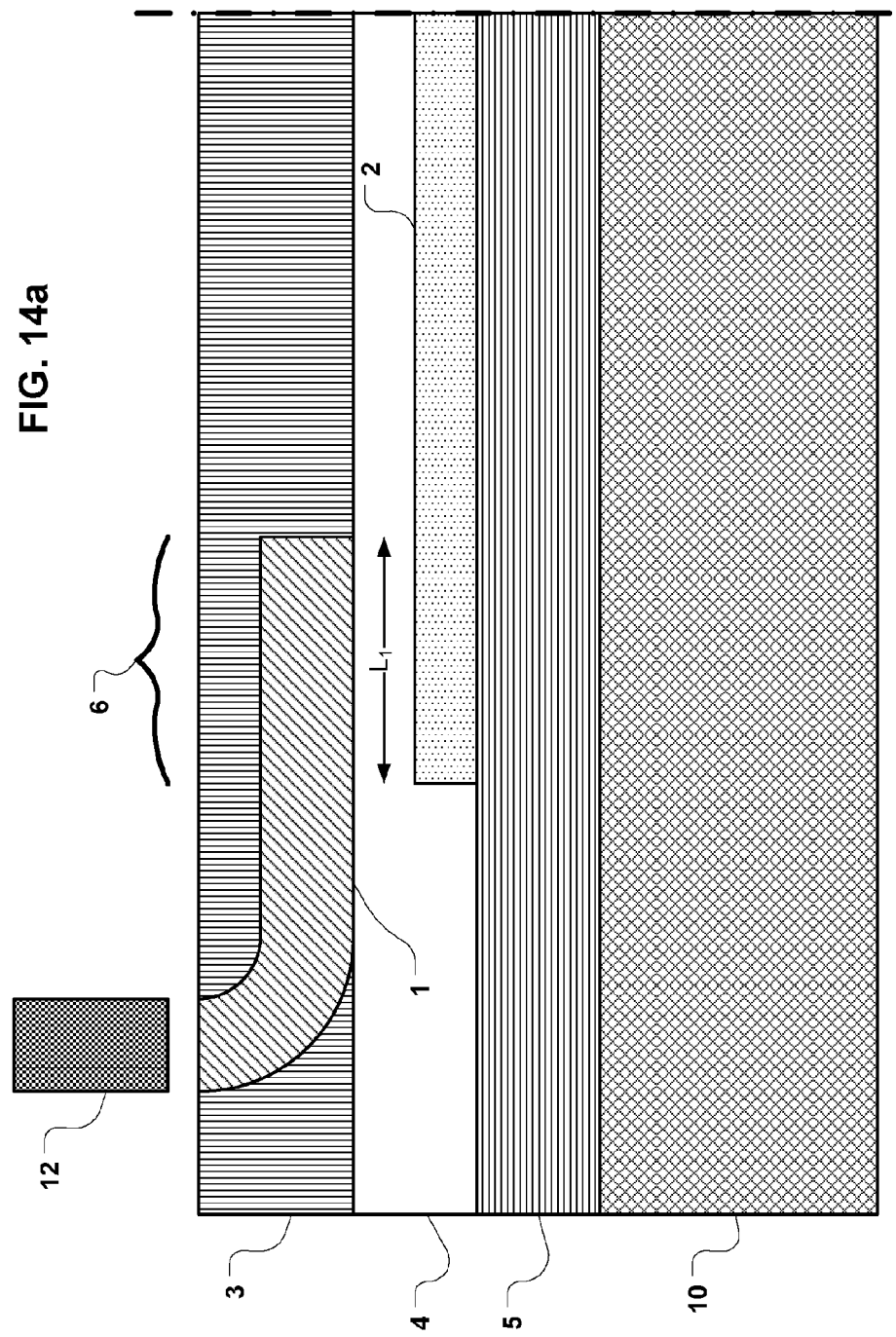

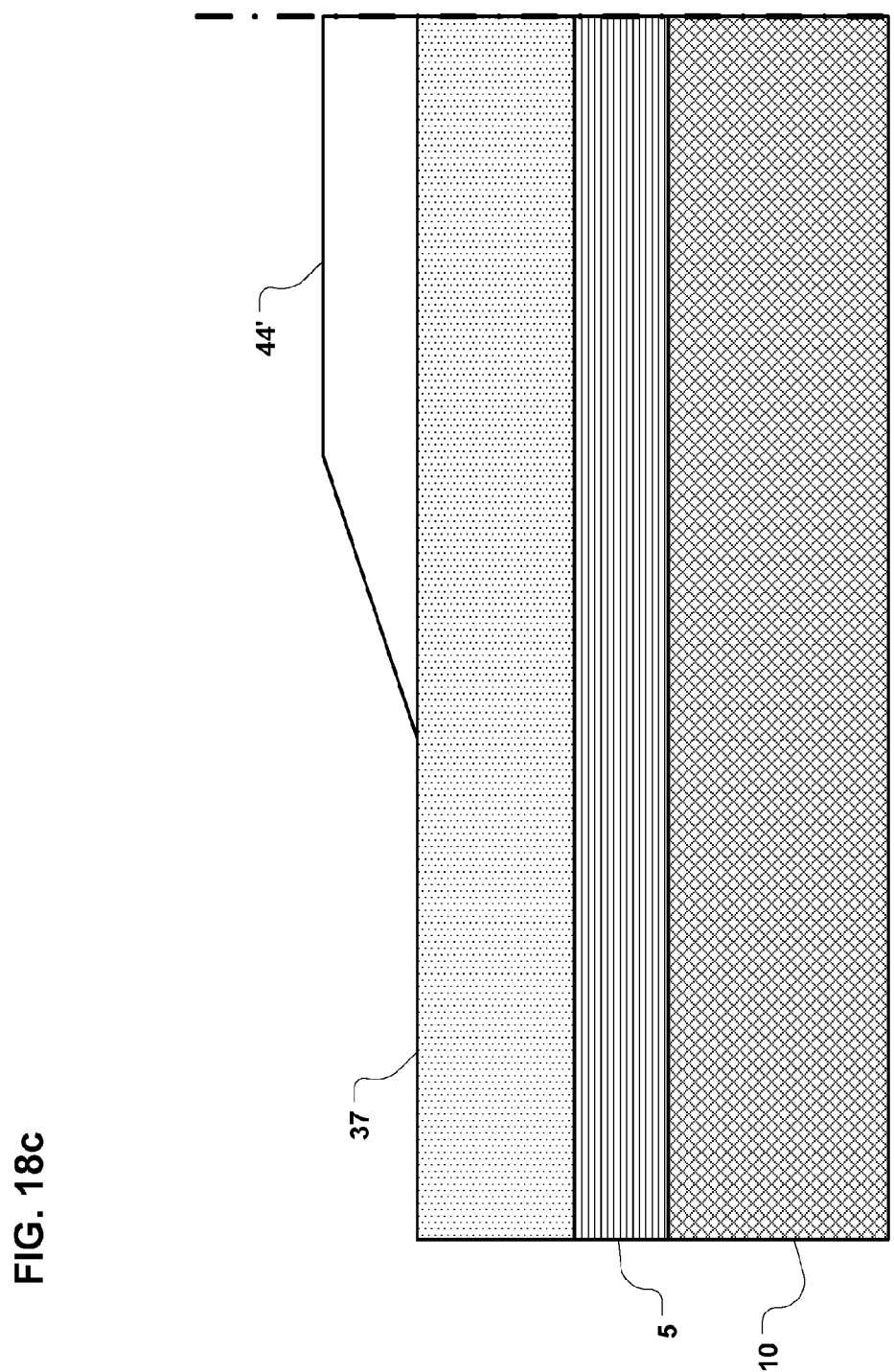

LOW LOSS DIRECTIONAL COUPLING BETWEEN HIGHLY DISSIMILAR OPTICAL WAVEGUIDES FOR HIGH REFRACTIVE INDEX INTEGRATED PHOTONIC CIRCUITS

REFERENCE TO RELATED APPLICATIONS

The present application claims priority from U.S. Provisional Patent Application Ser. No. 61/428,216 filed 29 Dec. 2010, the entirety of which is incorporated herein by reference.

TECHNICAL FIELD

The present invention relates to a method of achieving high efficiency optical signal coupling between low refractive index waveguides and high refractive index waveguides.

BACKGROUND

In the field of microelectronics there is a push to integrate photonics and microelectronics in order to improve the performance of current electronic systems. The possibility of permitting optical communication between integrated chips via an optical bus would have a major impact on the performance of electronic systems. Research in this field is very active, however proposed solutions until now have been unsuitable and are difficult to realize in practice.

Efficient coupling of highly dissimilar refractive index waveguides has always been a problem in many applications.

For example, optical fiber waveguides have been employed to convey optical signals. Optical fibers include an optical fiber core within a cladding. Optical fiber waveguide to optical fiber waveguide butt-coupling requires high precision alignment. Semiconductor waveguides typically have smaller geometries and higher refractive indices compared to optical fiber geometries and refractive indices. The geometry mismatch stems from mode confinement requirements, the higher refractive index of semiconductor waveguides demands smaller geometries. Butt-coupling between optical fibers and semiconductor waveguides require extremely high precision alignment and suffers from high coupling losses due to refractive index mismatches.

In the field of integrated opto-electronic devices, light (optical signal) coupling between "on chip" waveguides and external waveguides is conventionally done using butt-coupling between an external fiber core and the core of an on-chip waveguide or its optical interconnect device. On-chip optoelectronic devices include vertical cavity lasers, horizontal cavity lasers, photodiodes and phototransistors. On-chip optical devices include splitters and couplers.

What prevents major progress in the field is an intrinsic property of silicon, the principal semiconductor utilized in microelectronics, which has a high index of refraction (about 3.5) compared to that of optical fibers (about 1.47). The index of refraction of germanium, another important semiconductor utilized in microelectronics is about 4. This prevents efficient injection of an optical signal from one material to the other in two different ways: First, the large index of refraction difference between them causes the creation of reflections at the injection interface. Second, the required geometries of an optical fiber and of a waveguide of a high index of refraction for single mode optical signal propagation are radically different. Both of these factors reduce the ability to couple (transfer) optical signals with acceptable losses.

A similar problem exists in the field of biosensors between different materials than those employed in microelectronics however with comparable differences in refractive indices. While employing such hybrid integration technologies, an external optical signal may not be injected into a chip. However, the coupling experiences the same difficulty in injecting the signal into a layer of a high index of refraction.

On-chip waveguides typically comprise waveguides made of silicon or germanium having indices of refraction of about 3 to 4, which are much higher than the index of refraction for an optical fiber core (dielectric waveguide). For single mode fibers, core-to-core butt-coupling requires high precision alignment and superior mechanical stability, both of which add significant cost to providing such optical connections. Not only must alignment be provided, but also a good match in the waveguide properties is required to ensure that the desired modes are coupled between waveguides. In many applications, optical coupling is such a challenge that designs resort to opto-electronic conversion of signals to use electrical coupling between on-chip and off-chip optical signals.

In coupling optical signals to and from on-chip waveguides or opto-electronic devices, conventional techniques involve mounting optical fibers with precision to rest horizontally on the integrated circuit with a prism reflector being used to redirect the light vertically into a waveguide or optical device on the integrated circuit. Conventional techniques also include precision mounting of the fiber vertically on the integrated circuit. These techniques are costly to implement due to difficulties in reproducing and maintaining alignment precision.

Recently evanescent field waveguide coupling has been proposed for optical signal coupling between an optical fiber waveguide and a semiconductor waveguide.

A theoretical treatise was provided by Borges, B.-H. V. and Herczfeld, P. R., entitled "Coupling from a Single Mode Fiber to a III-V Thin-Film Waveguide via Monolithic Integration of a Polymeric Optical Waveguide", Journal of the Franklin Institute, vol. 335B, no 1, p. 89-96, 1998. Borges describes the results of theoretical modeling of evanescent field waveguide coupling between a polymer waveguide and a sheet waveguide of unlimited extent as well results of modeling evanescent field waveguide coupling between a polymer waveguide and a sheet waveguide of unlimited extent having a step discontinuity. While the mathematical modeling seems to suggest promising coupling efficiencies, the presented results cannot be employed in practice as usable waveguides have limited widths and therefore the presented results cannot be reproduced in practical implementations. Experimental trials attempting to duplicate Borges account only for a small fraction of the promised results. An effective refractive index variation is described by Borges, at the bottom of page 90 thereof, to come from exploiting "linear and quadratic electro-optic effects, as well as plasma, band filling, and band shrinkage to yield a high figure of merit for index modulation". Such coupling makes use of an important perturbation of the optical field at the entrance of the chip: The semiconductor upper cladding creates the perturbation and the optical field first partially couples into the upper cladding to finally transfer to the waveguide layer. That approach also creates a significant amount of radiative (lossy) mode coupling and higher order mode coupling which have not been addressed by Borges. Also, a number of assumptions have been demonstrated to be wrong in respect of structures having high refractive index differences. Furthermore, the lack of symmetry in the Borges approach prevents reverse optical signal (light) propagation from inside of the chip to the outside.

Further attempts at implementing evanescent field waveguide coupling describe tapered structures that slowly adapt the optical field of a first waveguide to match the optical field of a second waveguide. Such structures are difficult to fabricate due to a requirement for three-dimensional (3D) shaping during manufacture.

For example, one attempt at addressing the coupling problem provided tapered waveguides having large geometries in high refractive index materials. Numerous proponents have simulated such devices, and the simulations seem to suggest high optical signal injection efficiencies. Such attempts include: Dai, D., He, S. and Tsang, H.-K. "Bilevel Mode Converter Between a Silicon Nanowire Waveguide and a Larger Waveguide", Journal of Lightwave Technology, vol. 24, no 6, p. 2428-33, June 2006; and Doylend, J. K. and Knights, A. P. "Design and Simulation of an Integrated Fiber-to-Chip Coupler for Silicon-on-Insulator Waveguides", IEEE Journal of Selected Topics in Quantum Electronics, vol. 12, no 6, p. 1363-70, November 2006. While these simulations might suggest polarization independent solutions, only a limited number of such devices have been manufactured given the 3D nature of the devices.

Another attempt included employing a large size waveguide coupled with a reverse tapered waveguide of high refractive index described by Galan, J., Sanchis, P., Sanchez, G. and Marti, J., "Polarization Insensitive Low-Loss Coupling Technique between SOI Waveguides and High Mode Field Diameter Single-Mode Fibers", Optics Express, vol. 15, no 11, p. 7058-65, 2007. According to this attempt, such geometry permits obtaining good injection efficiency and has little polarization sensitivity. However, problems arise from the requirement for manufacturing a suspended structure which is very fragile. Furthermore, the tapered waveguide has to have extremely small dimensions. Such implementations demand use of high resolution lithography at increased costs.

A further attempt consists using prisms integrated within chips as described by Ghiron, M., Gothoskar, P. Montgomery, R. K., Patel, V., Pathak, S., Shastri, K. and Yanushefski, K. A. in U.S. Pat. No. 7,058,261 B2, entitled "Interfacing Multiple Wavelength Sources to Thin Optical Waveguides utilizing Evanescent Coupling" and published Jun. 6, 2006 and in U.S. Pat. No. 7,020,364 B2 "Permanent Light Coupling Arrangement and Method for use with Thin Silicon Optical Waveguides" published Mar. 28, 2006. Once again, the 3D character and the numerous fabrication steps required, relegate such solutions to laboratory settings rendering them unviable for practical applications.

Yet another attempt includes employing a diffractive grating engraved directly into the high refractive index material as described by: Roelkens, G., Van Campenhout, J., Brouckaert, J., Van Thourhout, D., Baets, R., Romeo, P. R., Regreny, P., Kazmierczak, A., Seassal, C., Letartre, X., Hollinger, G., Fedeli, J. M., Di Cioccio, L. and Lagahe-Blanchard, C., in "III-V/Si Photonics by Die-to-Wafer Bonding", Materials Today, vol. 10, no 7-8, p. 36-43, July-August 2007; Taillaert, D., Van Laere, F., Ayre, M., Bogaerts, W., Van Thourhout, D., Bienstman, P. and Baets, R., in "Grating Couplers for Coupling Between Optical Fibers and Nanophotonic Waveguides", Japanese Journal of Applied Physics, vol. 45, no 8A, p. 6071-6077, 2006; and Taillaert, D. and Baets, R., in U.S. Pat. No. 7,065,272 B2 entitled "Fiber-to-waveguide coupler" published Apr. 26, 2005. Initial experimental results appear to show that the signal injection efficiency is relatively good and polarization independent. Also, the injection is totally independent of the "state" of the facets. Despite these advantages, the required fabrication complexity is high, because such implementations demand high resolution lithography and high precision engraving techniques. Furthermore, alignment has to be controlled very well in order to avoid optical signal losses.

Other attempts propose coupling schemes requiring nanofabrication, which can also be difficult to incorporate into CMOS chips.

There is a need in the field for increasing optical coupling efficiencies between low refractive index (dielectric) waveguides and high refractive index semiconductor waveguides.

SUMMARY

It has been found that continuously varying the thickness and/or width of structures to provide prior art tapers for adiabatic energy transfer from a guiding structure to another requires extreme complexity. In contrast is has been discovered that employing layer thickness control during semiconductor fabrication provides beneficial manufacturing advantages.

It has been discovered that the above identified prior art shortcomings can be addressed via a two step approach wherein:

1. Coupling an optical signal propagating in an external optical fiber into an intermediary waveguide having a refractive index comparable to that of the external optical fiber, the intermediary waveguide being waferscale manufactured employing standard micrometer resolution photolithographic techniques providing a relatively simple and effective coupler.

2. Coupling the optical signal propagating in the intermediary waveguide into a nanometric high refractive index semiconductor waveguide. The proposed solution implements directional optical coupling. The coupling is preferably done from the fundamental mode of a first waveguide to the fundamental mode of a second waveguide (single mode light propagation). The first waveguide can be the lower refractive index waveguide or the higher refractive index waveguide, depending on the application. The coupling scheme described is reciprocal with respect to the waveguides, which means that an optical signal can travel efficiently in both wave propagation directions, from the intermediary waveguide to the semiconductor waveguide or from the semiconductor waveguide to the intermediary waveguide. Directional coupling arises when an output waveguide is located in the proximity of an input waveguide in which an optical signal propagates. If the evanescent field extending from the propagating mode of the input waveguide conveying the optical signal enters the core of the neighboring waveguide, such coupling usually happens through tunneling-like phenomena. When the two waveguides are similar in terms of wave vector amplitude and direction, an efficient energy transfer can take place.

Embodiments according to the proposed solution require only little in terms of fabrication complexity. Waveguide alignment is provided by photolithography of semiconductor structures having a high refractive index. Such alignment is relatively simple to produce and is enabled by a precise control of layer thicknesses for the interface between the nanometric high refractive index waveguide and the intermediary low refractive index waveguide. Such optical signal coupling into a waveguide having a nanometric thickness can be realized efficiently.

It has also been discovered that the dimensions of the waveguides can be easily tuned in many cases to allow efficient (optical signal) light coupling between very dissimilar waveguides.

It has further been discovered that the proposed solution is compatible with standard CMOS fabrication processes and therefore has wide applicability. The proposed solution permits coupling of external optical signals (e.g. from an optical fiber) (e.g. a hybrid optical source) into a photonic circuit inside a microchip, photonic circuit which is fabricated from high refractive index materials. The reverse is equally possible.

In accordance with an aspect of the invention there is provided an integrated circuit physical optical Input/Output (I/O) interface for coupling at least one mode of an optical signal between a waveguide external to the integrated circuit and a high refractive index waveguide internal to the integrated circuit, the physical optical interface comprising: an I/O waveguide conveying an external optical signal near the integrated circuit along an external signal path, said I/O waveguide having a first refractive index; and a high refractive index coupler waveguide forming part of the integrated circuit and conveying an internal optical signal along an internal signal path, said high refractive index waveguide having a second bulk refractive index substantially dissimilar from said first refractive index, said high refractive index waveguide having at least a portion with a thickness configured to exhibit an effective refractive index substantially matching said first refractive index of said I/O waveguide, said high refractive index waveguide and said I/O waveguide being arranged substantially parallel and in proximity with an overlap therebetween to permit tunnel coupling of said at least one mode of said optical signal between said internal signal path and said external signal path.

In accordance with another aspect of the invention there is provided an optical interconnect comprising at least one integrated circuit physical optical Input/Output (I/O) interface for coupling at least one mode of an optical signal between a waveguide external to the integrated circuit and a waveguide internal to the integrated circuit, the physical optical interface comprising: an I/O waveguide conveying an external optical signal near the integrated circuit along an external signal path, said I/O waveguide having a first refractive index; and a coupler waveguide forming part of the integrated circuit and conveying an internal optical signal along an internal signal path, said internal waveguide having a second bulk refractive index substantially dissimilar from said first refractive index, said semiconductor waveguide having at least a portion with a thickness configured to exhibit an effective refractive index substantially matching said first refractive index of said I/O waveguide, said internal waveguide and said I/O waveguide being arranged substantially parallel and in proximity with an overlap therebetween to permit tunnel coupling of said at least one mode of said optical signal between said internal signal path and said external signal path.

In accordance with a further aspect of the invention there is provided a process for manufacturing a low loss coupler, the process comprising patterning an oxidation mask on top of a device layer; and thinning the device layer down to a thickness comprised between 20 nm and 200 nm.

In accordance with a further aspect of the invention there is provided a process for manufacturing a low loss coupler, the process comprising fabricating a shadow mask on top of a high refractive index layer; and plasma etching resulting in vertically tapered structures.

In accordance with a further aspect of the invention there is provided a process for manufacturing a low loss coupler, the process comprising: fabricating a shadowing mask on top of a high refractive index layer, said shadowing mask having an overhang; depositing an etching mask material over said overhanging shadowing mask, said etching mask material forming a taper region under the overhang; removing said overhanging shadowing mask; and plasma etching both said high refractive index layer and etching mask vertically, said taper region causing said high refractive index layer to be etched non-uniformly forming a tapered structure therein as said tapered etching mask retreats across said tapered region.

In accordance with a further aspect of the invention there is provided a process for manufacturing a low loss coupler, the process comprising employing a shadowing mask during deposition.

In accordance with yet another aspect of the invention there is provided a optical signal coupler for coupling at least one mode of an optical signal between at least one Input/Output (I/O) waveguide conveying an external optical signal along an external signal path and a corresponding high refractive index waveguide forming part of an integrated circuit, each said high refractive index waveguide conveying an internal optical signal along an internal signal path, said coupler comprising: each of said at least one I/O waveguide having a first bulk refractive index, each said corresponding high refractive index waveguide having a second bulk refractive index substantially dissimilar from said first refractive index; at least one alignment structure for positioning said at least one I/O waveguide with respect to said corresponding high refractive index waveguide substantially in parallel, in proximity and with an overlap therebetween to permit tunnel coupling of said at least one mode of said optical signal between said external signal path and said internal signal path, said high refractive index waveguide having at least a portion with a thickness configured to exhibit an effective refractive index substantially matching said first refractive index of said I/O waveguide.

BRIEF DESCRIPTION OF THE DRAWINGS

The invention will be better understood by way of the following detailed description of embodiments of the invention with reference to the appended drawings, in which:

FIG. 3a is a schematic diagram illustrating, in accordance with the proposed solution, a side view of an embodiment of the proposed solution wherein the first waveguide is an optical fiber from which some cladding has been removed in order to allow bringing the core close enough to the high refractive index waveguide, the exposed optical core representing an intermediary waveguide;

FIG. 3b is another schematic diagram illustrating a top view of the embodiment illustrated in FIG. 3a;

FIG. 4b is another schematic diagram illustrating a top view of the embodiment illustrated in FIG. 4a;

FIG. 5b is another schematic diagram illustrating a cross-sectional view of the embodiment illustrated in FIG. 5a along the optical bus/waveguides;

FIG. 5c is yet another schematic diagram illustrating another cross-sectional view of the embodiment illustrated in FIG. 5a perpendicular to the waveguides;

FIG. 6b is another schematic diagram illustrating a top view of the embodiment of FIG. 6a;

FIG. 6c is yet another schematic diagram illustrating a cross-sectional view of the embodiment of FIG. 6a;

FIG. 10b is a schematic diagram illustrating a cross-sectional view of the directional coupler structure of FIG. 10a;

FIG. 11b is a schematic diagram illustrating a cross-sectional view of the directional coupler structure of FIG. 11a;

FIG. 13a is a schematic diagram illustrating, in accordance with a further embodiment of the proposed solution, a side view of a coupler structure having at least four waveguide layers (including a transfer waveguide);

FIG. 13b is a schematic diagram illustrating a top view of the coupler structure of FIG. 13a;

FIG. 14a is a schematic diagram illustrating, in accordance with a further embodiment of the proposed solution, a side view of a structure wherein the intermediary waveguide is curved in order to allow a butt-coupling from the top of the chip;

FIG. 15b is a schematic diagram illustrating a top view of the optical signal transport structure of FIG. 15a;

FIG. 16b is a schematic diagram illustrating a top view of the flip-chip packaged device of FIG. 16a;

FIG. 16c is a schematic diagram illustrating a cross-sectional view of the flip-chip packaged device of FIG. 16a;

FIG. 18c is a schematic diagram illustrating the outcome after chemical or physical deposition has been performed in the presence of a shadow mask, providing a tapered region having a smooth transition;

DETAILED DESCRIPTION

The proposed solution includes a single thickness adjustment of a high refractive index layer enabling the fabrication of a waveguide having the intrinsic high refractive index to exhibit an effective refractive index that matches the effective refractive index of a low core index waveguide (effective refractive index between 1.4 and 1.6). The proposed solution benefits from an easily controlled thickness at nanometer scale via a number of deposition/growing processes. The fabrication of a robust optical directional coupler can be achieved by tuning the high refractive index material thickness.

Figure 1:
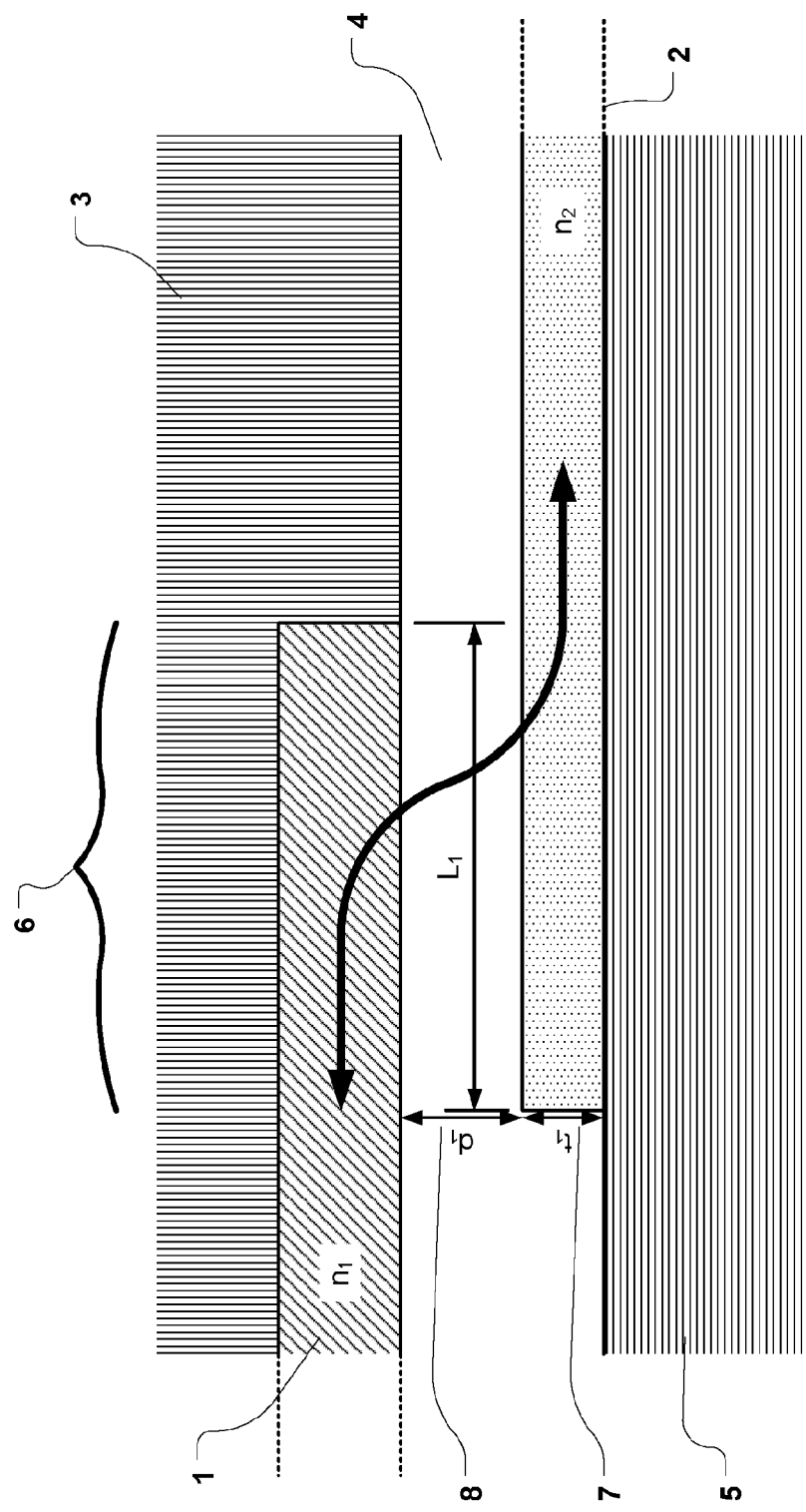
FIG. 1 is a schematic side view diagram illustrating aspects of the proposed solution.

As illustrated in FIG. 1, a first waveguide 1 is placed nearby (adjacent) and parallel to a second waveguide 2. The first waveguide is made of a low refractive index material having a refractive index n1. The second waveguide is made of a high refractive index material having a bulk refractive index n2. The first waveguide is surrounded by cladding materials, or material combinations 3, and 4 (and 5), propagates a light signal of a given wavelength with a given polarization, and has an effective index neff1 of its fundamental mode. The second waveguide 2 is surrounded by cladding materials, or material combinations 4 and 5 (and 3), propagates a light signal of the same wavelength and same polarization, and has an effective index neff2 of its fundamental mode equal or close in value to neff1. The effective refractive indexes mentioned herein are always with respect to the fundamental modes. It is understood that the above layers and waveguides are wafer-level fabricated on a substrate (10).

In accordance with the proposed solution, the high refractive index material thickness 7 (t1) of the second waveguide 2 can be optimized to allow the effective index neff2 to be equal to or close to neff1. As illustrated on FIG. 2b, the physical properties of the materials employed in fabricating the silicon second waveguide 2 are such that the effective refractive index of the silicon waveguide changes abruptly with silicon waveguide thickness 7. A similar abrupt change is experienced by waveguides including germanium and to some extent in materials characterized as III-V semiconductors which can be useful for optoelectronics.

The overlapping region 6 (L1) between the two waveguides 1 and 2 can be optimized to provide the best optical power transfer possible from one waveguide to the other. The extent of the overlap along the waveguides is known as coupling length (distance) Lc. A waveguide separation distance 8 (illustrated d1 in FIG. 1), for example implemented via a waveguide separation layer of cladding material 4, is small enough to allow directional optical coupling phenomena such as tunneling to take place. Directional coupling occurs via an extension of the evanescent field from the propagating mode of an input waveguide propagating light which enters the core of a neighboring output waveguide.

Figure 2A:
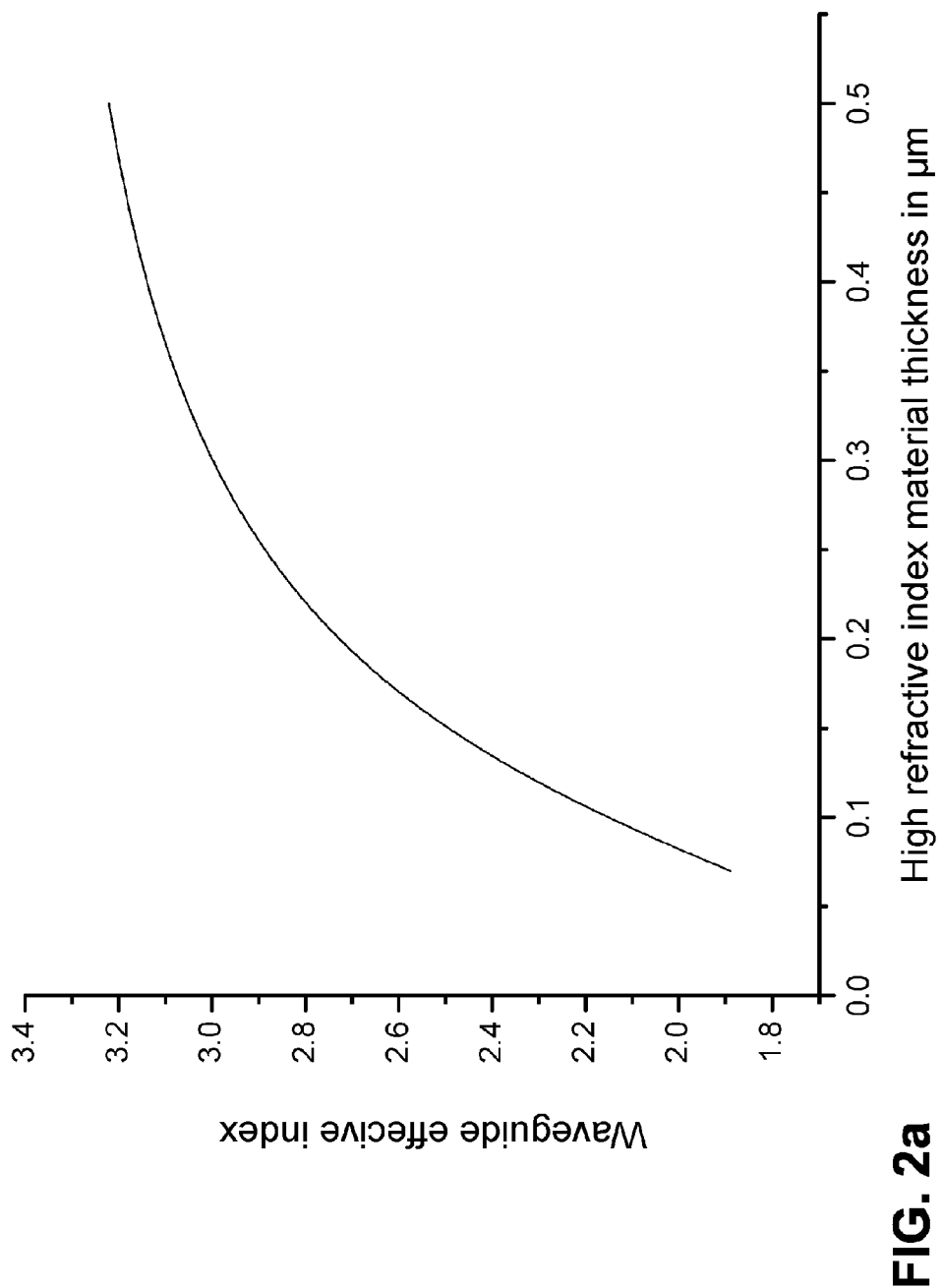
FIG. 2a is a plot illustrating, in accordance with the proposed solution, a variation of an effective refractive index of a high refractive index waveguide with waveguide layer thickness for a given waveguide width, wherein the width is assumed to be very large compared to the thickness.
Figure 2B:
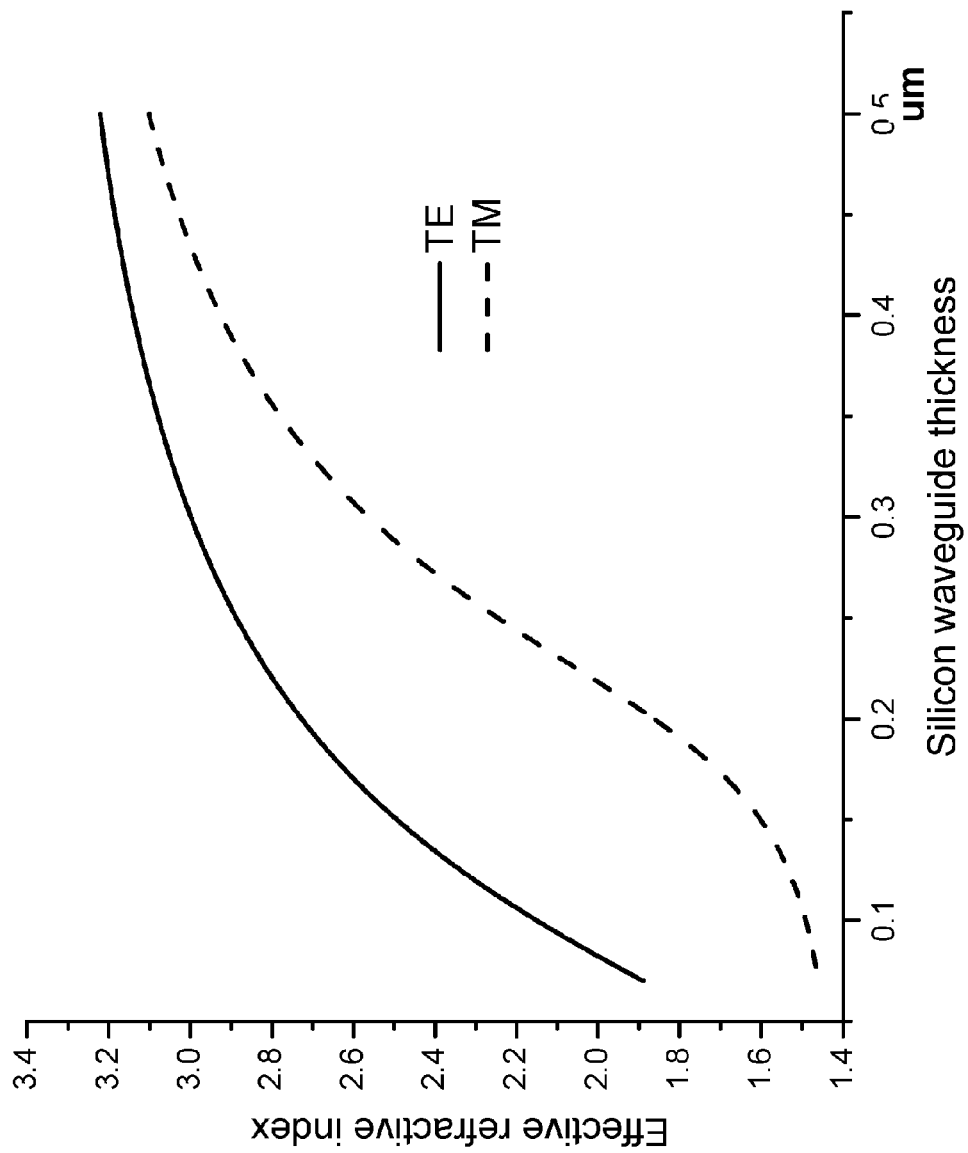
FIG. 2b is a plot illustrating, in accordance with the proposed solution, variations of the effective refractive index of a silicon waveguide for both polarization states, for a waveguide width of 4.2 microns and a free space wavelength of 1.55 μm.

FIG. 2a illustrates a plot of the effective refractive index neff2 as a function of the high refractive index material thickness 7 (t1) for a given waveguide width, a given wavelength and a given polarization. The variation illustrates a high tuneability of the effective index neff2 by controlling the high refractive index material thickness 7 (t1). FIG. 2b illustrates a plot of the effective refractive index neff2 in the case where silicon is the high refractive index material. Both polarization states TE and TM are illustrated on the plot. It has been discovered that this coupling arrangement exhibits a polarization dependence as the high refractive index waveguide thickness 7 (t1) cannot be optimized for both polarization states at the same time. Several applications benefit from this effect.

Figure 2C:
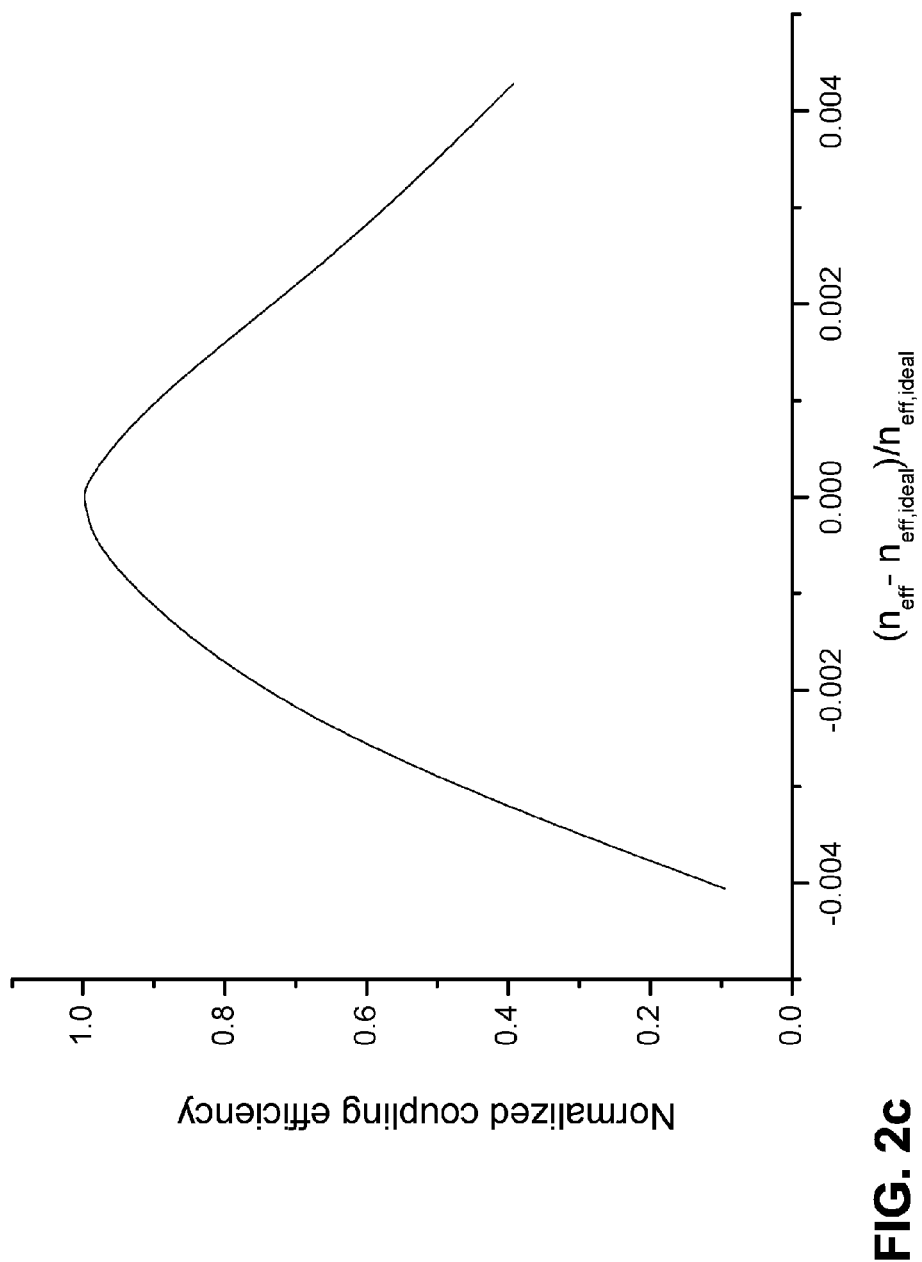
FIG. 2c is a plot illustrating, in accordance with the proposed solution, a variation of a coupling efficiency from a low refractive index material waveguide having a core index of 1.57 to a silicon waveguide as a function of effective refractive index detuning, wherein a detuning value of 0 corresponds to a perfectly matched structure.

FIG. 2c illustrates a variation of coupling efficiency as a function of the effective refractive index detuning between the intermediary 1 and the high refractive index 2 waveguides. Directional coupling is most efficient when the effective refractive indices of the two waveguides are very close in value.

Figure 2D:
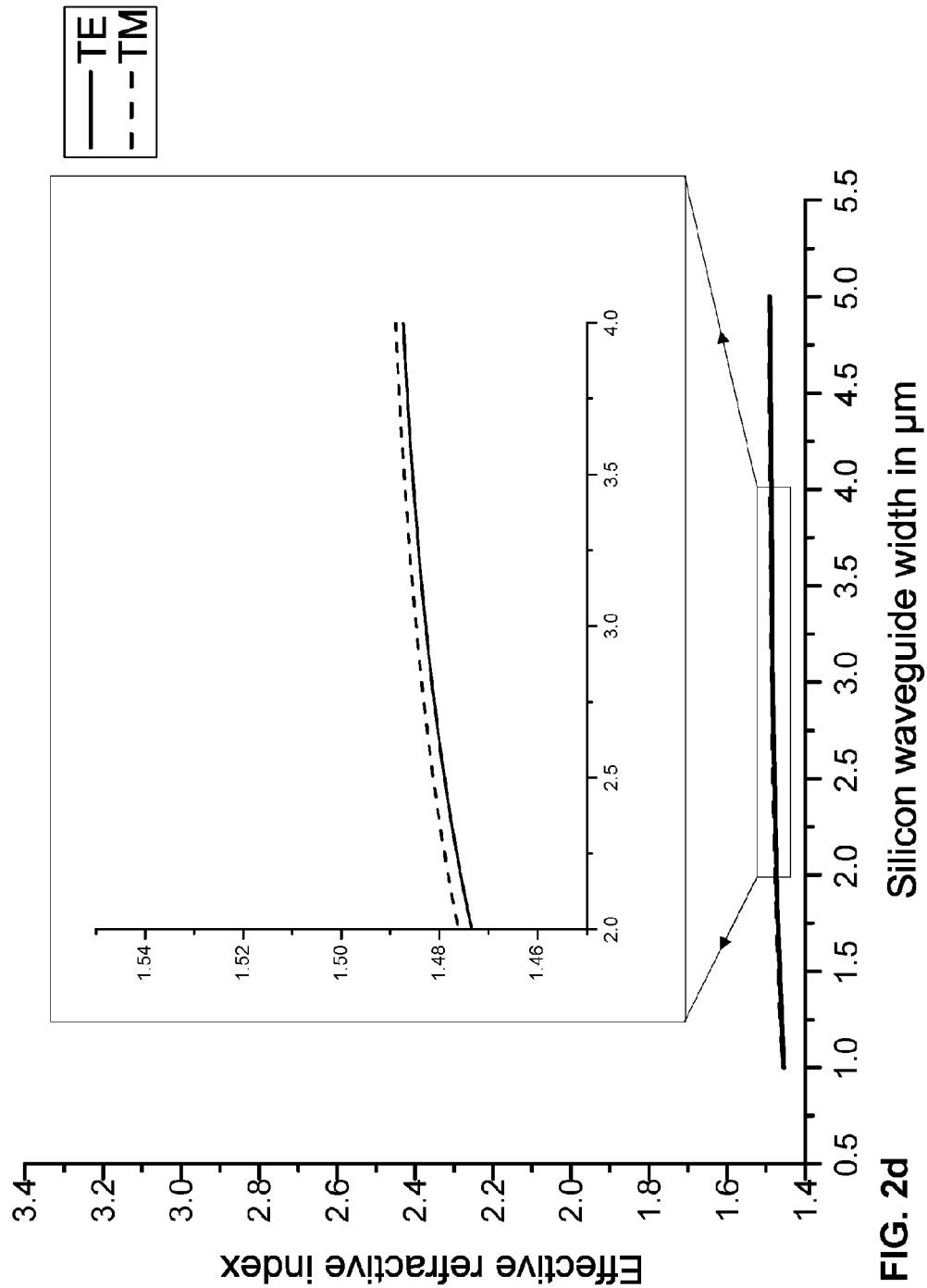
FIG. 2d is a plot illustrating, in accordance with the proposed solution, a variation of the coupling efficiency from a low refractive index material waveguide having a core index of 1.57 to a silicon waveguide as a function of the width of the silicon waveguide.

FIG. 2d illustrates an example plot of the effective refractive index as a function of waveguide width for an optimized high refractive index thickness. It has been discovered that the effective index has much less sensitivity with respect to the width parameter. Therefore, fabrication constraints with respect to the lateral dimension of the waveguide can be relaxed.

Figure 2E:
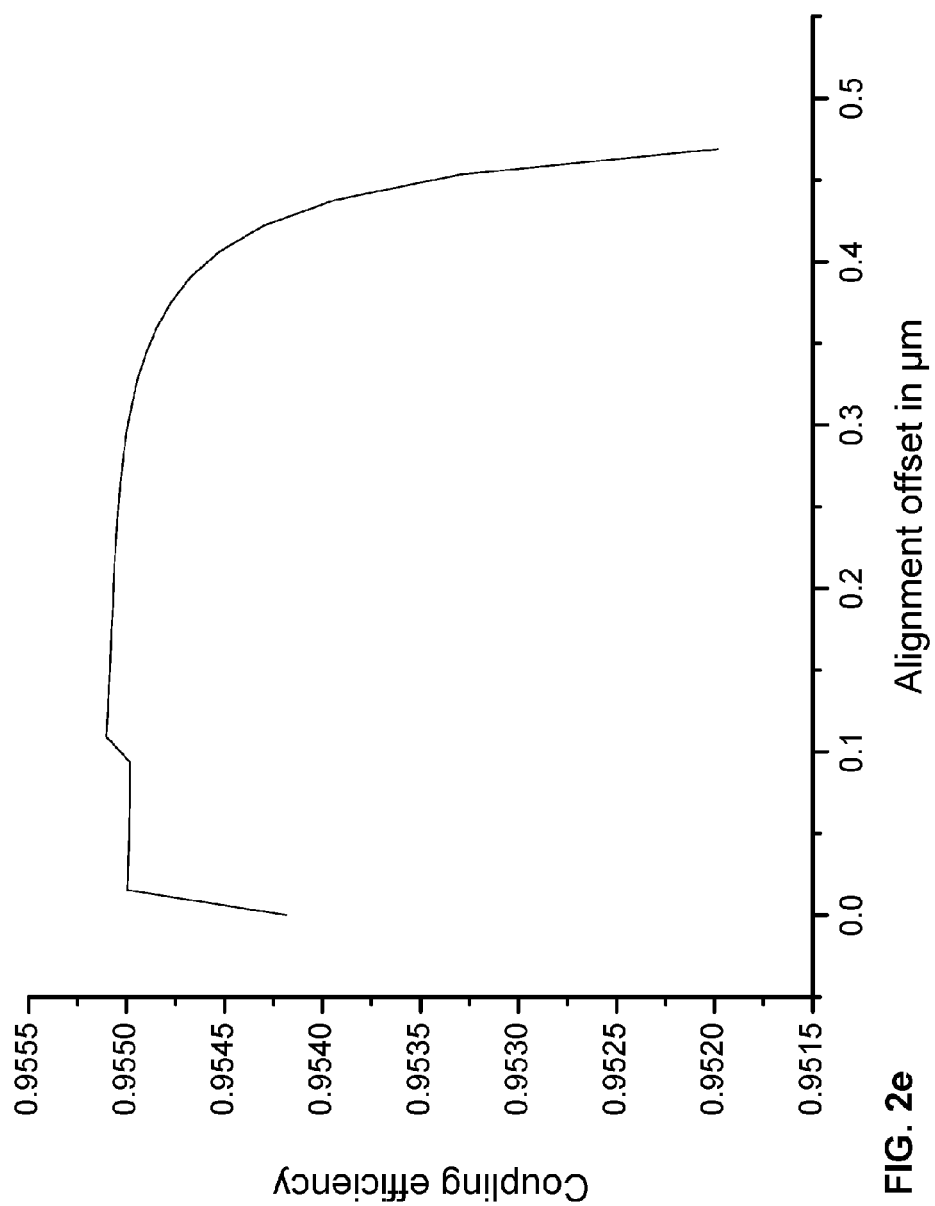
FIG. 2e is a plot illustrating, in accordance with the proposed solution, a variation of the coupling efficiency from a low refractive index material waveguide having a core index of 1.57 to a silicon waveguide as a function of misalignment between the centers of the waveguides.

FIG. 2e illustrates an example plot of the coupling efficiency as a function of the waveguide misalignment illustrating that in the proposed configuration(s), this parameter is not highly critical.

Figure 3B:
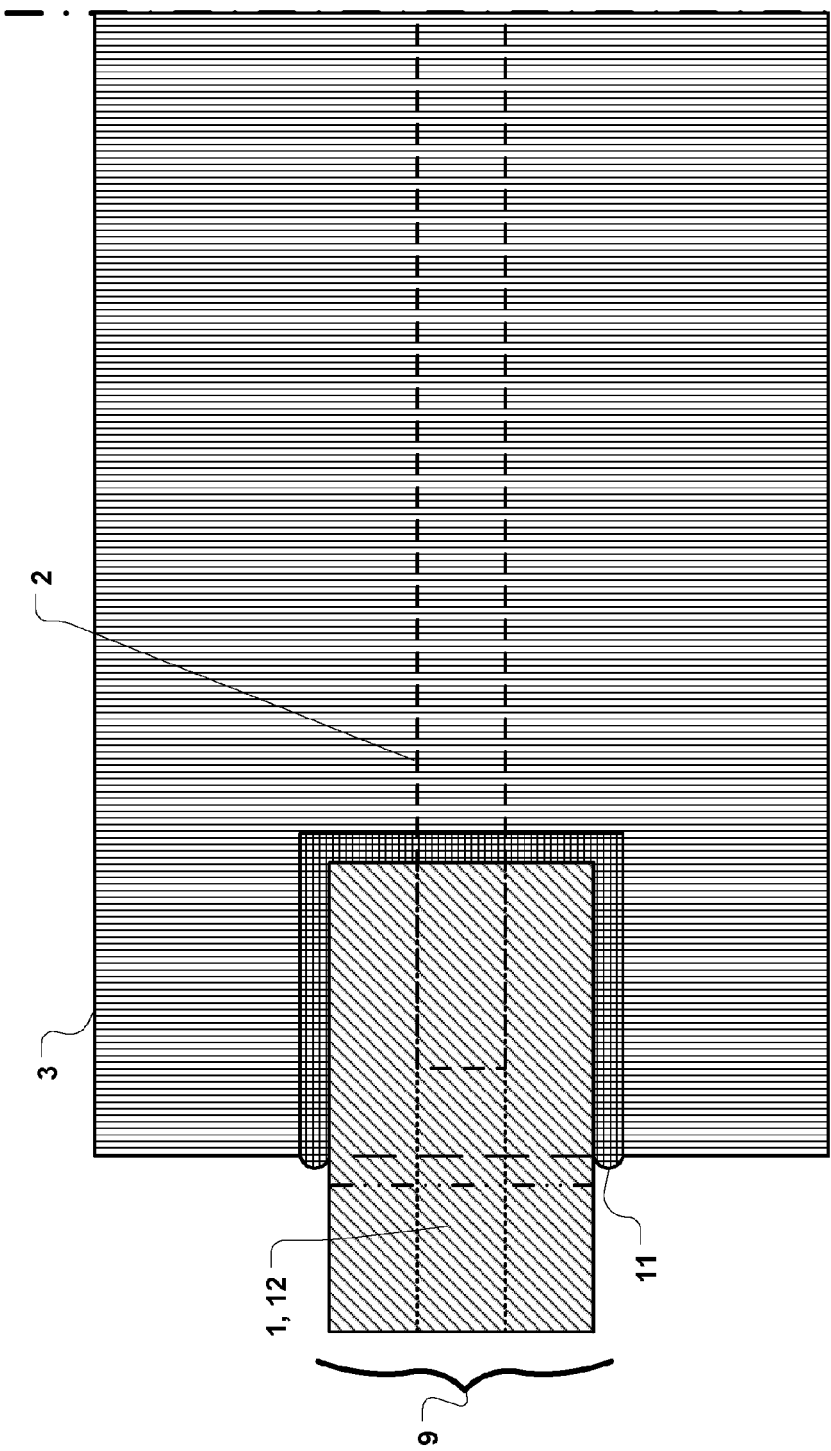
Figure 3C:
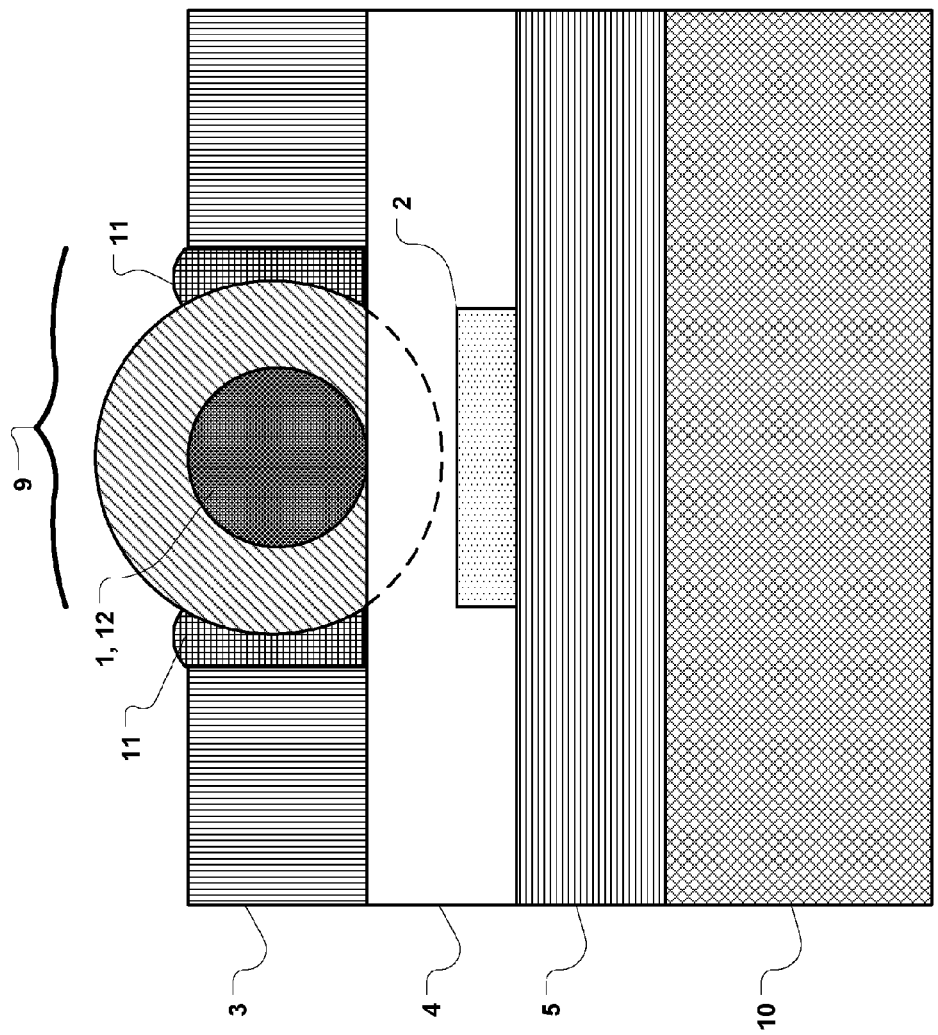
FIG. 3c is yet another schematic diagram illustrating a cross-sectional view perpendicular to a circular optical fiber core axis.

FIGS. 3a, 3b and 3c illustrate another embodiment of the proposed solution in accordance with which the first waveguide 1 includes an optical fiber 9 having an at least partially exposed core 12. The optical fiber has some of its cladding 10 removed in a way that allows its core 12 to be placed close enough to the high refractive index waveguide 2, for example by removing a portion of the cladding to provide a facet. The invention is not limited to the circular cross-section cladding and core fiber illustrated in FIG. 3c. FIGS. 3a and 3b equally illustrate optical fibers with rectangular cores, and optionally with rectangular cladding. It has been found that a mismatch between a circular geometry of an optical fiber core 1, 12 compared to the rectangular geometry of the first waveguide 1 of FIG. 1 does not have a significant impact on the coupling efficiency and comparable waveguide separations can be employed when the geometries are dissimilar. With reference to FIGS. 3a and 3c, the fiber core 12 comes near or in contact with the waveguide separation layer 4 and is the first waveguide 1. FIG. 3b illustrates that a mechanical positioning structure could be fabricated at the same time as the chip to allow easy positioning of the optical fiber. A polymer 11 can be used for fixing the optical fiber in place. (Further packaging and alignment structure details are presented herein below with reference to FIGS. 4a, 4b, 4c, 5a, 5b, 5c, 14a, 14b, 16a, 16b and 16c)

Figure 4A:
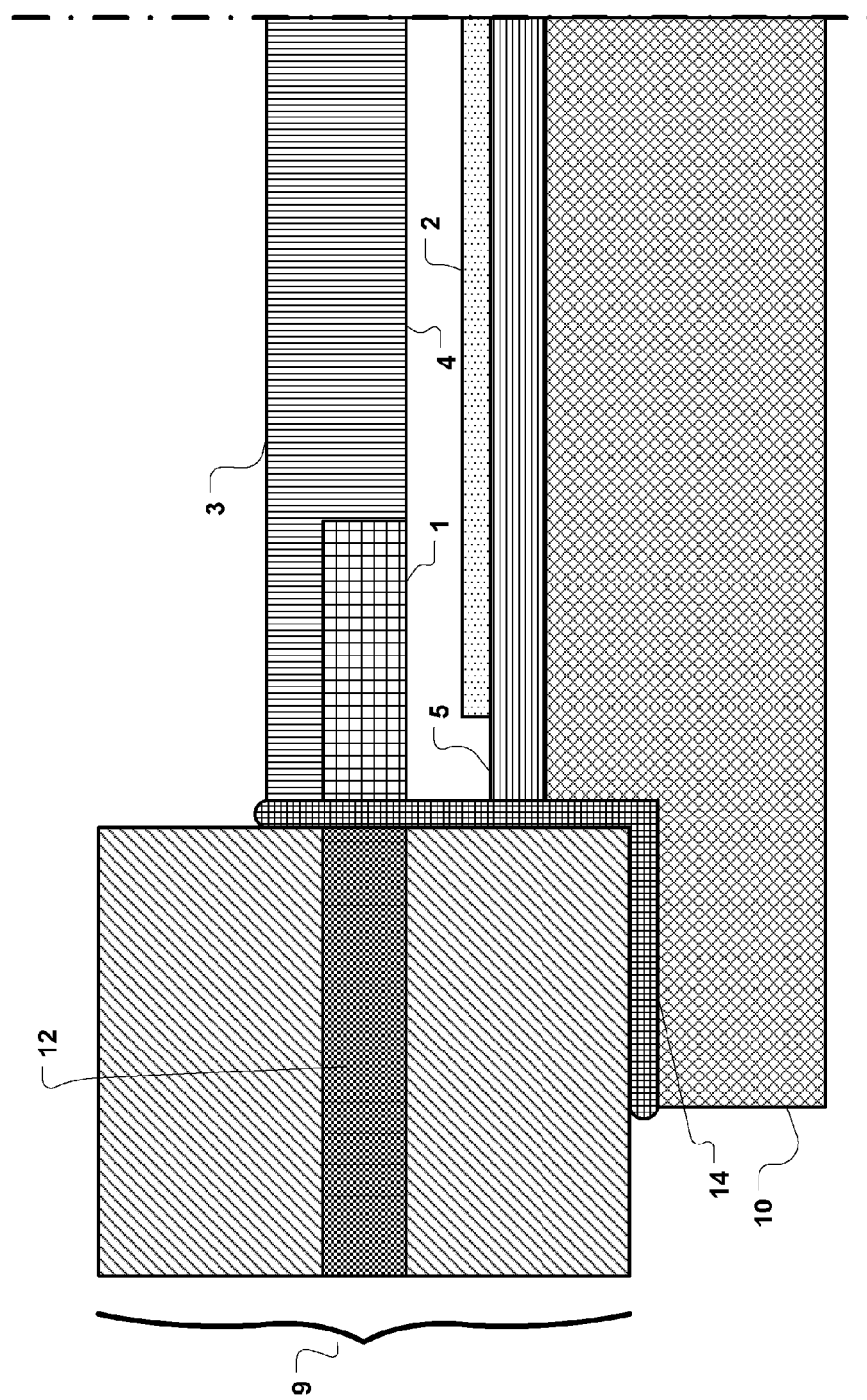
FIG. 4a is a schematic diagram illustrating a side view of another embodiment of the proposed solution wherein the first waveguide is an intermediary waveguide to which light is butt-coupled from an optical fiber of a similar refractive index.
Figure 4B:
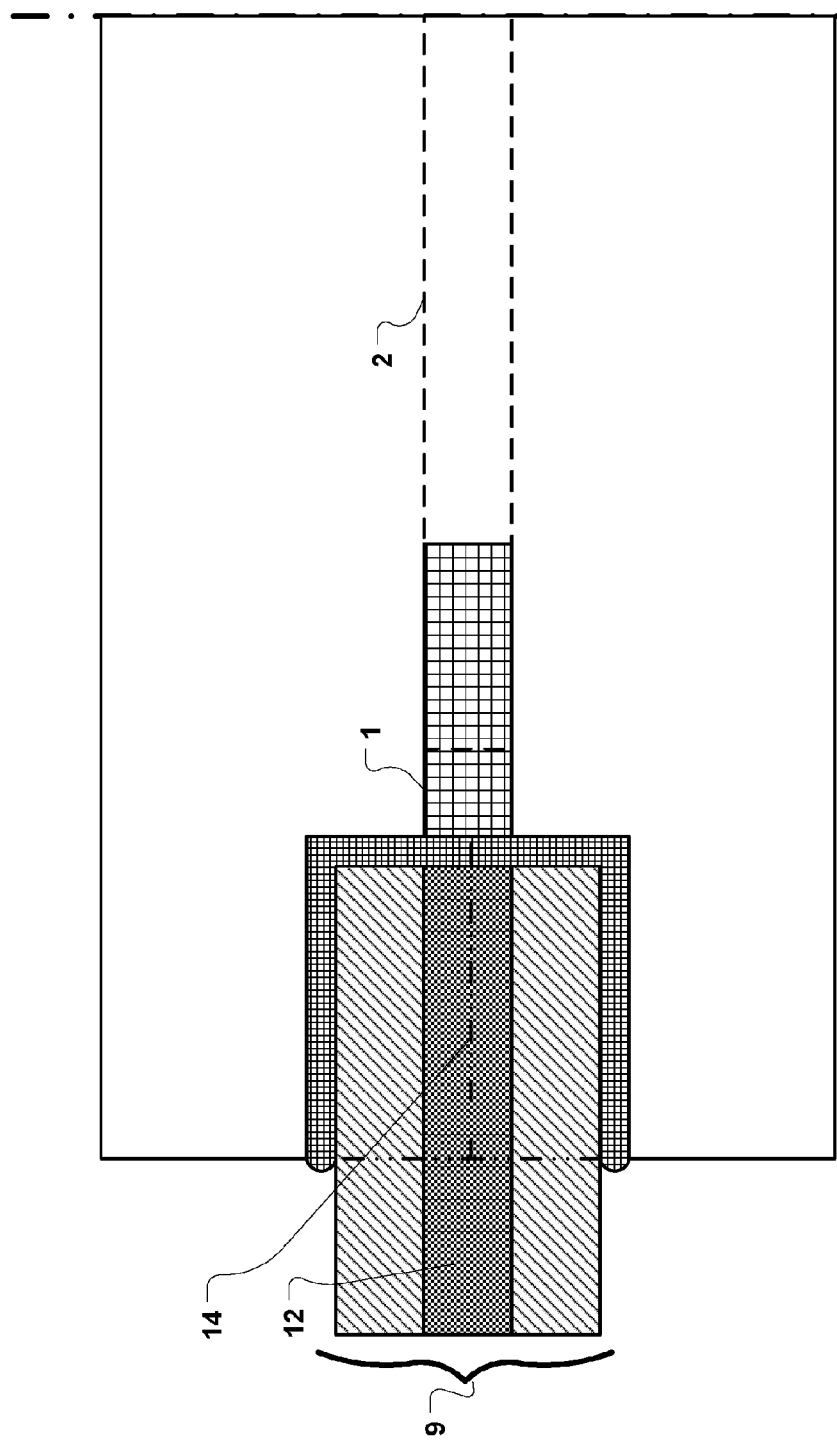
Figure 4C:
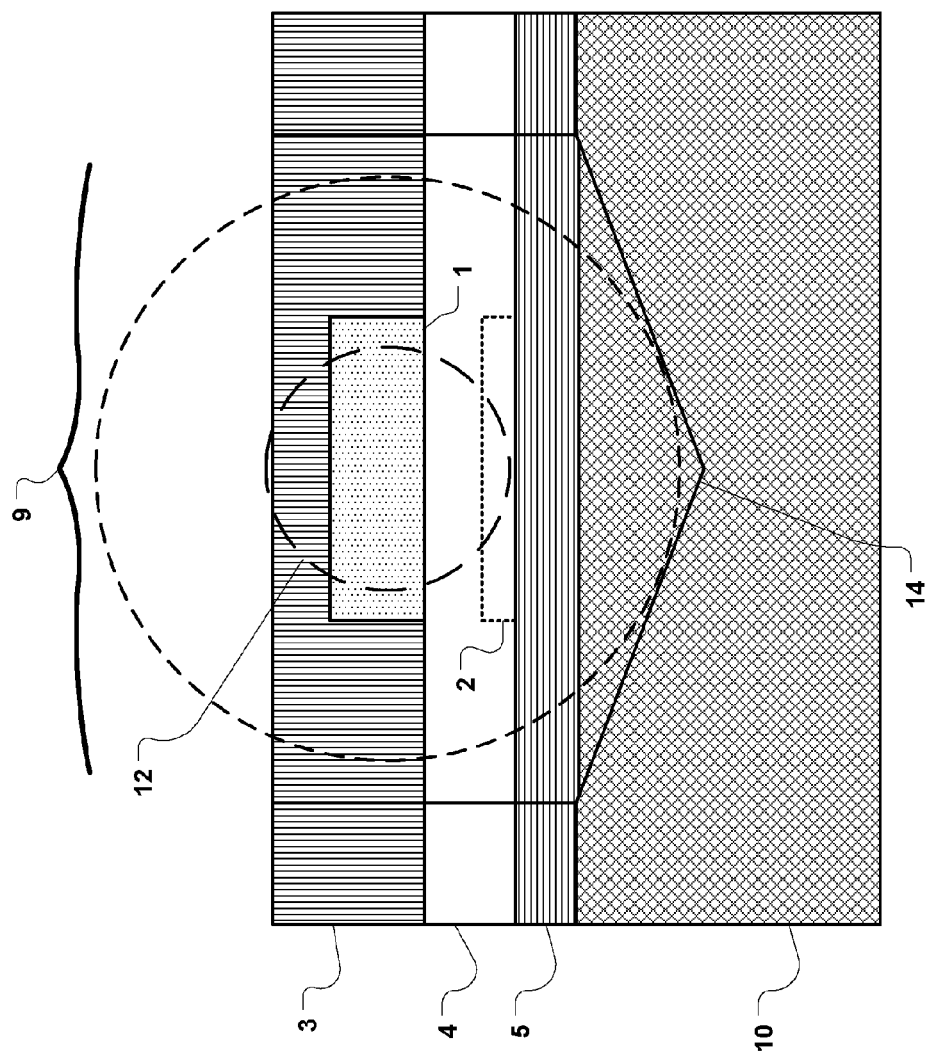
FIG. 4c is a further schematic diagram illustrating a cross-sectional view perpendicular to the optical fiber core axis with a circular optical fiber shown in dotted lines to improve clarity. A v-groove structure is employed to provide improved (optimal) alignment.
Figure 4D:
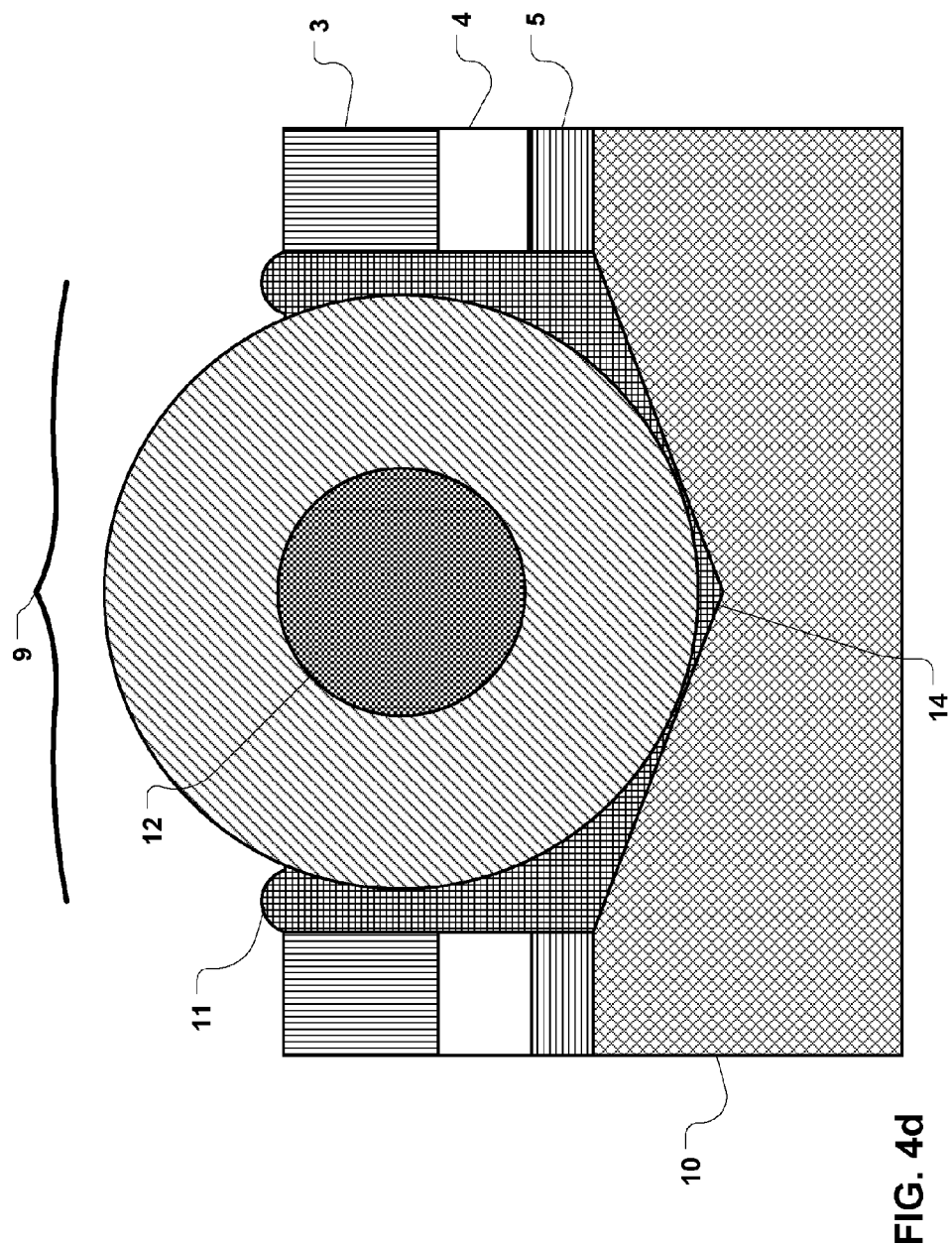
FIG. 4d is yet another schematic diagram illustrating a front view of the embodiment, showing the optical fiber in a V-groove alignment structure.

FIGS. 4a, 4b and 4c illustrate another embodiment including an optical fiber 9 butt-coupled to an intermediary waveguide 1. For certainty, FIGS. 4a and 4b are not limited to circular optical fibers with circular cores and apply equally well to optical fibers having rectangular cross-section cores, and optionally rectangular cross-section cladding. FIG. 4c illustrates a V-groove approach for the positioning of an optical fiber having a circular cross-section cladding with respect to the intermediary waveguide. The circular cross-section optical fiber geometry is illustrated in dashed line for clarity, however the invention is not limited circular cross-section optical fibers. For a rectangular cross-section core and circular cross-section optical fiber, the core would be illustrated by a dashed rectangle 12 (not shown). The intermediary low refractive index waveguide 1 is built on top of the high (intrinsic/material) refractive index waveguide 2. The invention is not limited to the V-groove alignment structure 14, other alignment structures fabricated for example by lithography, etching and/or deposition can be used. The shape of the optical fiber can be employed for proper alignment. FIG. 4d illustrates the use of a polymer 11 ensuring a tight and refractive index matched interface between the fiber and the chip. (Further packaging and alignment structure details are presented herein below with reference to FIGS. 3a, 3b, 3c, 5a, 5b, 5c, 14a, 14b, 16a, 16b and 16c)

Figure 5A:
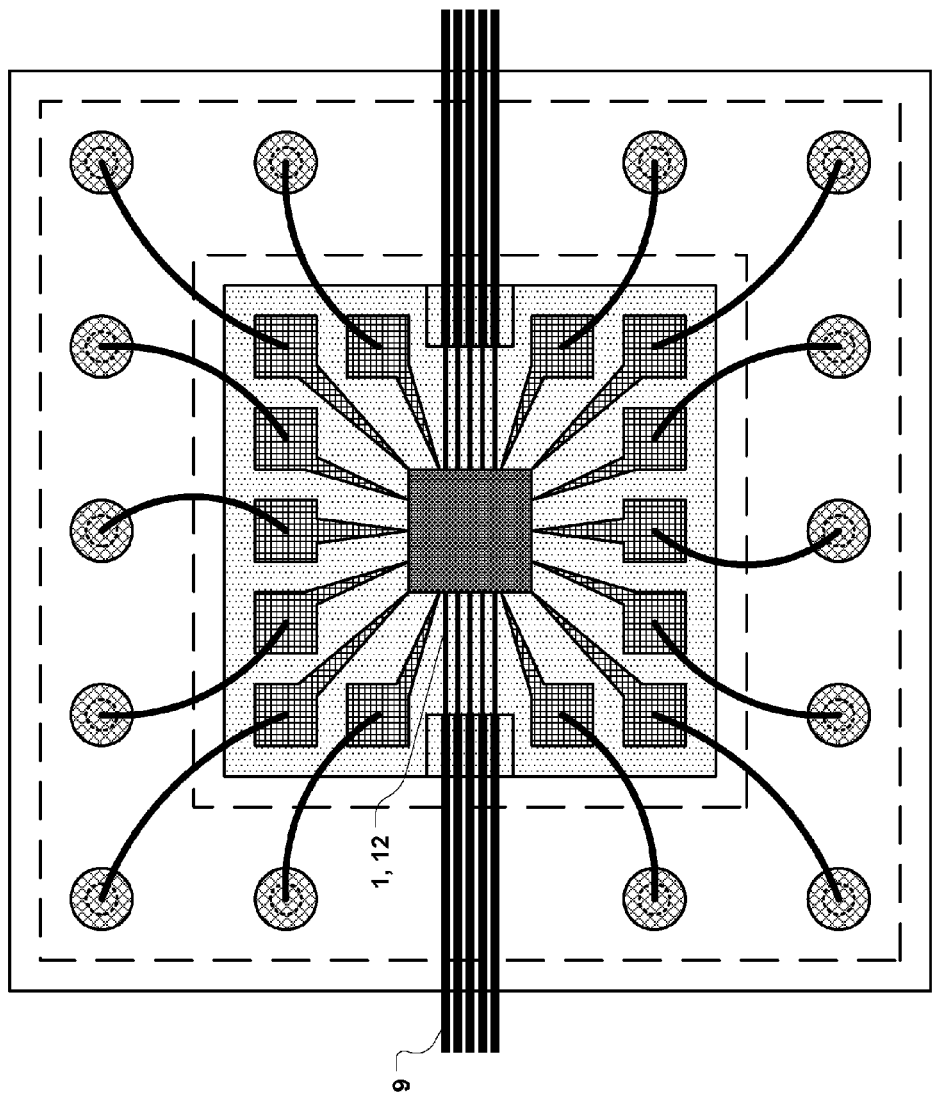
FIG. 5a is a schematic diagram illustrating, in accordance with a further embodiment of the proposed solution, a top view of packaging aspects of bringing an optical bus into a package for connection to a semiconductor chip.

In accordance with another implementation illustrated in FIGS. 5a, 5b and 5c, a bus of optical fibers dock on the chip, each optical fiber in the bus coupling to a corresponding semiconductor waveguide structure. Each fiber directs its carried optical signal to where on the integrated circuit the optoelectronic component is located. For example the optical fiber bus can form an array. The fiber bus and I/O waveguides can be provided in a package that connects on top of the integrated circuit package as a standard module. The integrated circuit can be fabricated with its tunneling coupling waveguides flush with the surface of the integrated circuit package and hermetically sealed. For example multiple tunneling coupling waveguides can be wafer level fabricated in an array corresponding to an arrayed optical fiber bus on a socket. (Further packaging and alignment structure details are presented herein below with reference to FIGS. 3a, 3b, 3c, 4a, 4b, 4c, 14a, 14b, 16a, 16b and 16c)

Figure 6A:
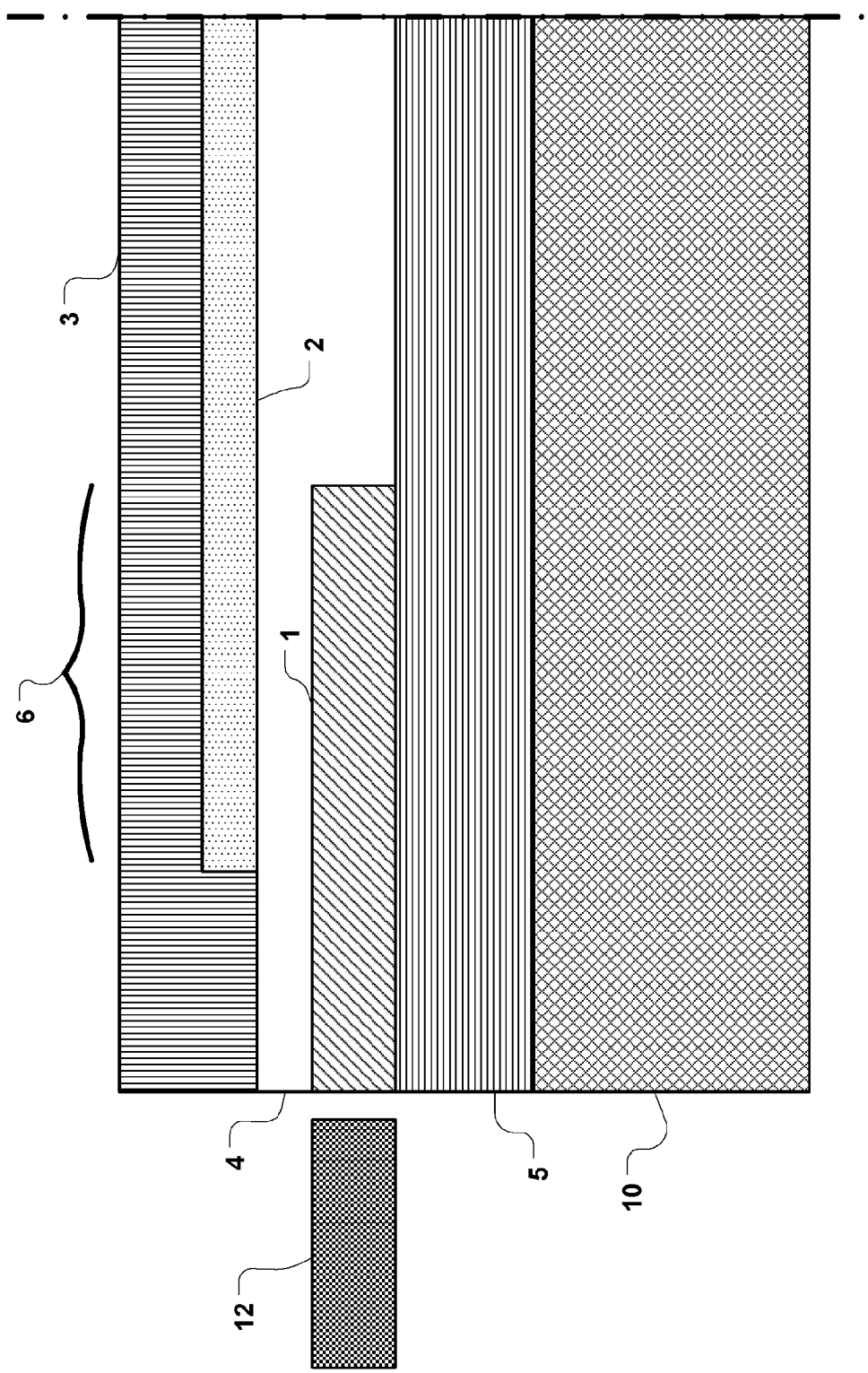
FIG. 6a is a schematic diagram illustrating, in accordance with a further embodiment of the proposed solution, a side view of an implementation wherein the high refractive index material waveguide is fabricated on top of the (intermediary) low refractive index waveguide layer.
Figure 6B:
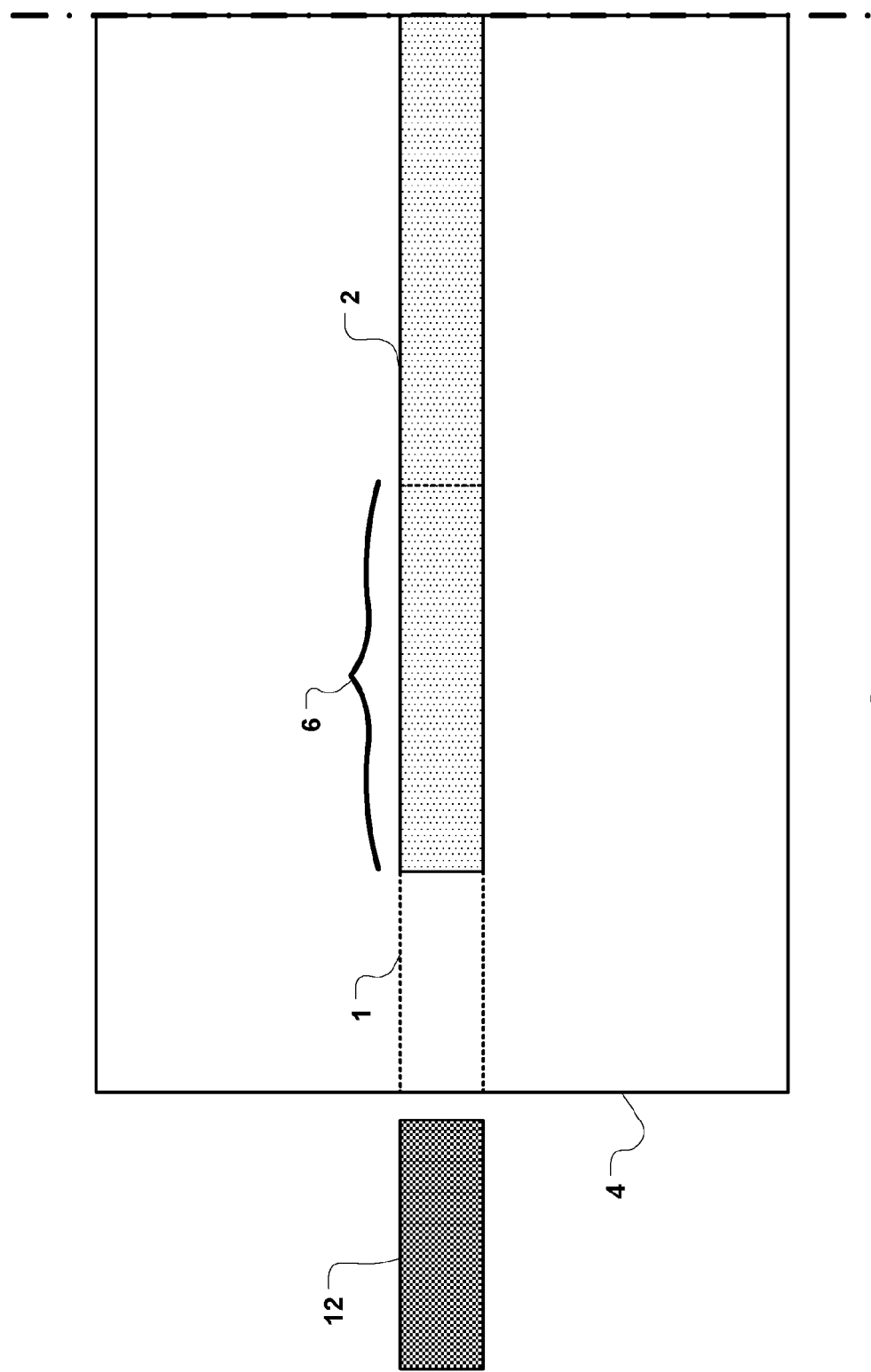
Figure 6C:
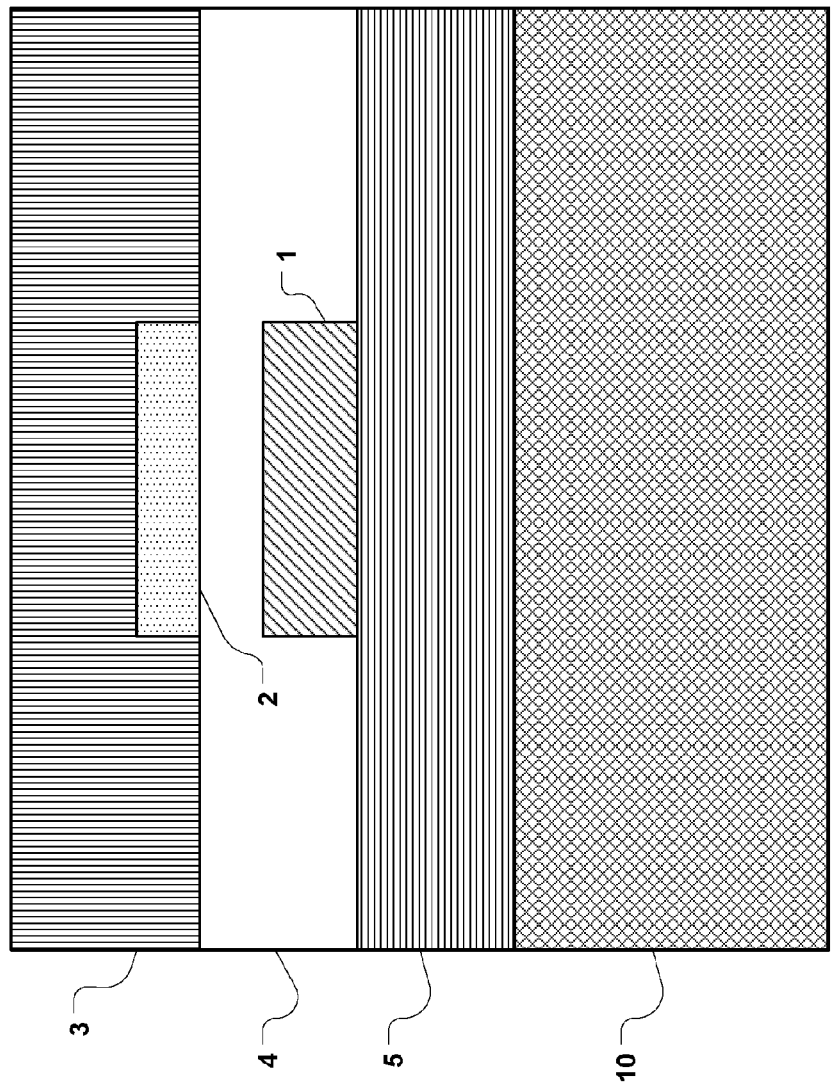

For certainty, while in the above presented embodiments the high refractive index waveguide 2 is disposed under the first intermediary waveguide 1, the invention is not limited to such orientation. FIGS. 6a, 6b and 6c respectively illustrate side, top and cross-sectional views of an embodiment where the high refractive index waveguide 2 is built on top of the intermediary low refractive index waveguide 1.

Figure 7A:
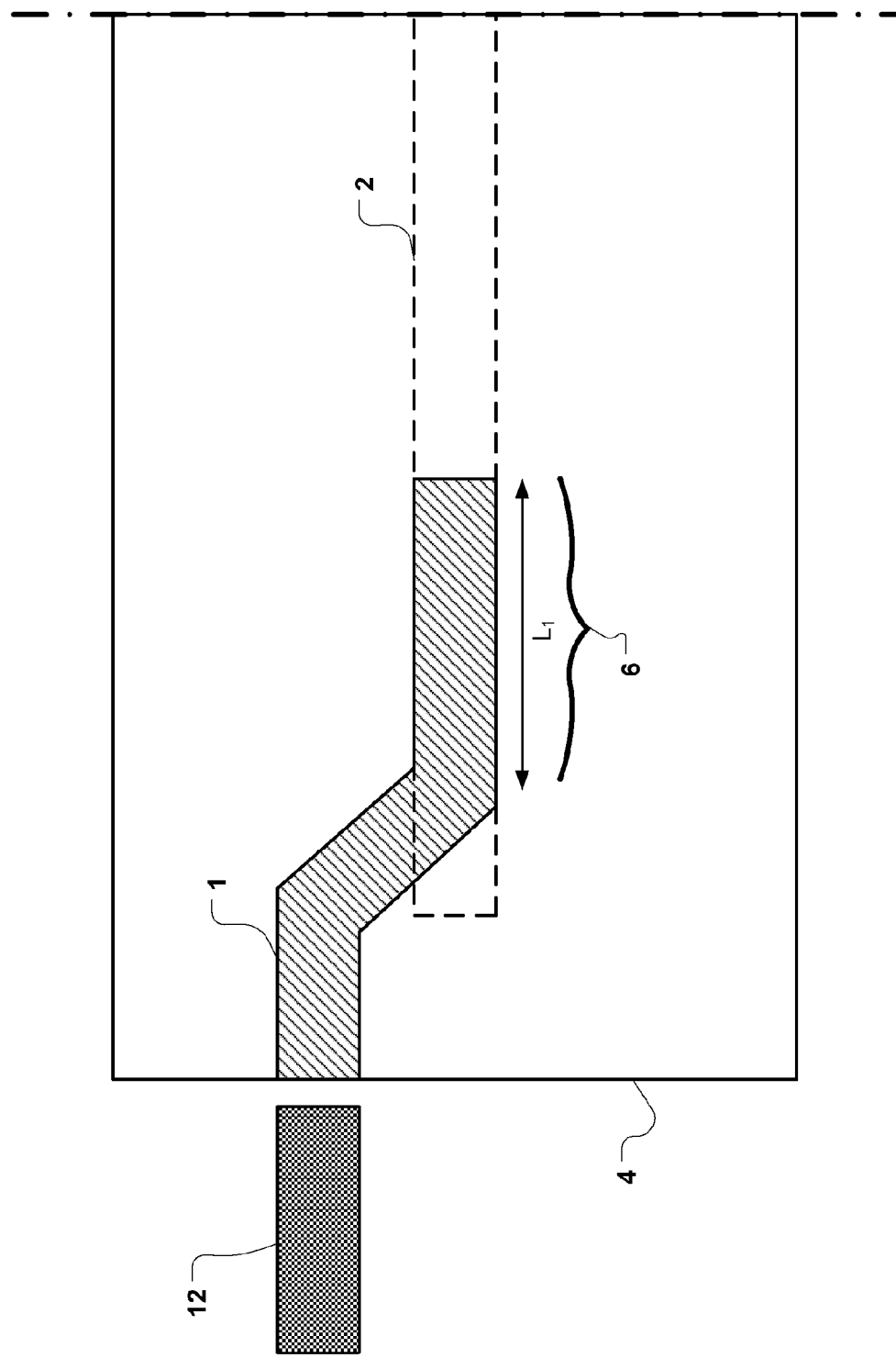
FIG. 7a is schematic diagram illustrating, in accordance with a further embodiment of the proposed solution, a top view of a structure controlling coupling length by patterning the intermediary waveguide with an s-bend.
Figure 7B:
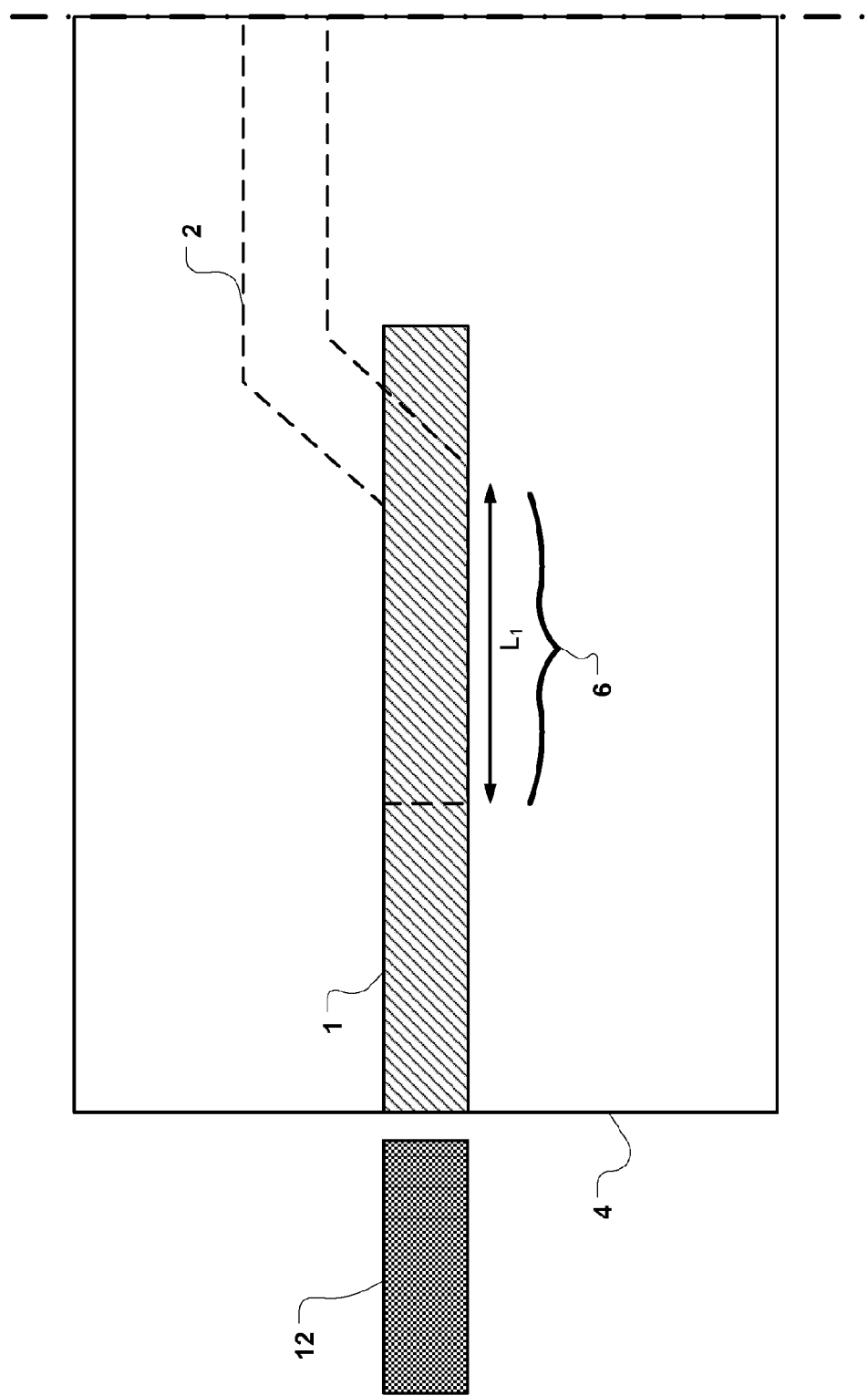
FIG. 7b is schematic diagram illustrating, in accordance with a further embodiment of the proposed solution, a top view of a structure controlling coupling length by patterning the high refractive index waveguide with an s-bend.

FIG. 7a illustrates an embodiment in which the coupling length 6 is controlled by a lateral deviation of the intermediary waveguide 1 while FIG. 7b illustrates another embodiment in which the coupling length 6 is controlled by deviating the high refractive index waveguide 2. It is also to be noted that the coupling length 6 can be controlled by deviating both coupling waveguides. Controlling the coupling length 6 controls the length of a standing wave pattern within the corresponding wave guide, the length of the sanding wave pattern determining the degree of light (optical signal) coupling. The angle of lateral deviation can vary within a range being only limited by bending losses of the waveguide(s).

Figure 8A:
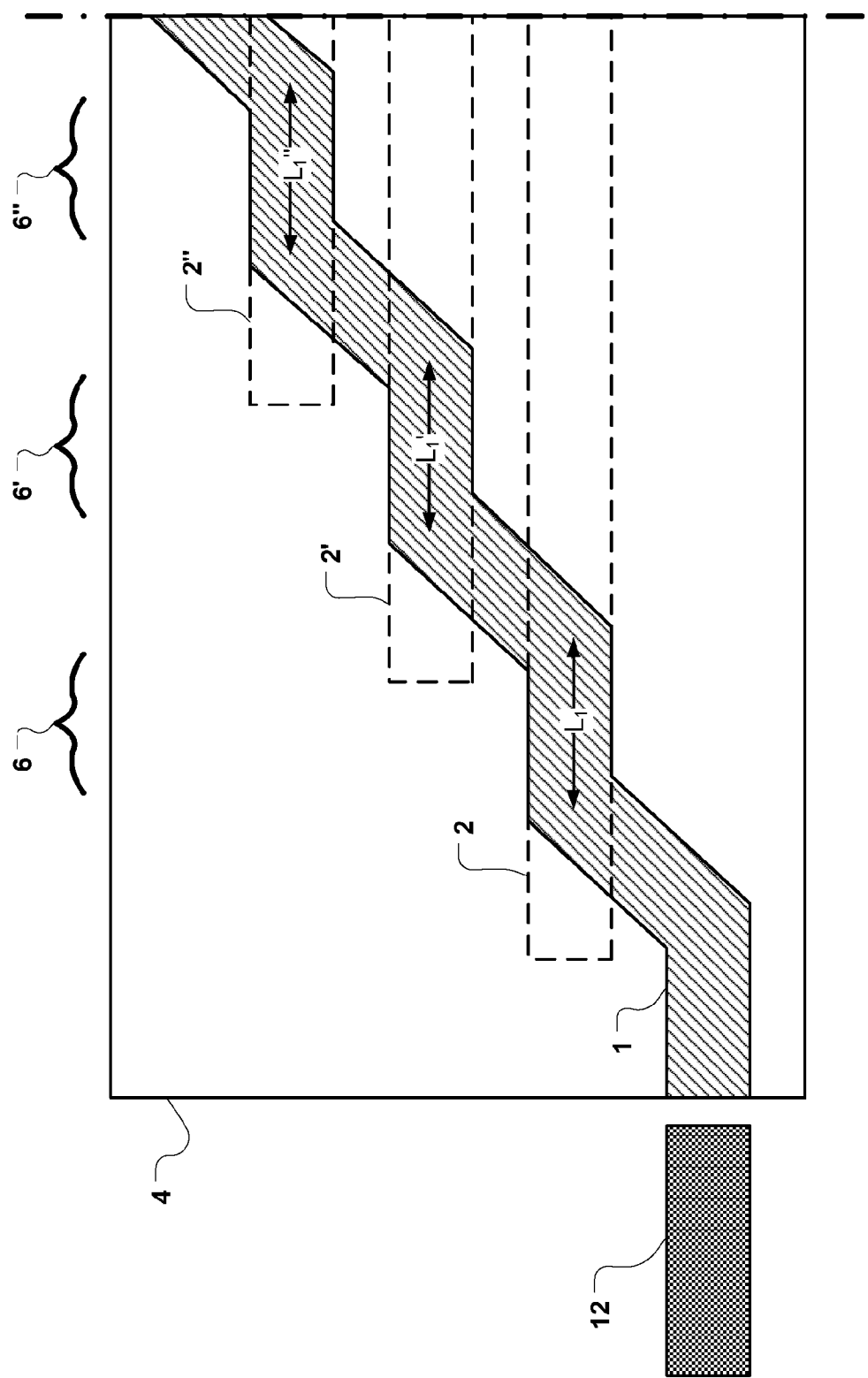
FIG. 8a is a schematic diagram illustrating, in accordance with a further embodiment of the proposed solution, a top view of a single input being distributed over many outputs, wherein a intermediary waveguide is patterned with s-bends to control each coupling length.
Figure 8B:
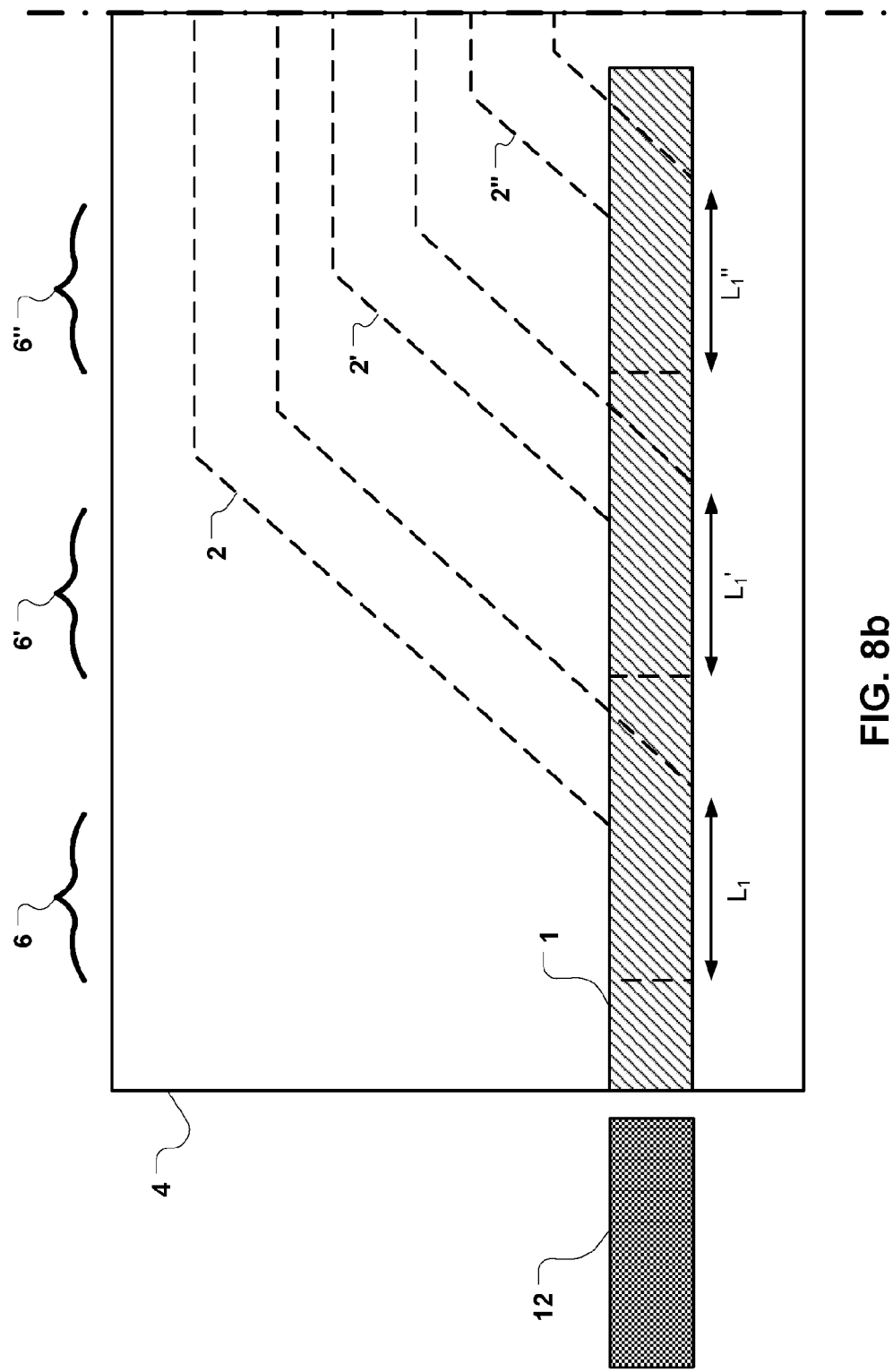
FIG. 8b is another schematic diagram illustrating, in accordance with a further embodiment of the proposed solution, a top view of a single input being distributed over many outputs, wherein high refractive index waveguides are patterned with s-bends to control each coupling length.
Figure 8C:
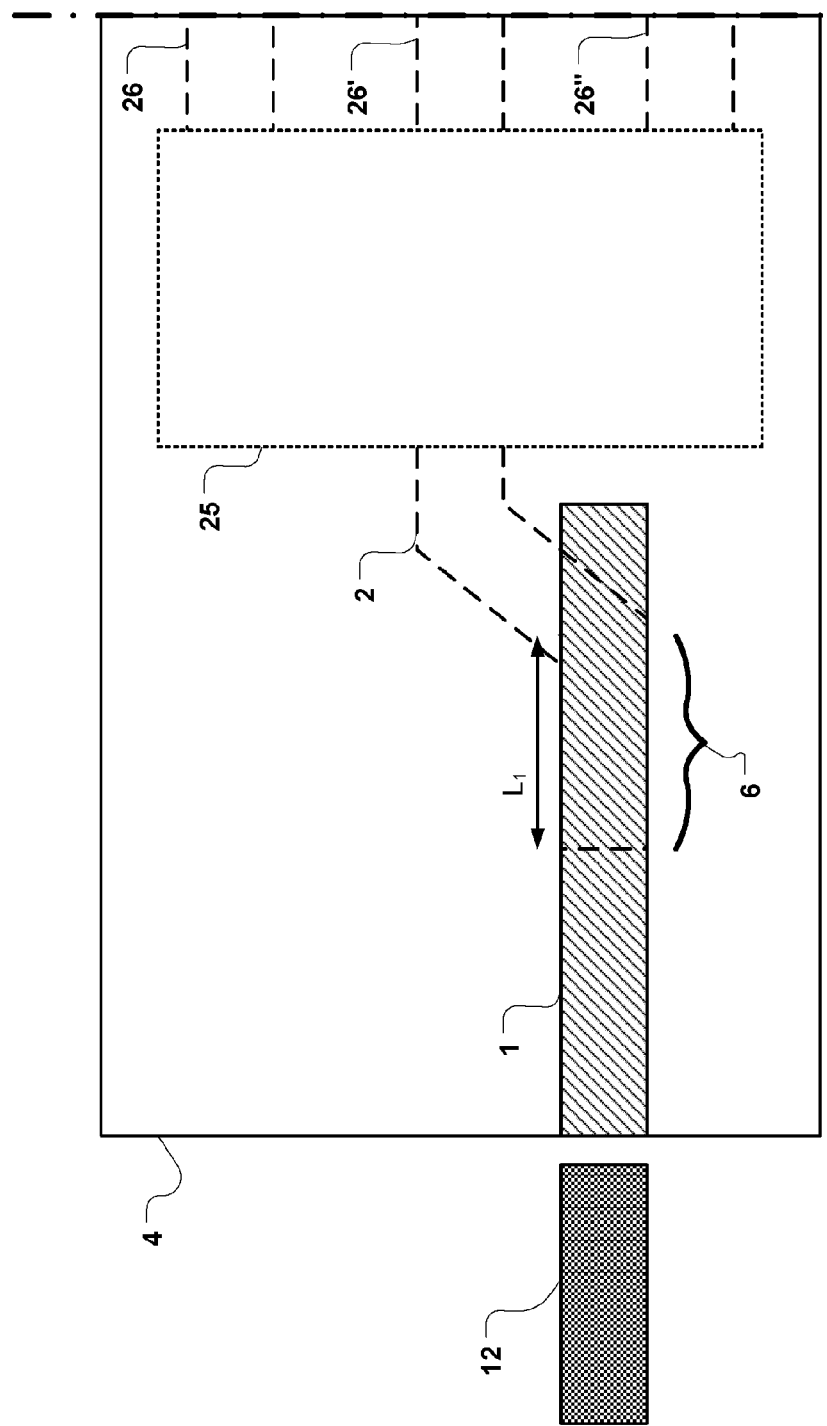
FIG. 8c is yet another schematic diagram illustrating, in accordance with a further embodiment of the proposed solution, a top view of a single input being distributed over many outputs, wherein a demultiplexing structure is employed to distribute an optical signal over many outputs.

FIGS. 8a to 8c illustrate implementations of an embodiment providing optical signal distribution from an input waveguide to a waveguide bundle having multiple on-chip waveguides. The coupling lengths 6, 6' and 6" are controlled individually to transfer the desired amount (fraction) of the input optical power to each semiconductor waveguide 2 in the bundle. For example, if the input power of a single wavelength optical signal has to be split between two output waveguides 2, the first coupling would be limited to a 50% of the input power and the second subsequent coupling would couple 100% of the remaining power (which is 50% of the input power). If the input optical signal is a multi-wavelength optical signal, it is envisioned that each coupling length 6 can be separately configured to couple 100% of the signal power of a corresponding wavelength into a corresponding semiconductor waveguide 2 of the bundle. FIG. 8c illustrates 100% coupling of an input optical signal into a semiconductor waveguide 2, and a signal or power dispatching structure 25, for example an MMI coupler, apportions the power to a number of semiconductor waveguides 26 in a bundle.

Figure 9A:
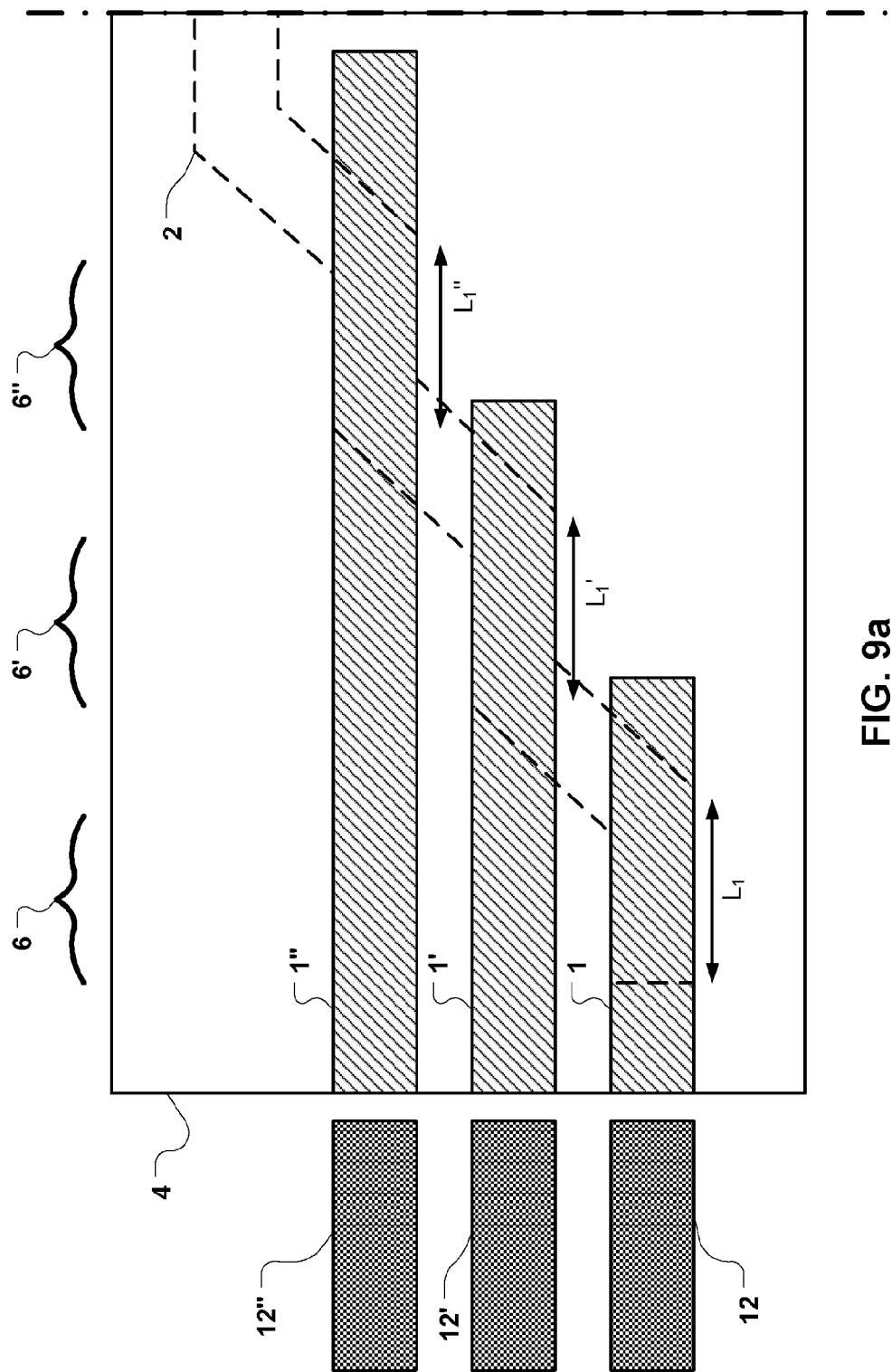
FIG. 9a is a schematic diagram illustrating, in accordance with a further embodiment of the proposed solution, a top view of multiple inputs being mixed together into a single output, wherein a high refractive index waveguide is patterned to form multiple directional coupler sections.
Figure 9B:
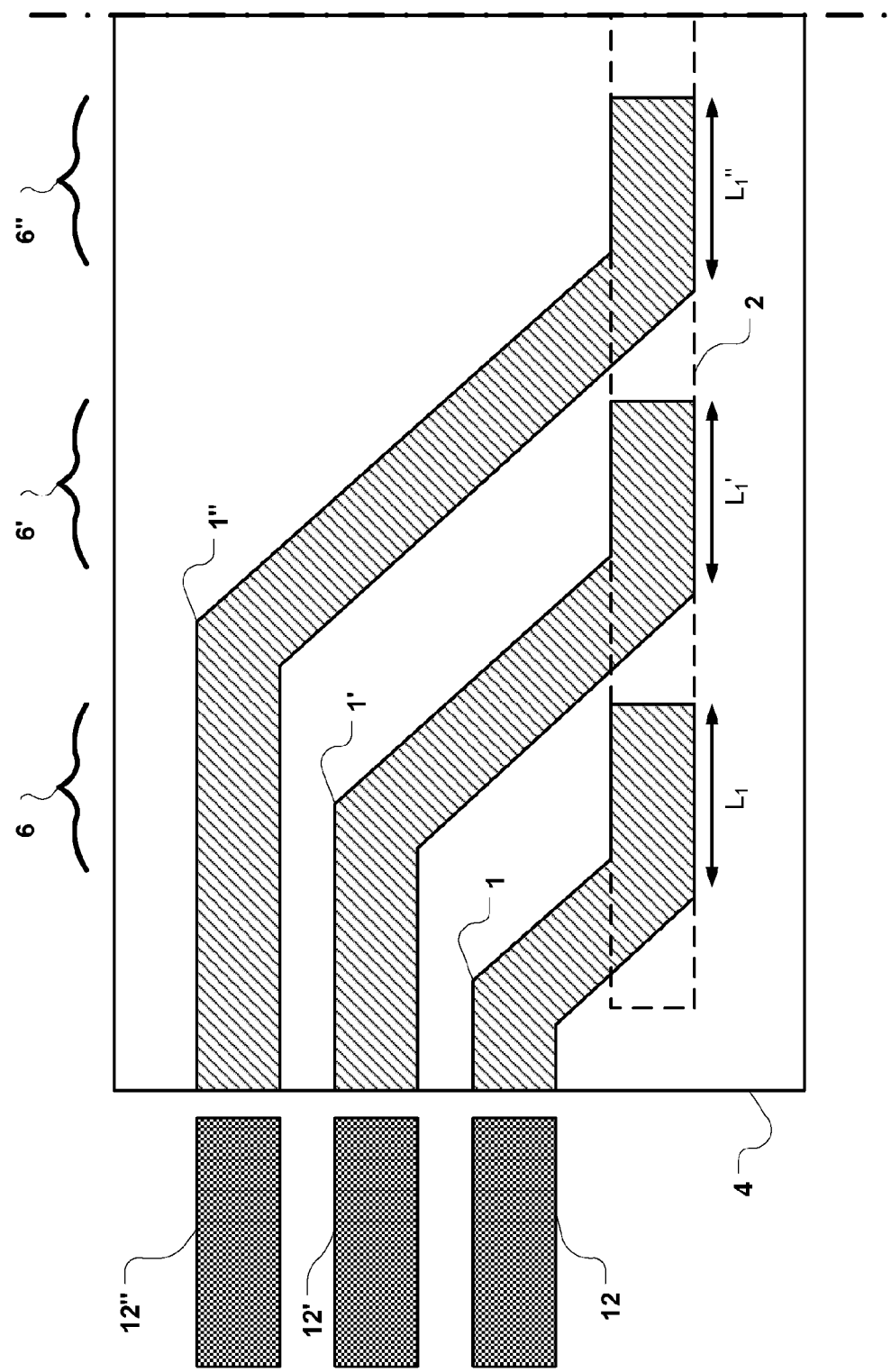
FIG. 9b is another schematic diagram illustrating, in accordance with a further embodiment of the proposed solution, a top view of multiple inputs being mixed together into a single output, wherein multiple intermediary waveguides are patterned to form multiple directional coupler sections.
Figure 9C:
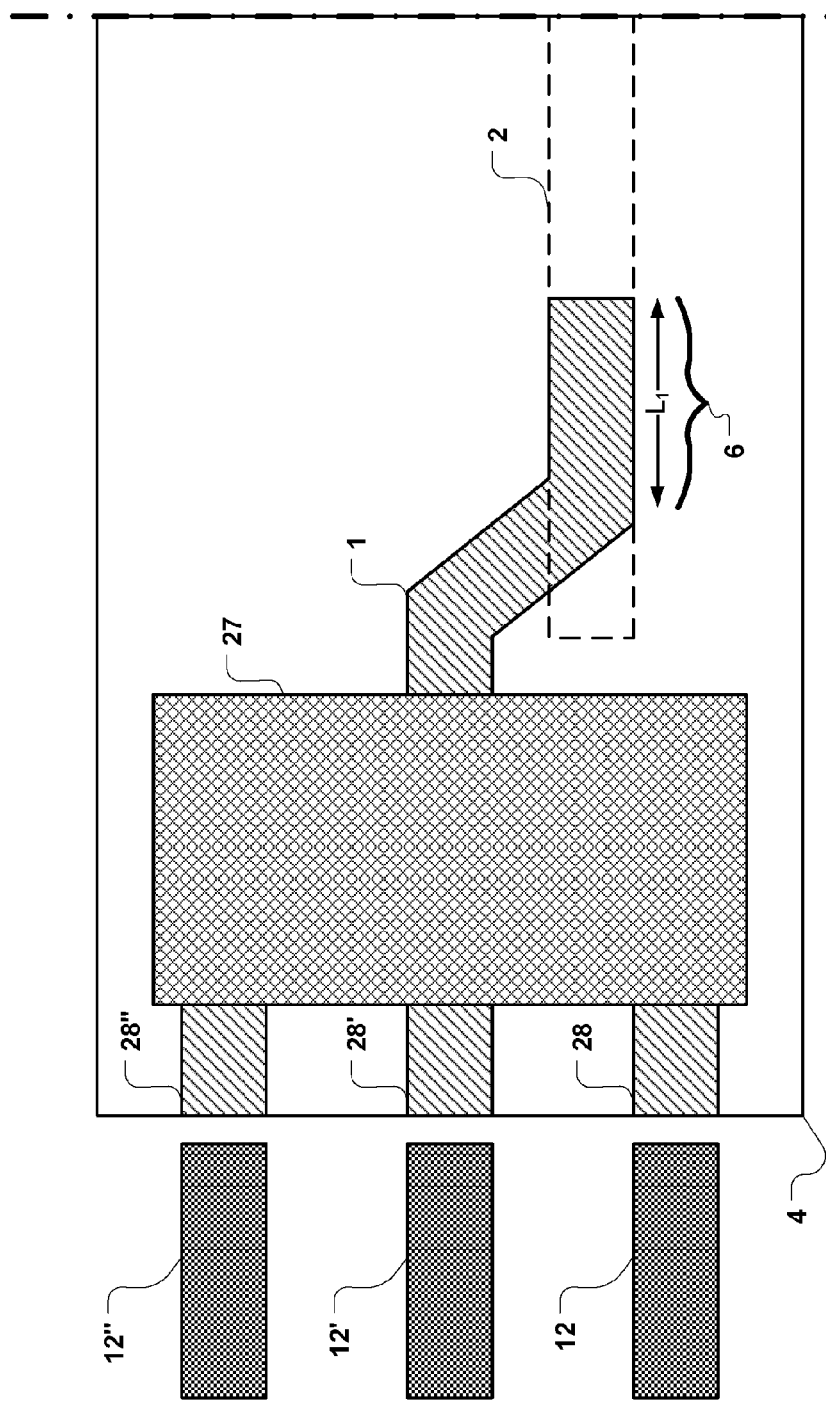
FIG. 9c is yet another schematic diagram illustrating, in accordance with a further embodiment of the proposed solution, a top view of multiple inputs being mixed together into a single output, wherein the high refractive index waveguide includes a multiplexing structure to mix multiple input optical signals into a single output.

FIGS. 9a to 9c illustrate implementations of an embodiment providing combination of multiple optical signals from a bundle having many input waveguides to one on-chip waveguide. As above, coupling lengths 6, 6' and 6" can be employed to couple particular fractions of input optical power signals, as well to couple different wavelengths in to a semiconductor waveguide 2. FIG. 9c illustrates power or signal dispatching structure 27, for example an MMI coupler, which combines a bundle of multiple inputs 12, 28 into a single output coupled to an intermediary (first) waveguide 1.

Figure 10A:
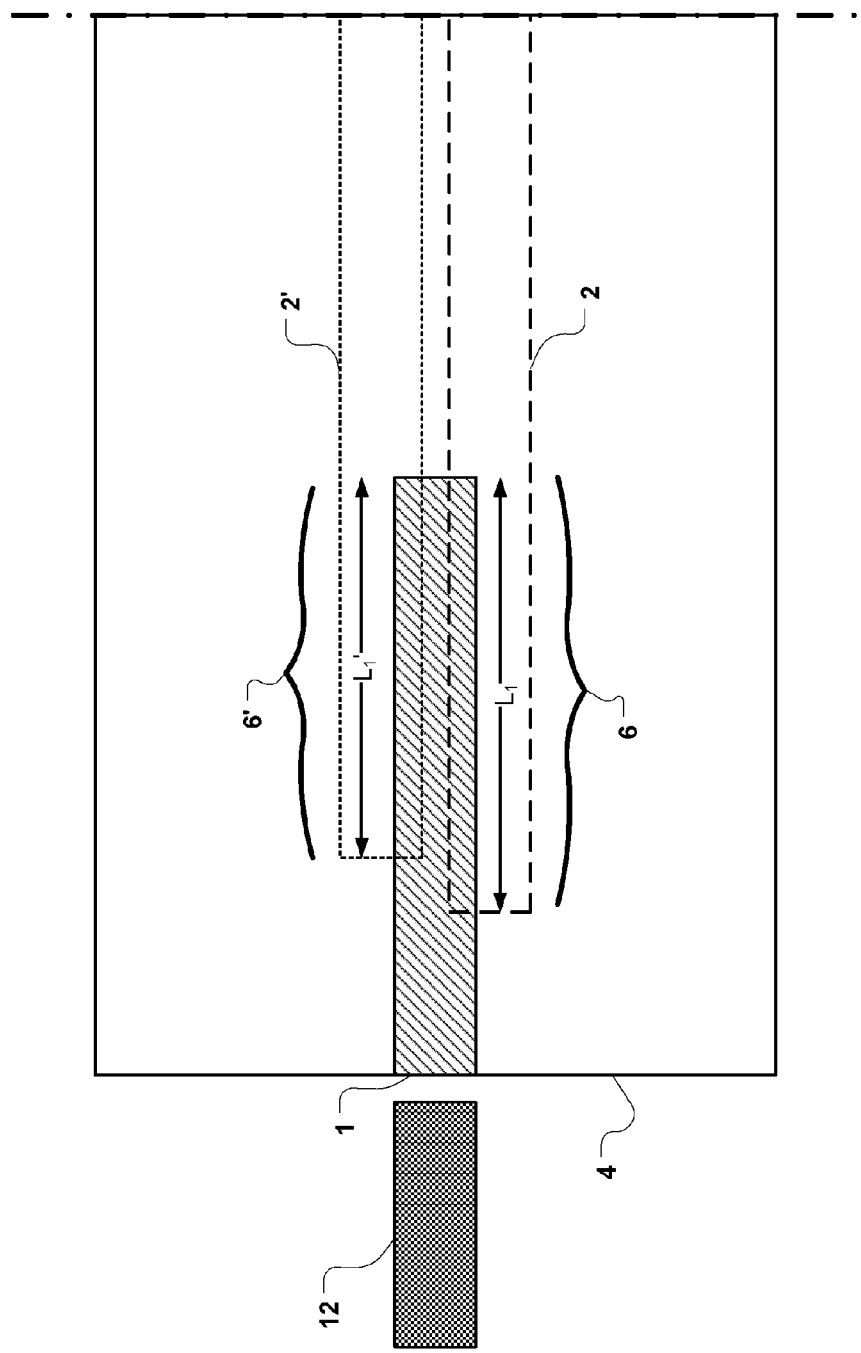
FIG. 10a is a schematic diagram illustrating, in accordance with a further embodiment of the proposed solution, a top view of a directional coupler structure where an input optical signal is coupled from a single intermediary waveguide to two high refractive index waveguides simultaneously, the two high refractive index waveguides being located side by side addressing a polarization dependency of the proposed solution.
Figure 10B:
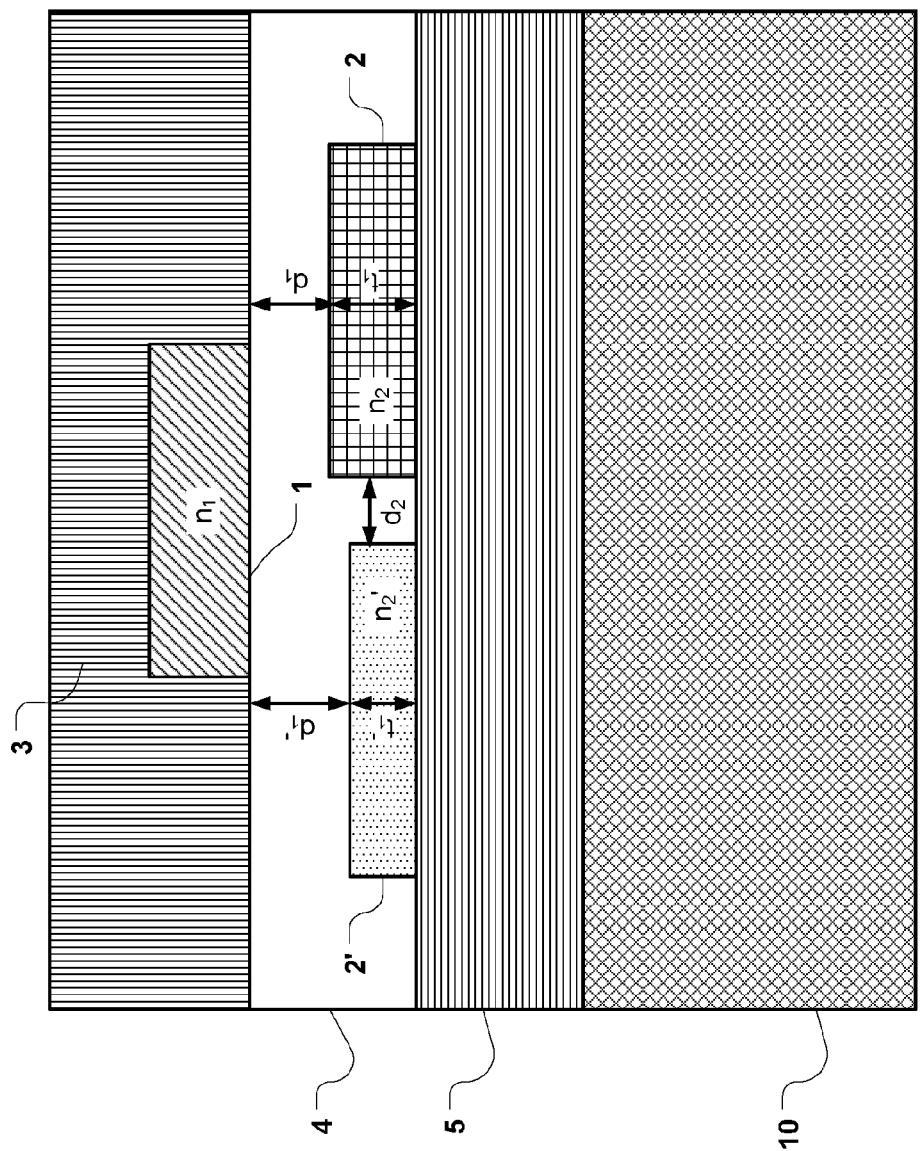

The very high efficiency dependency on the polarization can be used as an advantage in the case where one aims at separating the two polarizations. While polarization dependency of the proposed solution is advantageous in such applications, such polarization dependency is not necessarily a drawback. The following embodiments describe polarization mode recombination after coupling:

FIGS. 10a, 10b and 10c illustrate an embodiment providing simultaneous (double) coupling of both polarizations of an optical signal. Double coupling into a bundle of waveguides can be realized by placing the second waveguide 2 and a third waveguide 2' in proximity to the first waveguide 1. Also, since the optimal high refractive index material thickness has to be tuned differently for each polarization, the second waveguide 2 and said third waveguide 2' are of different thicknesses, as well the coupling lengths 6, 6' are optimized separately for the high refractive index material waveguides 2, 2'.

With the second waveguide 2 and the third waveguide 2' placed side to side in the bundle, recombination can be achieved by merging the second waveguide 2 and the third waveguide 2' at some (downstream) point, for example through a Y junction, to add the two polarizations together into a single waveguide. Difference in thicknesses (7) t1, t1' between the second 2 and the third 2' waveguides are illustrated in FIG. 10b.

Figure 11A:
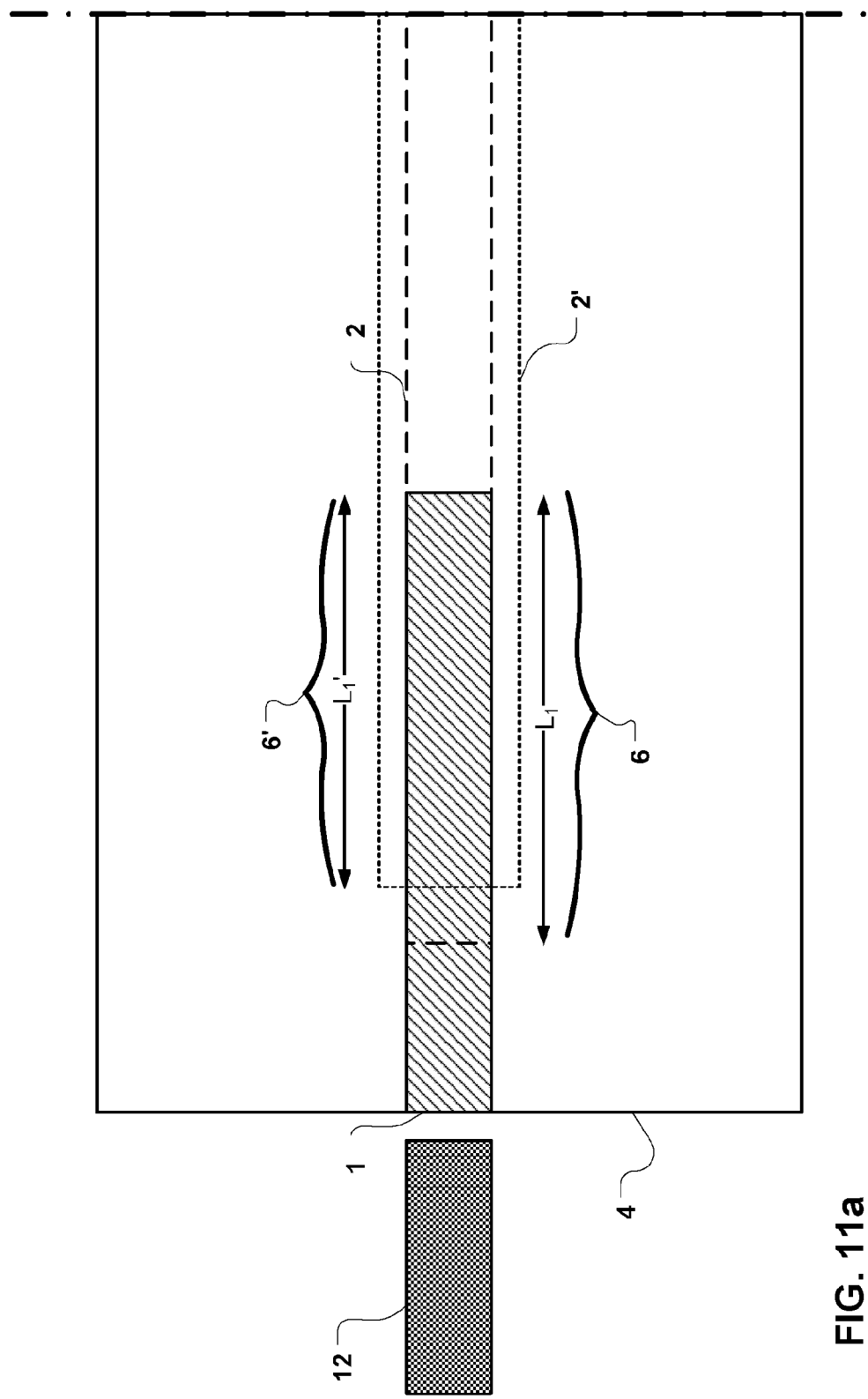
FIG. 11a is a schematic diagram illustrating, in accordance with a further embodiment of the proposed solution, a top view of a directional coupler structure where an input optical signal is coupled from a single intermediary waveguide to two high refractive index waveguides simultaneously, the two high refractive index waveguides being located one above and one below of the intermediary waveguide addressing a polarization dependency of the proposed solution.
Figure 11B:
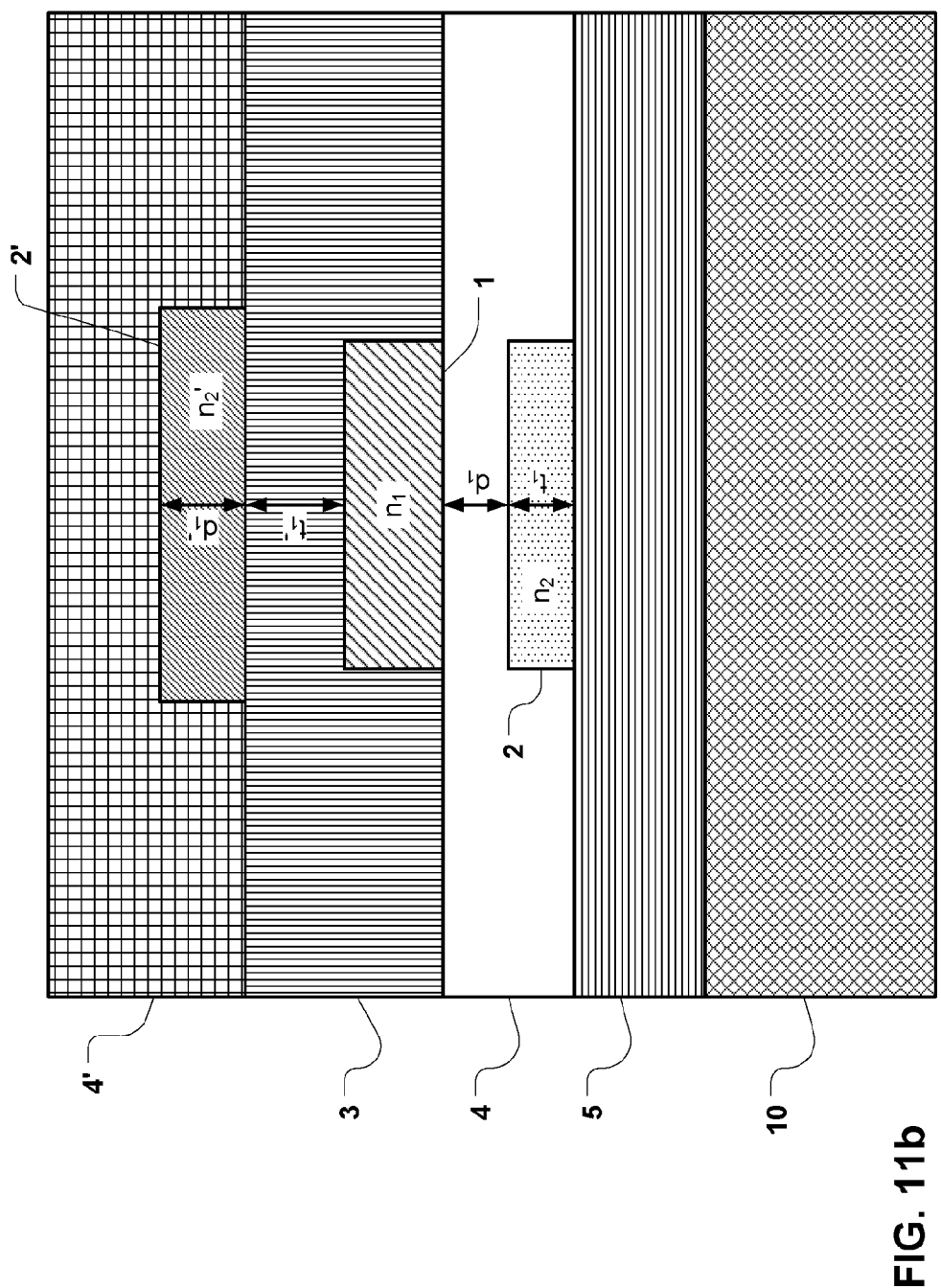

FIGS. 11a and 11b illustrate another embodiment providing simultaneous (double) coupling of both polarizations of an optical signal. The second 2 and third 2' waveguides in the bundle are placed under and above the first waveguide 1. Again, the thickness (7) and the coupling lengths 6, 6' of the second waveguide 2 are optimized differently than those of the third waveguide 2'.

Figure 12:
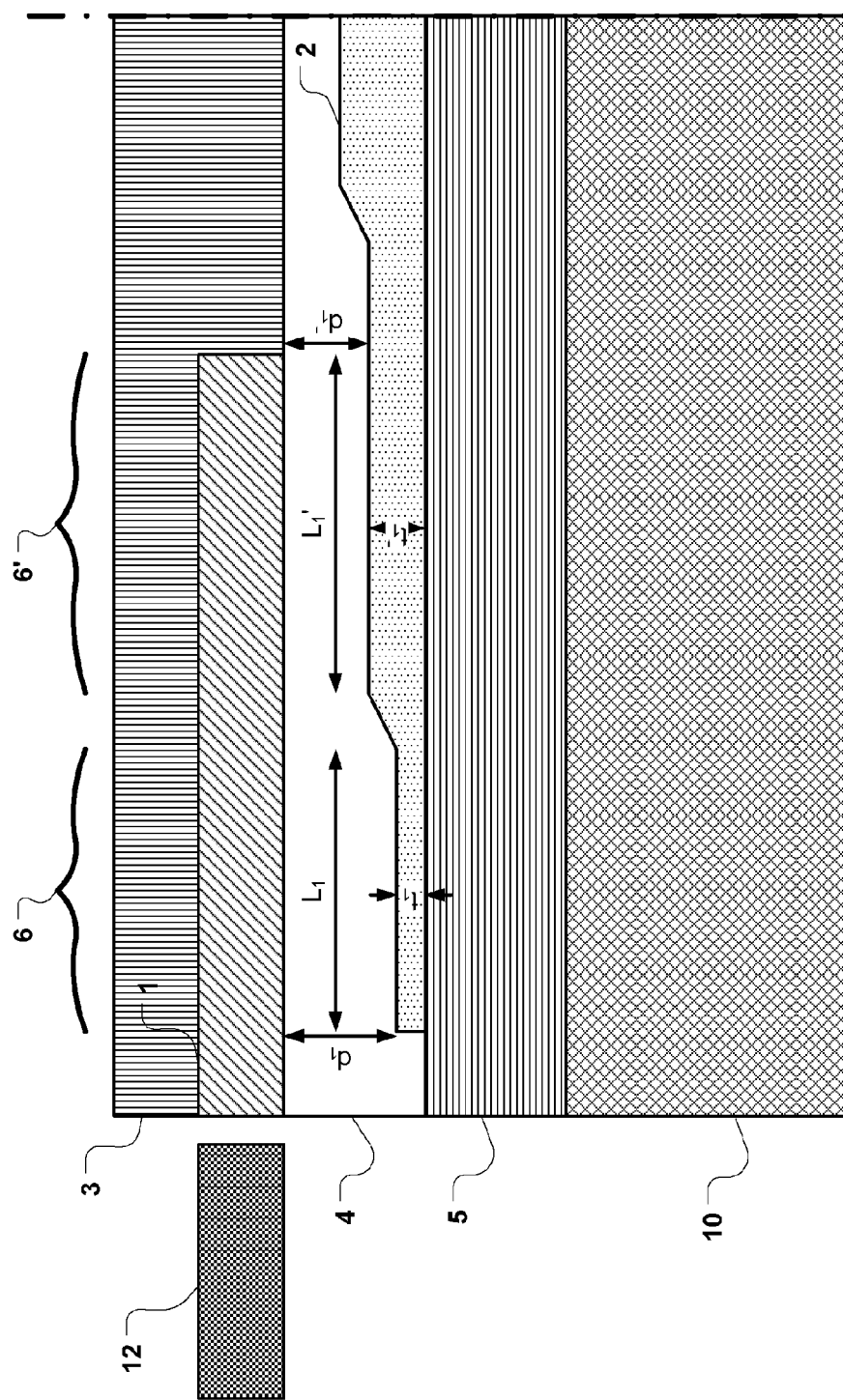
FIG. 12 is a schematic diagram illustrating, in accordance with a further embodiment of the proposed solution, a side view of a structure where the high refractive index waveguide includes multiple sections of different thicknesses within the coupling region to optimize both TE and TM directional coupling into a single high refractive index waveguide.

FIG. 12 illustrates an embodiment providing simultaneous (double) coupling of both polarizations of an optical signal and recombination into the same waveguide 2. The second waveguide 2 has two different sections defined by at least two different thicknesses t1, t1'. The first section has a thickness t1 and coupling length 6 optimized for the coupling of a first polarization state and the second section has a thickness t1' and coupling length 6' optimized for the coupling of the second polarization state.

While not shown, different materials can be employed for the fabrication of the second 2 and the third 2' waveguides in order to provide simultaneous coupling both polarization into respective semiconductor waveguides 2, 2'.

The invention is not limited to one layer SOI-CMOS chips, and applies equally to chips having multiple layer waveguide structures, for example biochips and telecommunications chips. FIG. 13a is a schematic diagram illustrating, in accordance with a further embodiment of the proposed solution, a side view of a coupler structure having at least four waveguide layers. Also, the invention is not limited to coupling optical signals traveling from outside of the chip to inside the chip and vice-versa, the signal coupling techniques described herein can be adapted to transfer an optical signal from layer to layer of a multilayer waveguide chip as illustrated in FIG. 13a. Intermediary waveguides transferring optical signal between layers are referred to as transfer waveguides.

Figure 13B:
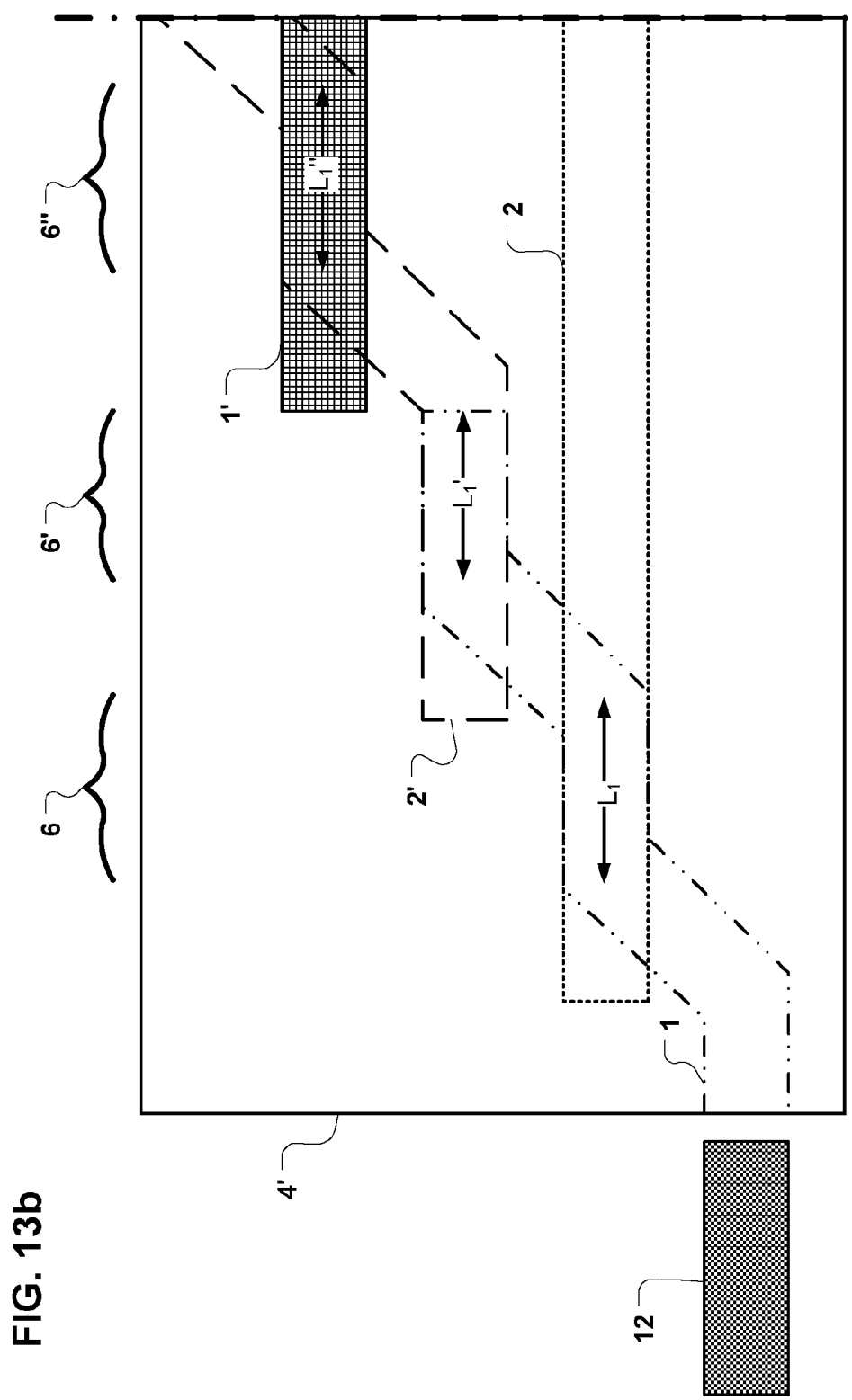

FIG. 13b is a schematic diagram illustrating a top view of the same coupler structure illustrating that only some of the waveguides (1) need to be compatible in terms of butt-coupling with optical fibers.

While the above description has made reference to butt-coupling on chip die side facets, the invention is not limited thereto: FIG. 14a illustrates an upturned intermediary waveguide 1 enabling a butt-coupling with an optical fiber 12 on a top chip die surface. Alternatively, (not shown) the optical fiber 12 could itself be bent instead of the intermediate waveguide 1.

Figure 14B:
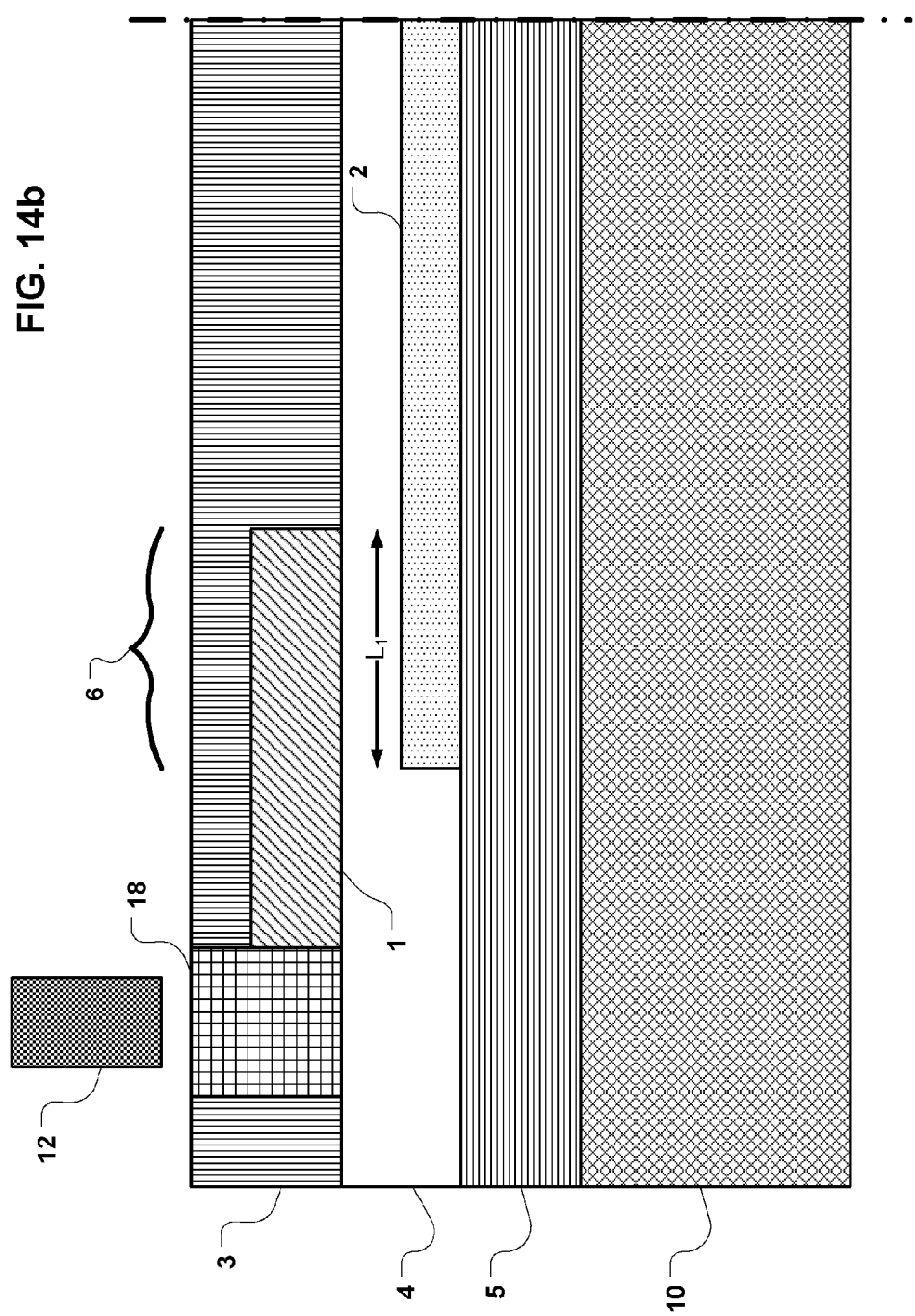
FIG. 14b is a schematic diagram illustrating, in accordance with a further embodiment of the proposed solution, a side view of a structure where the intermediary waveguide includes a structure for redirecting the optical signal into the waveguide plane and allowing a butt-coupling from the top of the chip.

Similarly FIG. 14b illustrates the use of an input waveguide block structure 18 configured to provide butt-coupling between the optical fiber 12 and the intermediary waveguide 1 enabling a butt-coupling of the optical fiber 12 on a top chip die surface. The input structure 18 redirects the optical signal into the waveguide 1 plane.

For packaging and socket type optical signal coupling purposes, curved waveguides and/or input/output waveguide block structures (18) can be employed for ensuring correct alignment. In some implementations a microscope can be employed to ensure correct alignment, with reference to FIGS. 2d, 2e, 10a and 10b some degree of misalignment can be tolerated. (Further packaging details are presented herein below with reference to FIGS. 3a, 3b, 3c, 4a, 4b, 4c, 5a, 5b, 5c, 16a, 16b and 16c)

Figure 15A:
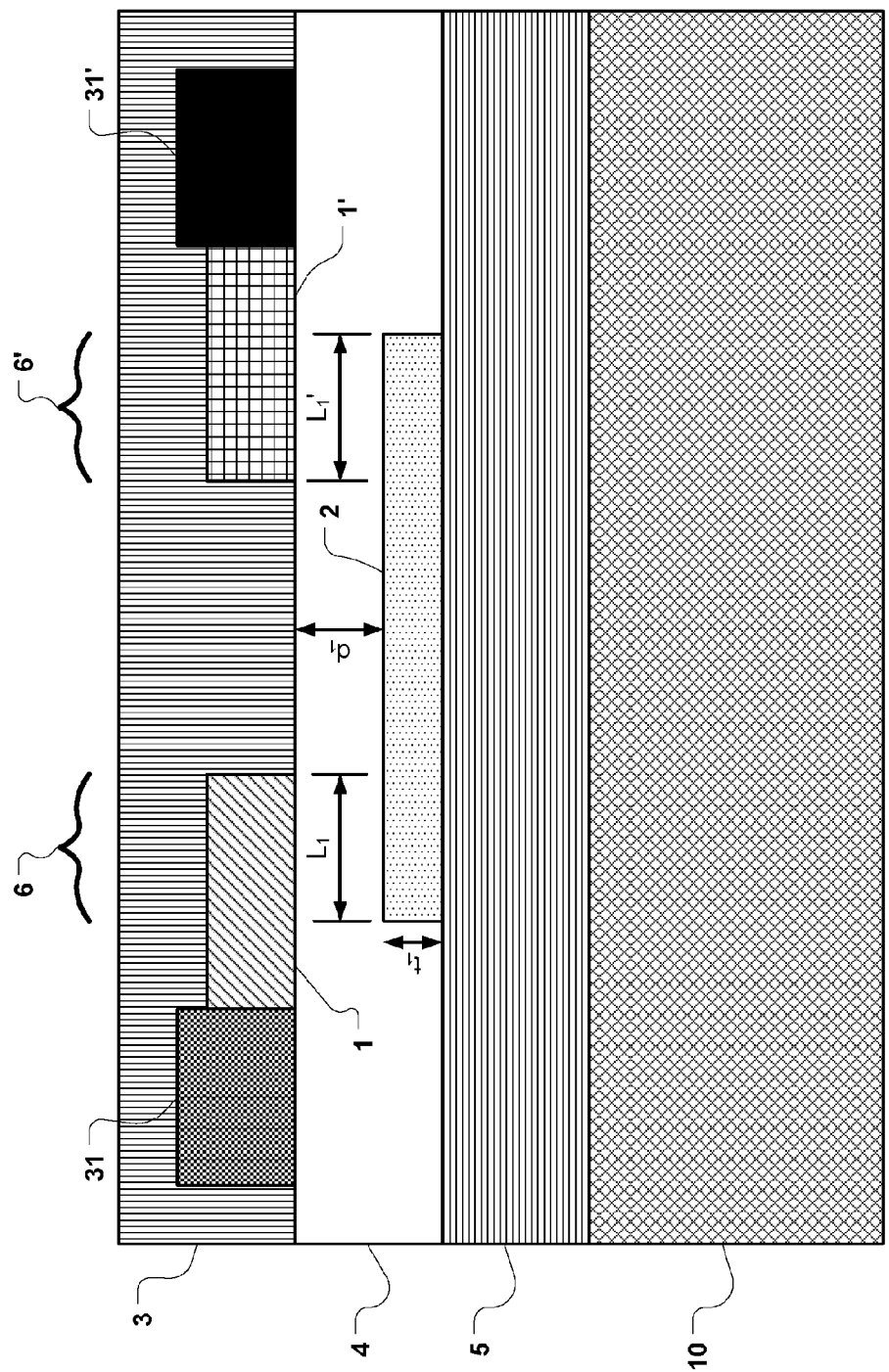
FIG. 15a is a schematic diagram illustrating, in accordance with a further embodiment of the proposed solution, a side view of an optical signal transport structure between light sources built on a chip.
Figure 15B:
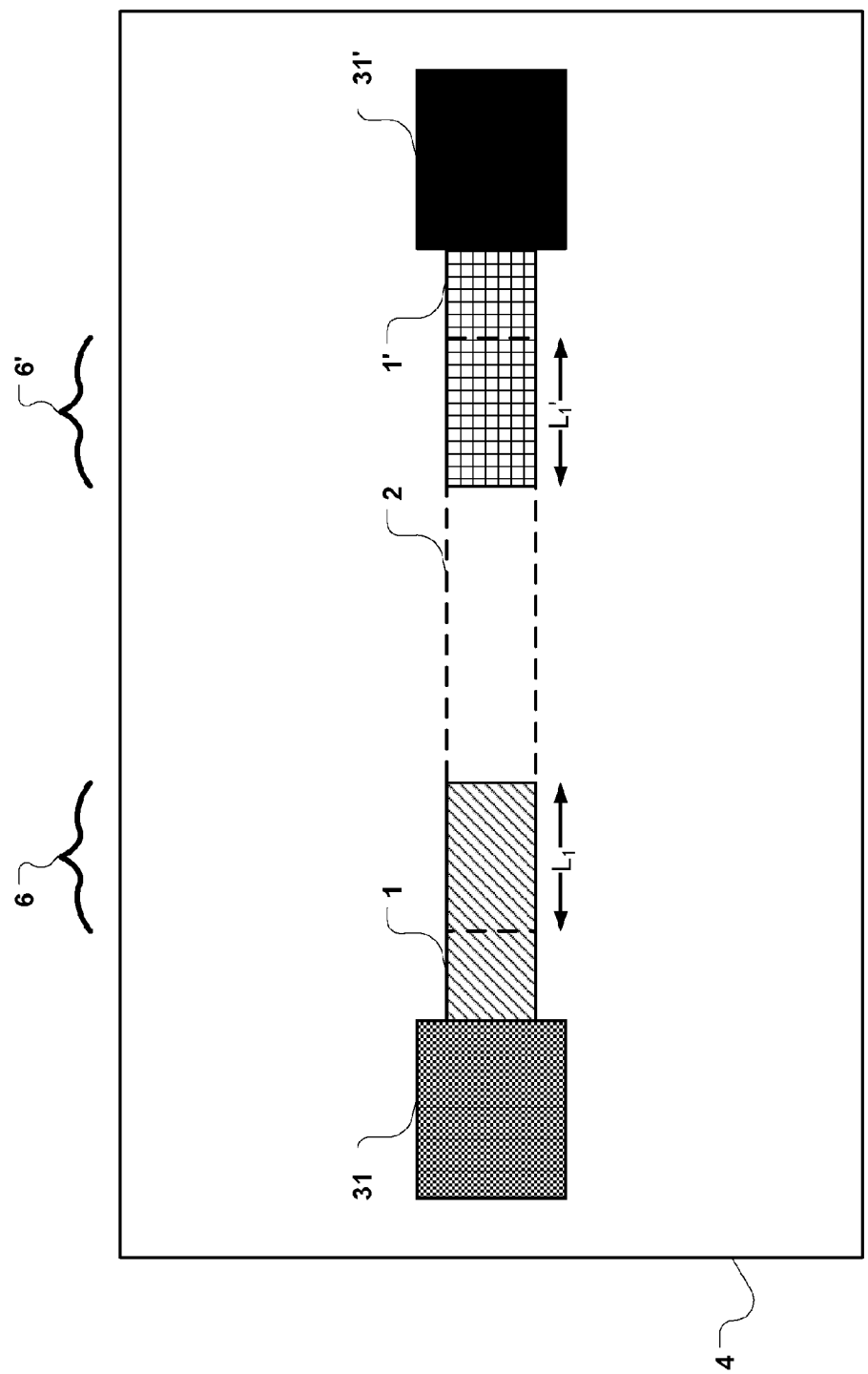

The invention is not limited to external generation of the optical signal. FIGS. 15a and 15b are schematic diagrams illustrating, in accordance with a further embodiment of the proposed solution, an optical signal transport structure between light sources 31 and/or photodetectors 31' mounted on the same chip.

Figure 16A:
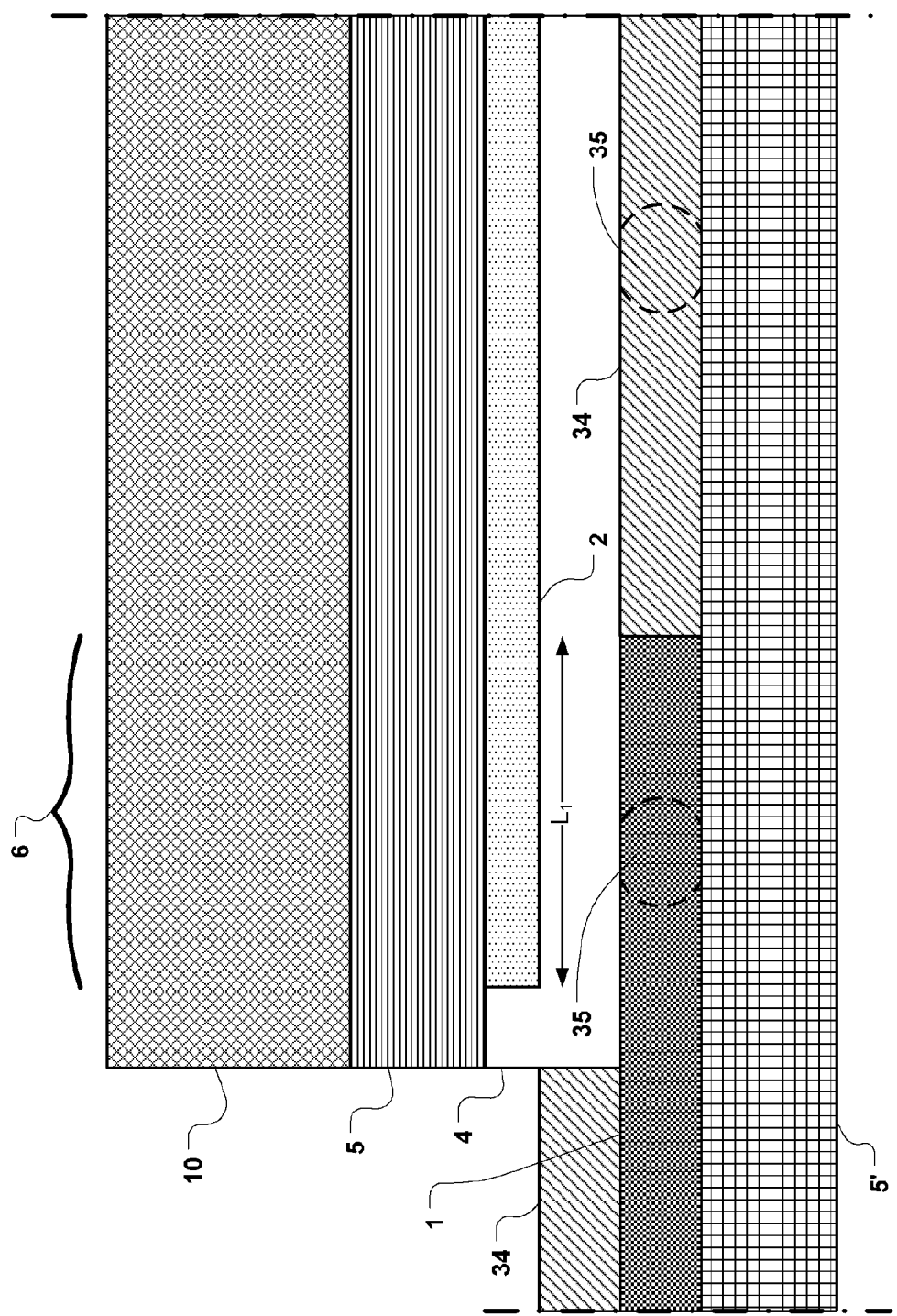
FIG. 16a is a schematic diagram illustrating, in accordance with a further embodiment of the proposed solution, a side view of a flip-chip packaged device, wherein the low refractive index waveguide is built into the package and the high refractive index waveguide is built on top of the chip.
Figure 16B:
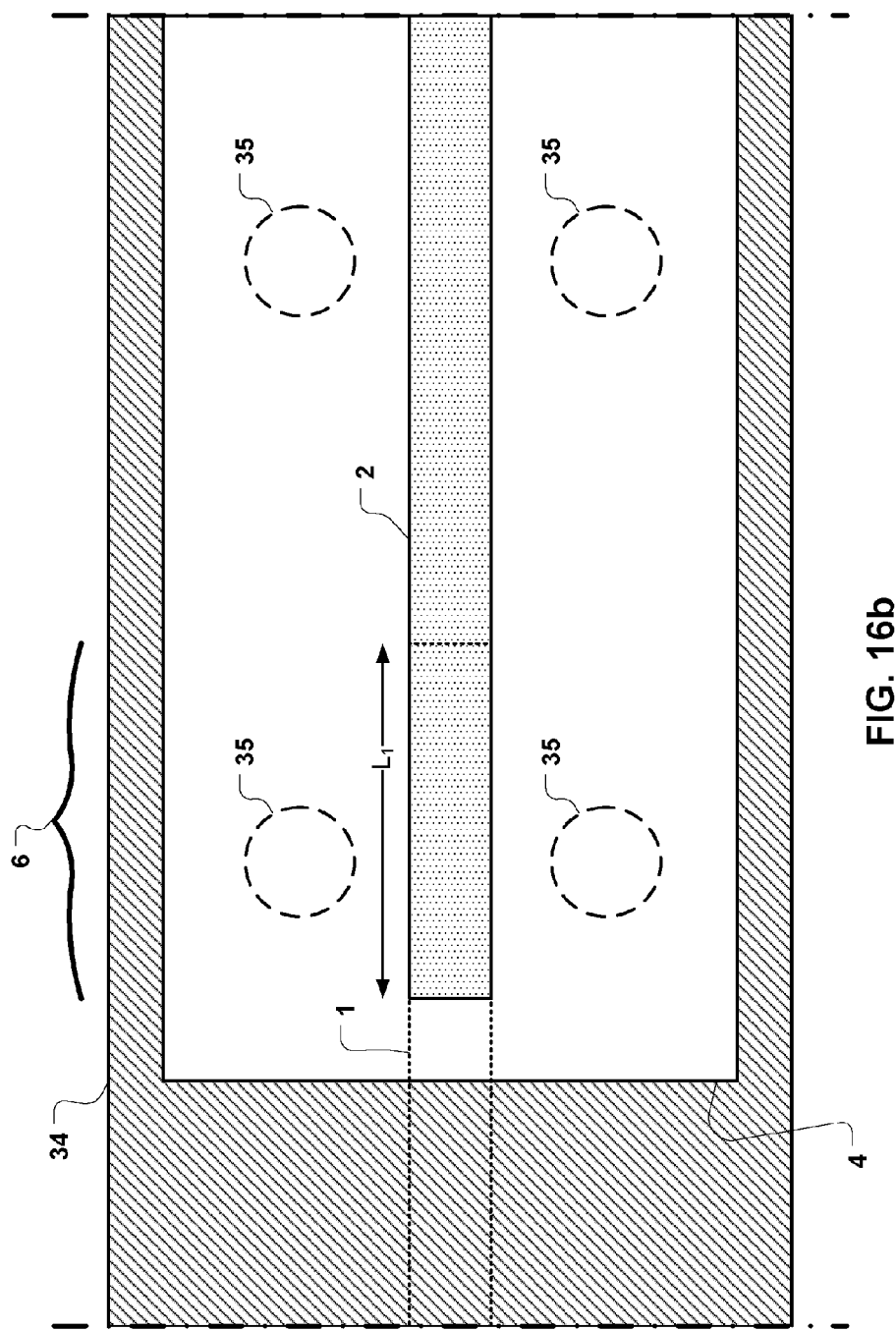
Figure 16C:
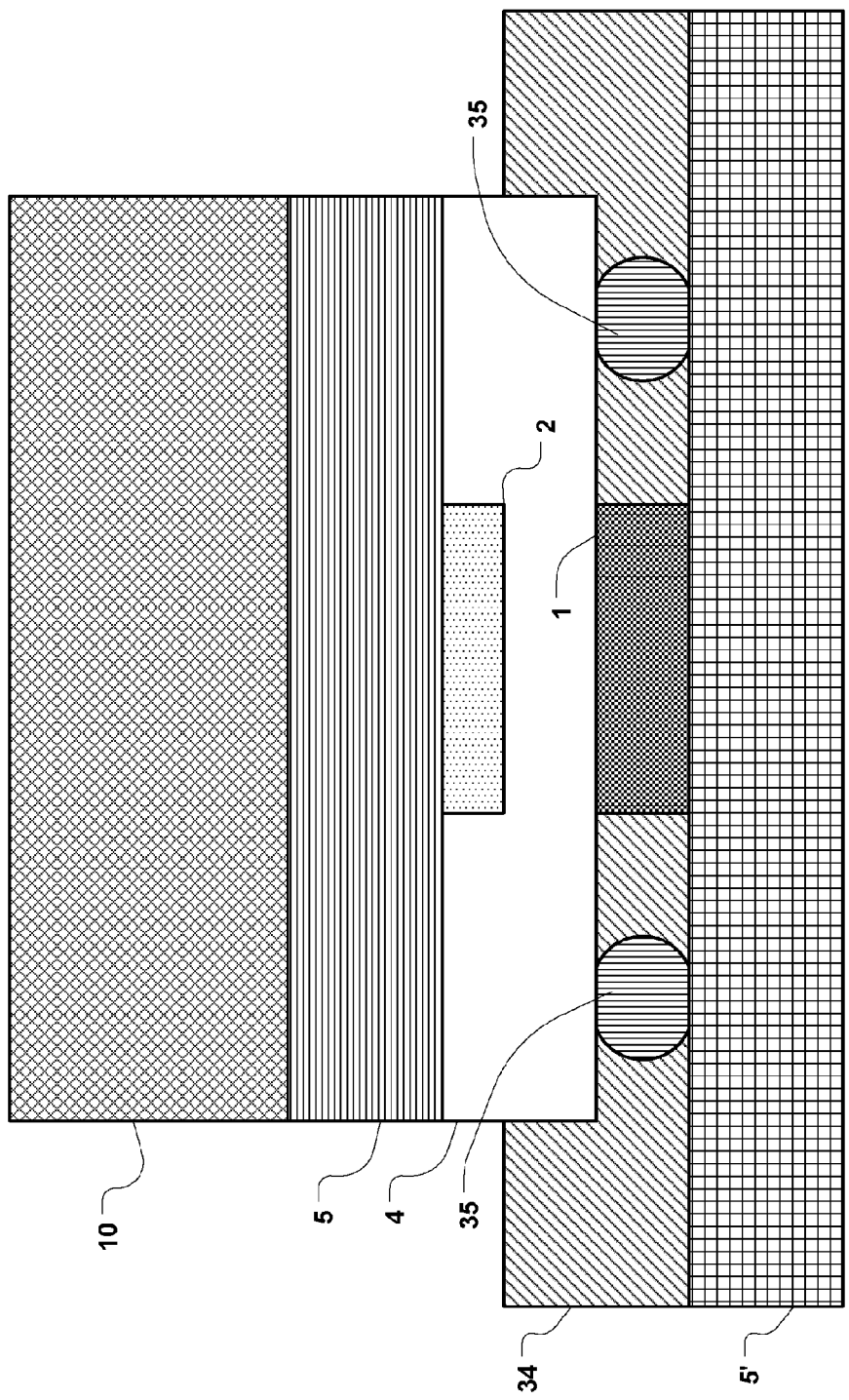

FIGS. 16a, 16b and 16c are schematic diagrams illustrating, in accordance with a further embodiment of the proposed solution, side, top and cross-sectional views of a flip-chip packaged device. The first (effective low refractive index) waveguide 1 is built into the package and the high refractive index waveguide 2 is built on top of the chip in a flipped wafer structure. A filling polymer 34 is chosen to have good optical properties and a refractive index lower than that of the effective low refractive index of waveguide 1. For example filling polymer 34 can be applied in fluid form and cured. The routing of the optical waveguides takes into account positions of flip-chip bonding contact beads 35. For certainty in FIGS. 16a to 16c top and bottom relationships are interchangeable, the layered structure would operate identically if all layers were illustrated in reverse vertical order as illustrated with reference to FIGS. 5a to 5c. The only reason FIGS. 16a to 16c have the illustrated orientation is to simplify understanding of the application of the filing polymer 34 in a single step. When waveguide(s) 1 are provided in a socket providing attachment to a chip including waveguide 2, filling polymer 34 can be omitted assuming that refractive index requirements are present or replaced by another structure not requiring fluid form application having the requisite refractive index. Curing of a fluid filling polymer 34 may or may not be required. Filling polymer 34 can also include a gelatinous material having high viscosity (and/or variable viscosity).

While packaging details presented herein above with reference to FIGS. 3a, 3b, 3c, 4a, 4b, 4c, 5a, 5b, 5c, 14a, 14b, 16a, 16b and 16c have concentrated on vertical alignment, xy-alignment mentioned herein above with reference to FIG. 5 can be provided for implementing packaging aspects and features for example to implement a socket for optical signal coupling to and from an integrated chip. With reference to an inverted FIGS. 16a and 16c, the flip-chip layered structure including layers 5' and 1 separately fabricate for example as a socket, can be positioned with respect to the layered structure including layers 10, 5, 4 and 2 on a mounted chip by employing at least one alignment structures. In some implementations a microscope can be employed to ensure correct alignment, with reference to FIGS. 2d, 2e, 10a and 10b some degree of misalignment can be tolerated.

For vertical alignment, beads 35 and/or V-groves as illustrated in FIGS. 3b, 3c, 4b and 4c can be employed. Sockets having an array of optical fiber waveguides 1 corresponding to an array of on-chip waveguides 2, need not necessarily have circular cross-section cores and/or circular cross-section claddings. Furthermore, when V-groves are employed for vertical alignment of a waveguide 1 array, V-groves are not required for each optical fiber. A combination of V-groves and beads 35 can also be employed.

Alignment structures, for example employing beads 35 and/or V-groves (FIGS. 3b, 3c, 4b and 4c) can also be employed for xy-alignment or at least one waveguide 1. When an array of waveguides 1 of a socket are to be coupled to an array of waveguides 2 on a chip, the invention is not limited to a one-to-one correspondence between xy-alignment structures and waveguides in corresponding arrays. Properties of polymer 34 alluded to above can for example be provided by a gelatinous material of high viscosity (and/or variable viscosity) which may or may not require curing.

With optical signal coupled into the thinned (second) semiconductor high refractive index waveguide 2, the optical signal continues propagation along semiconductor waveguide 2 to interface with the rest of the chip. In accordance with one implementation, optical circuitry of the chip could consist only of semiconductor waveguides having a thickness substantially equal to the optimal thickness high refractive index waveguide 2 at the coupling device. In accordance with another implementation, a transition between thinned semiconductor waveguides 2 configured for coupling optical signals and regular thickness semiconductor waveguides is provided. The transition is configured to minimize optical signal losses, for example by gradually (smoothly) varying the thickness. In certain applications abrupt transitions can also be employed (to generate desired effects).

Figure 17A:
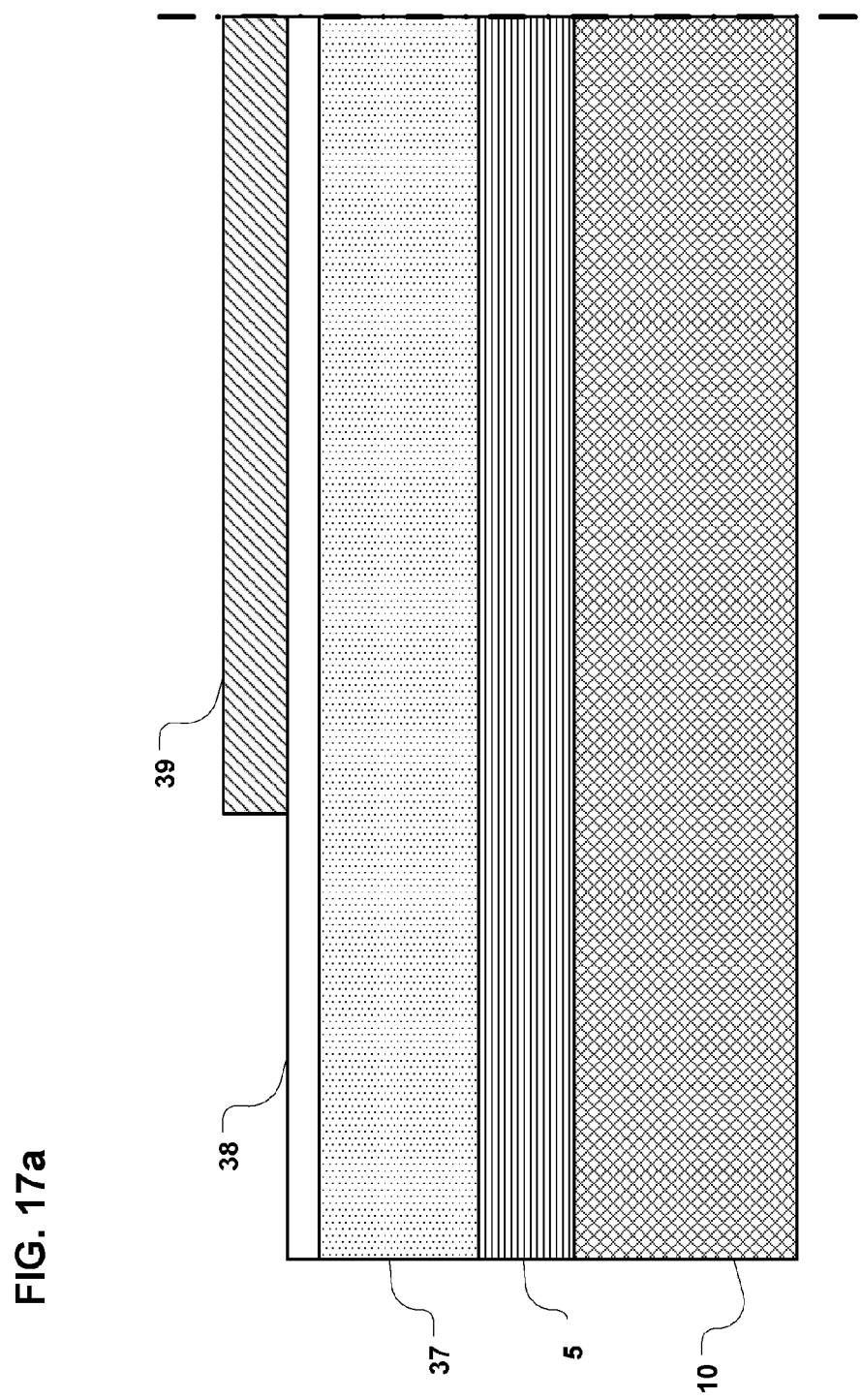
FIG. 17a is a schematic diagram illustrating a side view of a first process step of a LOCal Oxidation of Silicon (LOCOS) process for tuning the high refractive index waveguide layer thickness in accordance with the proposed solution, process step which includes depositing an oxidation mask.

FIG. 17*a* is a schematic diagram illustrating a first step of a LOCal Oxidation of Silicon (LOCOS) process for wafer level fabrication of semiconductor waveguides 2 of controlled thickness. A cover material layer 39 deposited on top of a silicon layer 38, acts as an oxidation mask (barrier) to silicon layer 37 to be oxidized. Without limiting the invention, layer 39 includes silicon nitride however other oxidation mask materials can be employed. The thickness of the barrier layer 39 has to be large enough to block oxygen diffusion therethrough. Layer 38 for example consists of silicon dioxide and can be used to prevent delamination of the oxidation mask layer 39. The thickness of the oxide layer 38 can be a few tenths of a nanometer.

Figure 17B:
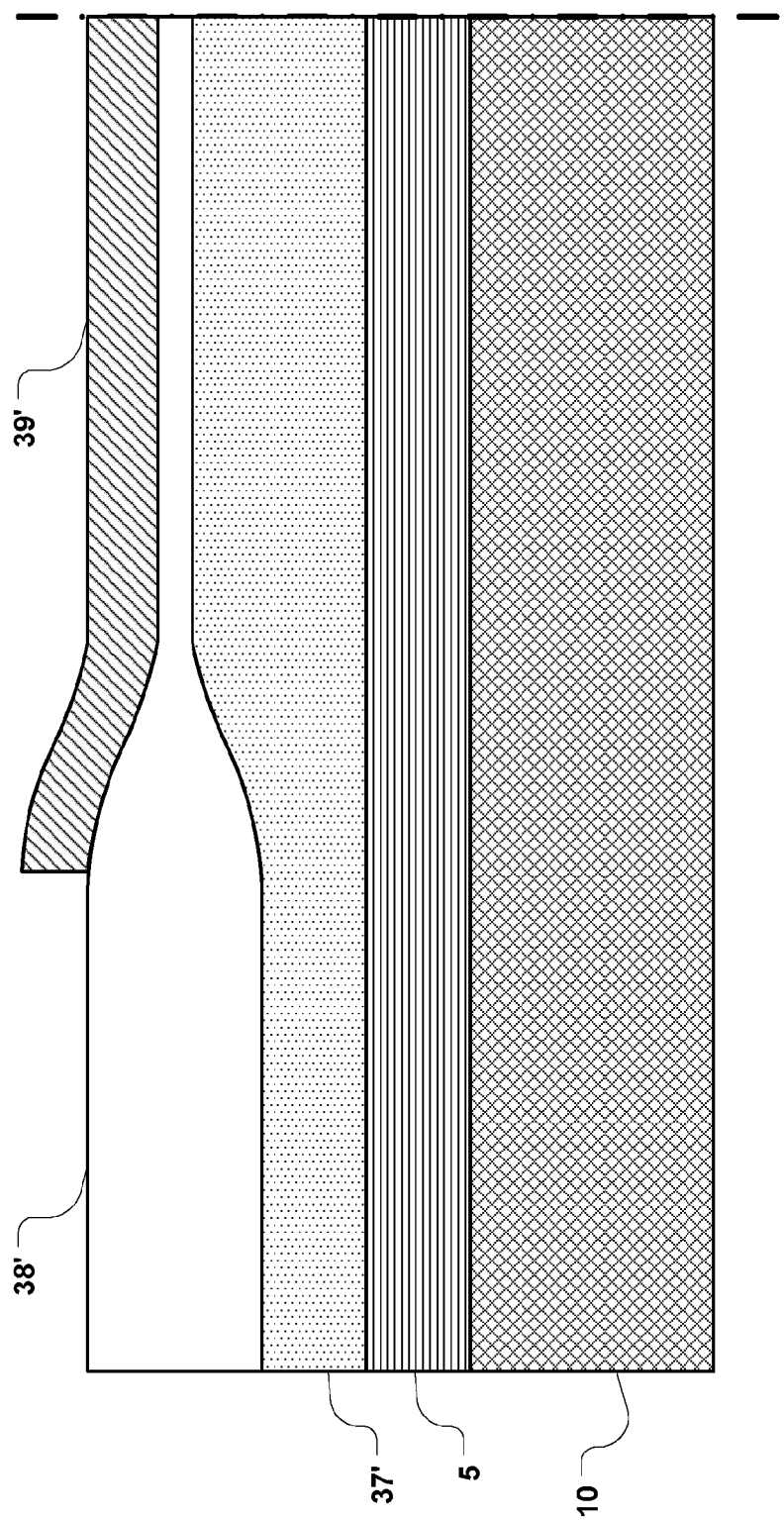
FIG. 17b is a schematic diagram illustrating a side view of a second process step of the LOCOS process for tuning the high refractive index waveguide layer thickness.

FIG. 17*b* is a schematic diagram illustrating a second step of the LOCOS process. Layer 38 is known as a silicon dioxide growth layer when exposed to high temperature oxidation. The oxide growth from the silicon layer 37' is limited by oxygen diffusion and has a tendency to produce a smooth transition between masked and unmasked regions. Oxidation control in this step provides thickness selection (control) in the high refractive index waveguide. For example, the silicon high refractive index waveguide layer is thinned down to a thickness between 20 nm and 200 nm by use of a standard oxidation process or an etching process.

Figure 17C:
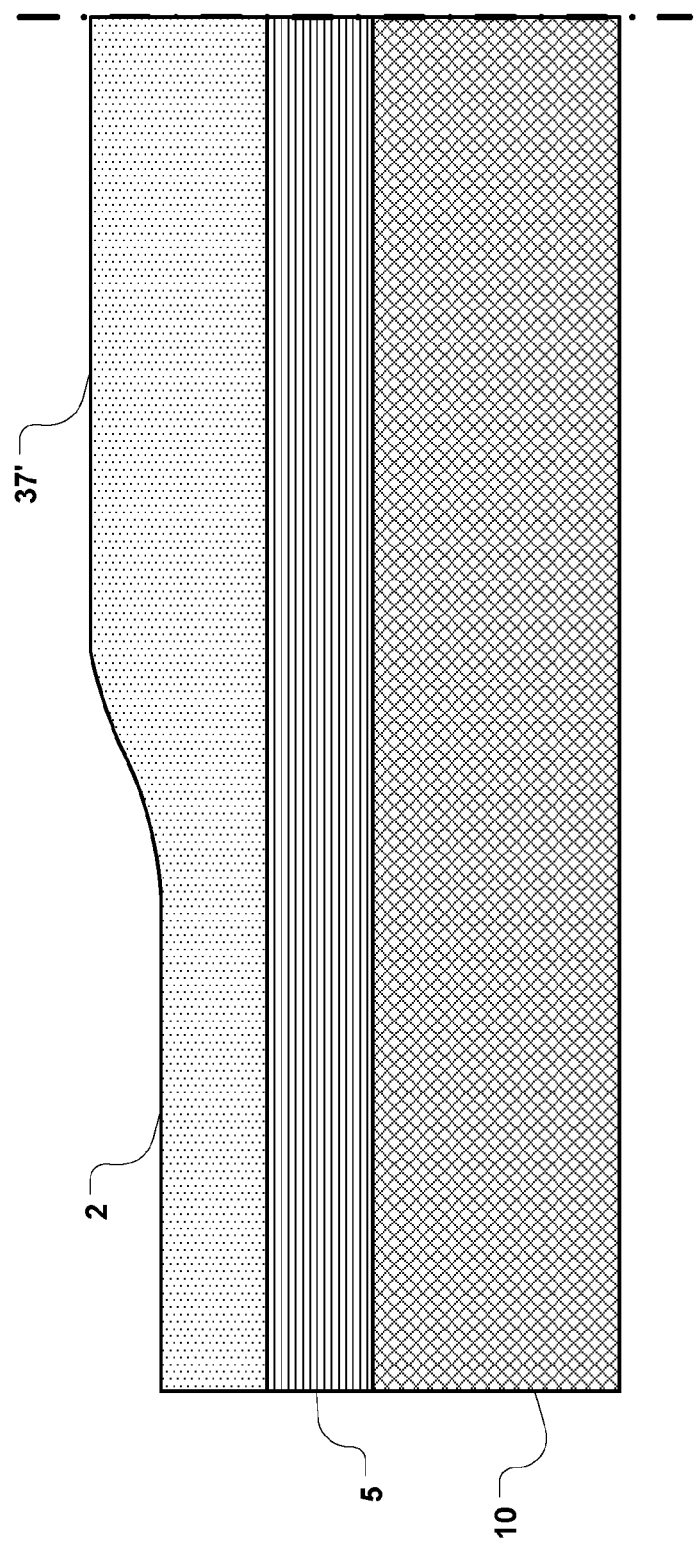
FIG. 17c is a schematic diagram illustrating a side view of the outcome of a LOCOS processed region, wherein the thinner part of the silicon layer forming the high refractive index waveguide is tuned for optimal optical power transfer from or to a dielectric (transient) waveguide.

FIG. 17*c* is a schematic diagram illustrating a third step of the LOCOS process, where the masking layer and the deposited silicon dioxide growth layer have been removed. The removal procedure, for example includes a selective hydrofluoric acid based etch. The resulting silicon layer thickness is optimized for optical coupling with the low refractive dielectric transient waveguide (intermediary waveguide) 1 in the unmasked regions.

For certainty, the invention is not limited to the silicon layer 37, for example germanium, III-V materials, etc. useful for optoelectronics can also be employed.

Figure 18A:
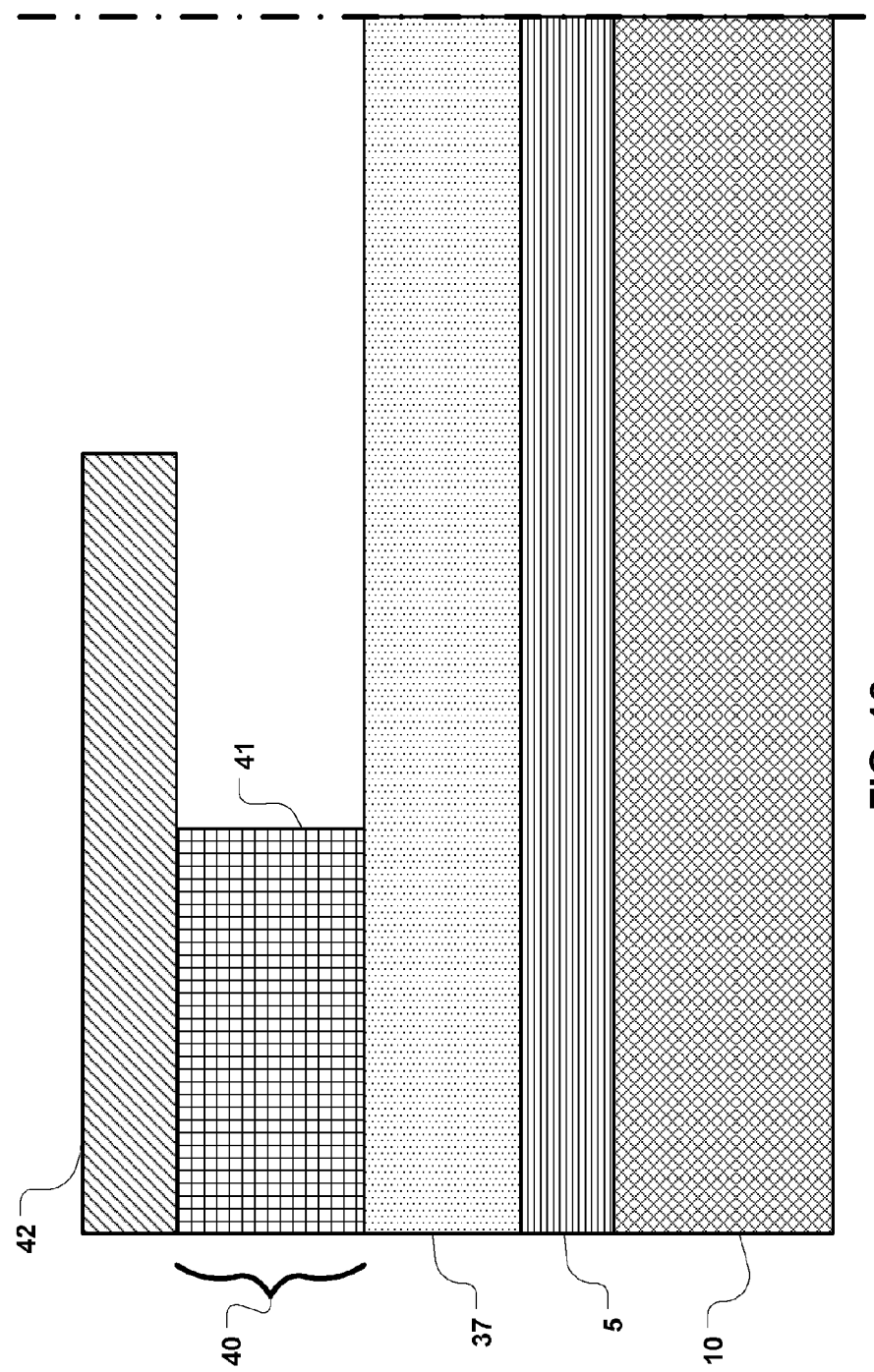
FIG. 18a is a schematic diagram illustrating a side view of a shadow mask structure fabricated on top of a wafer in accordance with the proposed solution.

FIG. 18*a* is a schematic diagram illustrating a first step of a shadow masking process. Support blocks 41 are built from a photoresist pattern or another suitable material. A shadow mask 42 is also built from a photoresist or another suitable material, for example a bonded silicon wafer or deposited metal layers.

Figure 18B:
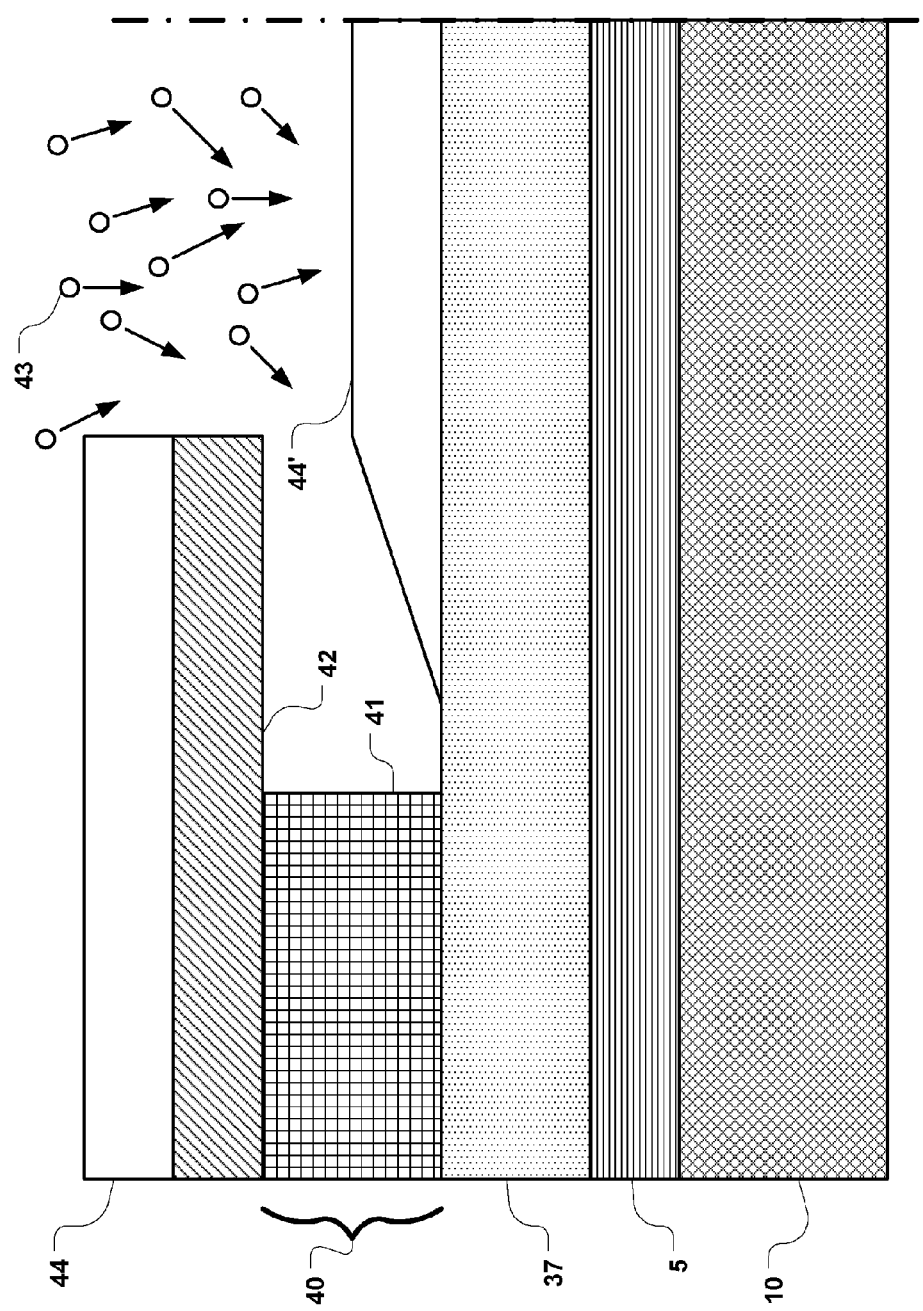
FIG. 18b is a schematic diagram illustrating the effect of a shadowing mask during a chemical or physical deposition procedure (CVD, Sputtering, etc.)

FIG. 18*b* is a schematic diagram illustrating a second step of the shadow mask process. Either, the high refractive index waveguide material 37 or a suitable masking material 44, 44' could be deposited employing a chemical or physical deposition procedure (CVD, Sputtering, etc.). It is noted that the shadow mask could also be used to directly etch the high refractive index waveguide layer 37 to thin it down to an optimal thickness. Shadow masking has proven to be efficient in both deposition and etching. The spacing 40 between the shadow mask 42 and the wafer surface affects the transition profile leading to a tapered transition.

FIG. 18*c* is a schematic diagram illustrating a third step of the shadow mask process, wherein the shadow mask is removed which leaves the deposited layer 44 having a smooth transition between the fully exposed region and the shadowed region. It is noted that a similar transition would have been left subsequent to etching in the second step.

Figure 18D:
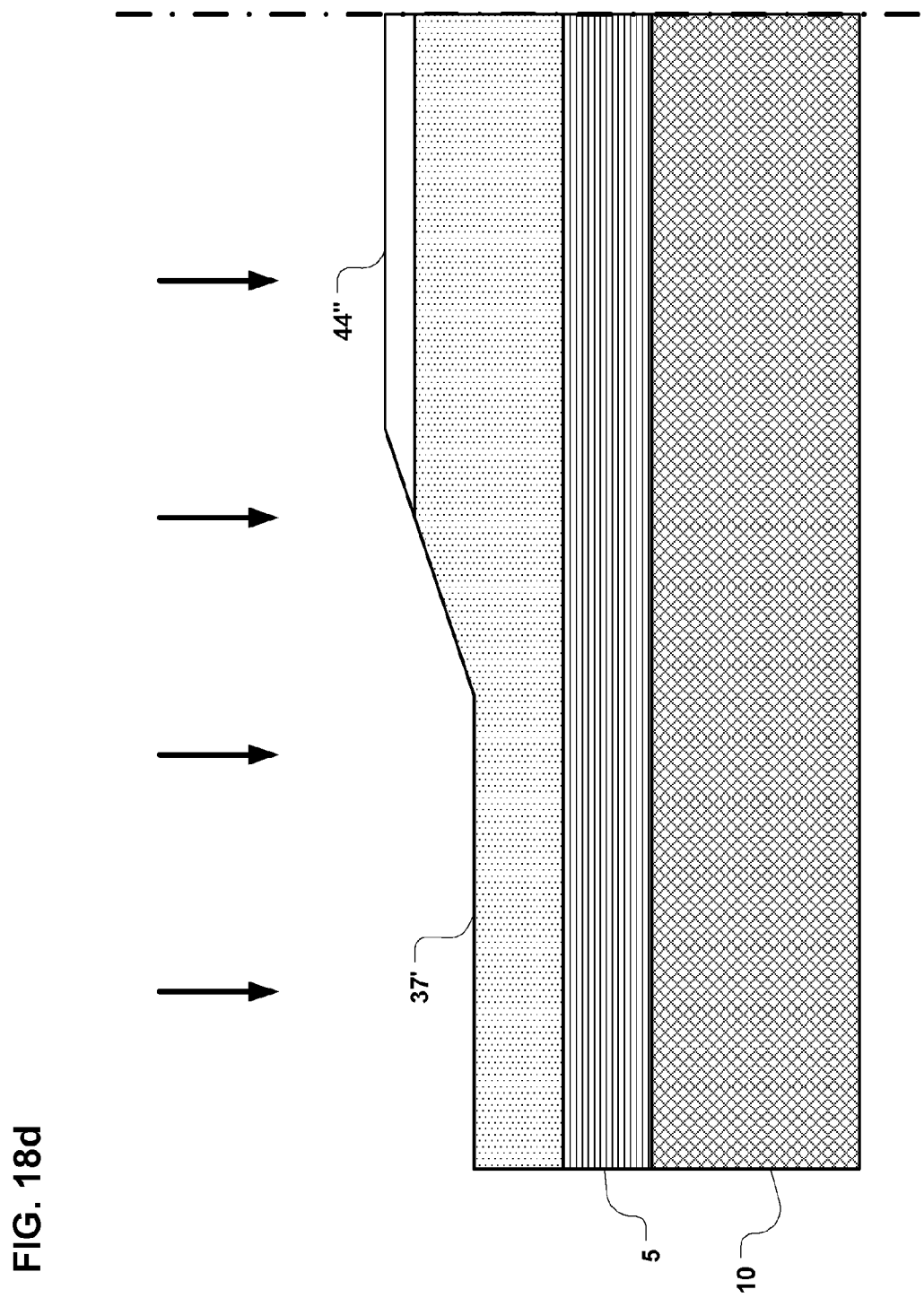
FIG. 18d is a schematic diagram illustrating the result of an etching process performed on the layered structure of FIG. 18c.

FIG. 18*d* is a schematic diagram illustrating a fourth step of the shadow mask process, where the tapered etch mask 44' profile is transferred to the high refractive index waveguide layer 37' removing both mask 44' and high refractive index waveguide material in substantially equal amounts, as the mask 44' retreats. Such removal can be provided via various means, including chemical (etching), physical (plasma etching, ablation), etc. The tapered region provided by the deposition in the presence of a separated shadow mask results in a high refractive index waveguide regions of different thickness, wherein the first region (2) is tuned for optimal optical power transfer from or to a (dielectric) waveguide 1. The remaining waveguide layer 37' has a smooth transition between the masked and unmasked regions.

Figure 18E:
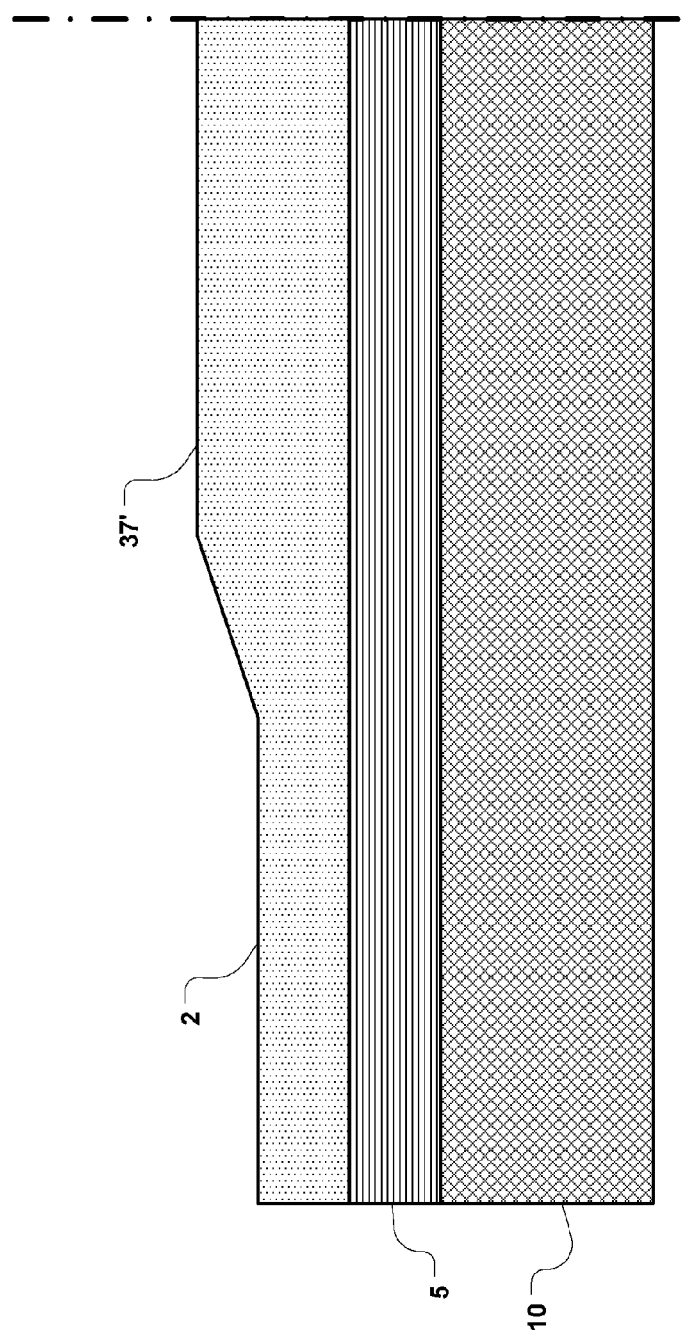
FIG. 18e is a schematic diagram illustrating the result of removing the etching mask from the layered structure of FIG. 18d.

FIG. 18*e* is a schematic diagram illustrating a fifth step of the shadow mask process, wherein any masking material 44' is selectively removed, only the high refractive index waveguide layer 37' remains forming the semiconductor waveguide 2.

Figure 19A:
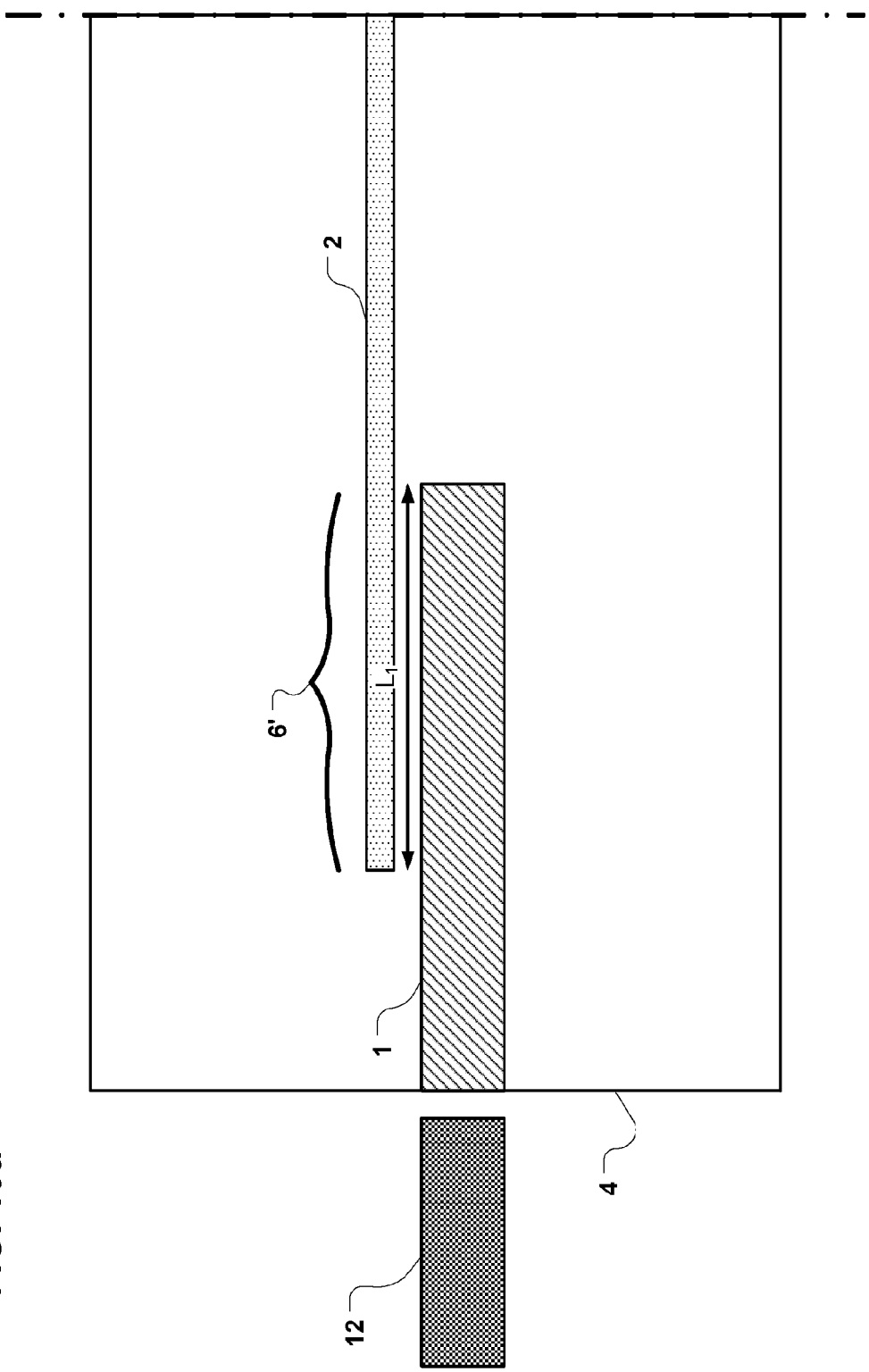
FIG. 19a is a schematic diagram illustrating the top view of an embodiment wherein the effective index of the high refractive index waveguide is tuned by defining its width.
Figure 19B:
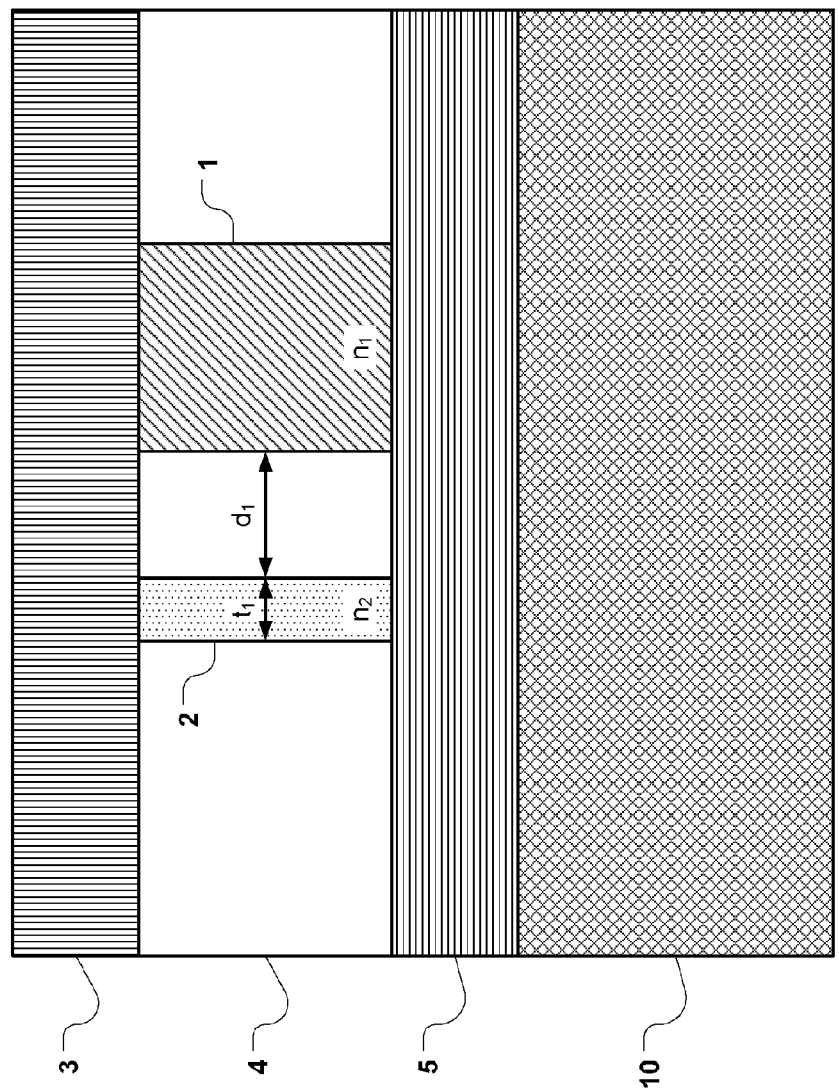
FIG. 19b is a schematic diagram illustrating a cross-sectional view of the device of FIG. 19a, *wherein similar features bear similar labels throughout the drawings.*

FIGS. 19*a* and 19*b* are schematic diagrams illustrating, in accordance with the proposed solution, top and cross-sectional views of yet another embodiment wherein the low refractive index (transient) waveguide 1 and the high refractive index waveguide 2 are built side by side on a wafer 10. A high performance etching process is employed to achieve the illustrated aspect ratios in the high refractive index waveguides, for example employing a shadowing mask during deposition.

Applications:

The proposed solution can be applied to the chip-to-chip optical interconnects for CMOS integrated circuits. With standard device layer thickness of about 220 nm, efficient directional coupling cannot take place between a standard optical waveguide having a standard effective index between 1.4 and 1.6. By thinning down some regions of the silicon device layer to an optimal coupling thickness, SOI CMOS chips can be manufactured to enable light coupling to and from an optical waveguide made of a low refractive index material which is used to link two or more CMOS chips. (FIGS. 5*a* to 5*c*)

The proposed solution can be also applied to in/out coupling of an optical signal for high intensity evanescent field biosensors. Such sensors require a high refractive guiding index layer to produce a high intensity evanescent field right above the waveguide layer which the proposed solution provides. Otherwise, in such configurations, butt-coupling to an optical fiber is known to be inefficient.

With reference to FIGS. 13*a* and 13*b*, the proposed solution can be employed to implement an intra-chip inter-layer optical signal transfer between multiple layers. Such structures can be used in microelectronic chips and bioelectronic devices.

With reference to FIGS. 15*a* and 15*b*, the proposed solution can be employed to implement an optical coupling internal to a chip between optical sources and detectors are implemented directly on the chip.

Simplicity of fabrication is one of the advantages of the proposed solution. Very high optical signal injection efficiency into a high refractive index material can be obtained by employing low resolution lithographic techniques. The proposed solution essentially provides a 2D solution to address the problem. Furthermore, this permits employing a large variety of materials, including germanium based semiconductor materials and materials characterized as III-V semiconductors which are useful for optoelectronics.

Another advantage of the proposed solution is derived from a much reduced sensitivity to misalignment (FIG. 2e), which is of a great benefit in chip packaging (embedding the chip die in resin).

Another advantage provided by the proposed solution is derived from facet injection (chip edge injection) which permits very easy alignment. This is important because, currently a large fraction of chip component packagers are reluctant to adopt surface injection.

The single inconvenience of the proposed solution stems from polarization dependence. A choice must be made between coupling the incident TM mode or the incident TE mode. Little importance is ascribed to such inconvenience, because many existing low cost solutions can be employed to change the polarization outside of the chip or on chip. For example, in certain applications, this shortcoming can be employed strategically, purposefully, to produce an incident wave separation effect, for example to implement a beam splitter. The polarization dependence can be highly diminished by reducing the width of the high refractive index waveguide to a dimension of the order of that of the thickness thereof.

For certainty while extensive reference has been made to silicon semiconductor waveguides, such reference has only been made for ease of understanding. The invention is not limited to silicon based waveguides and the proposed solution also applies for example to waveguides containing germanium, III-V materials, and others which can be useful for optoelectronics applications.

While the invention has been shown and described with reference to preferred embodiments thereof, it will be recognized by those skilled in the art that various changes in form and detail may be made therein without departing from the spirit and scope of the invention as defined by the appended claims.

What is claimed is:

1. An integrated circuit physical optical Input/Output (I/O) interface for coupling at least one mode of an optical signal between a waveguide external to the integrated circuit and a high refractive index waveguide internal to the integrated circuit, the physical optical interface comprising:
a first I/O waveguide adapted to convey an external optical signal near the integrated circuit along an external signal path and having a first effective refractive index, said first I/O wavequide having a first core, said first core having a first bulk refractive index; and
a second waveguide forming part of the integrated circuit and adapted to convey an internal optical signal along an internal signal path, said second waveguide having a second effective refractive index and having a second core having a second bulk refractive index higher than said first bulk refractive index,
wherein said second core having a reduced thickness over at least a portion to exhibit a constant effective refractive index that matches said first effective refractive index of said first I/O waveguide over said at least a portion, said second core and said first core being arranged with an overlap there between and a separation distance there between over said at least a portion of said second core to permit tunnel coupling of said at least one mode of said optical signal between said internal signal path and said external signal path.

2. An integrated circuit physical optical I/O interface as claimed in claim 1, said second core comprising a material having a bulk refractive index greater than 2.

3. An integrated circuit physical optical I/O interface as claimed in claim 1, said first core comprising a dielectric material having a bulk refractive index lower than 2.

4. An integrated circuit physical optical I/O interface as claimed in claim 1, said first core comprising an optical fiber having a bulk refractive index lower than 2.

5. An integrated circuit physical optical I/O interface as claimed in claim 1, comprising an optical fiber I/O waveguide having a thin cladding dimensioned to provide said separation distance to provide said tunnel coupling with said second waveguide.

6. An integrated circuit physical optical I/O interface as claimed in claim 1, further comprising a waveguide separation layer dimensioned to provide said separation distance.

7. An integrated circuit physical optical I/O interface as claimed in claim 1, said second core thickness being configured to select one of a TE and a TM incident optical signal polarization.

8. An integrated circuit physical optical I/O interface as claimed in claim 7, said TM incident optical signal polarization being selected while employing a second core thickness exhibiting an effective refractive index matching an effective refractive index of a TM incident optical signal polarization of said first I/O waveguide, said second core thickness being greater than a second core thickness exhibiting an effective refractive index matching a TE incident optical signal polarization of said first I/O waveguide.

9. An integrated circuit physical optical I/O interface as claimed in claim 7, comprising a coupling structure configured for simultaneous TE and TM optical signal polarization coupling.

10. An integrated circuit physical optical I/O interface as claimed in claim 7, said coupling structure being configured to simultaneously couple each of said TE and TM optical signal polarization into corresponding waveguides.

11. An integrated circuit physical optical I/O interface as claimed in claim 10, said coupling structure being further configured to provide said overlap arrangement over a controlled coupling length providing coupling control.

12. An integrated circuit physical optical I/O interface as claimed in claim 7 comprising a signal recombination structure.

13. An integrated circuit physical optical I/O interface as claimed in claim 7, said coupling structure being configured to sequentially couple each of said TE and TM optical signal polarization into a single waveguide.

14. An integrated circuit physical optical I/O interface as claimed in claim 1, said first I/O waveguide comprising an intermediary waveguide and an external optical fiber, said intermediary waveguide having an effective refractive index matching the external optical fiber refractive index.

15. An integrated circuit physical optical I/O interface as claimed in claim 1, said integrated circuit including a layered structure, said layered structure comprising an optical fiber core alignment structure.

16. An integrated circuit physical optical I/O interface as claimed in claim 15, said external optical fiber comprising a circular cross-section cladding, and said alignment structure comprising a V-shaped optical fiber groove.

17. An optical signal coupler for coupling at least one mode of an optical signal between at least one first Input/Output (I/O) waveguide and at least one second waveguide forming part of an integrated circuit, each of said at least one first I/O waveguide adapted to convey an external optical signal along an external signal path, said first I/O waveguide having a first effective refractive index and a first core having a first bulk refractive index, each of said at least one second waveguide adapted to convey an internal optical signal along an internal signal path, said at least one second waveguide having a second effective refractive index and a second core having a second bulk refractive index, said second bulk refractive index being higher than said first bulk refractive index, said second core having at least a portion with a reduced thickness to exhibit a constant effective refractive index matching said first effective refractive index of said first I/O waveguide over said at least a portion, said coupler comprising:

at least one alignment structure for positioning said first core of at least one first I/O waveguide with respect to said second core of at least one corresponding second waveguide with an overlap therebetween and a separation distance there between over said at least a portion to permit tunnel coupling of said at least one mode of said optical signal between said external signal path and said internal signal path.

18. A coupler as claimed in claim 17, said coupler forming part of integrated circuit packaging of said integrated circuit, said coupler being configured as one of:

a complementary structure completing said integrated circuit packaging during assembly; and an integral structure completing said integrated circuit packaging during wafer level manufacture.

19. A coupler as claimed in claim 18, said complementary structure comprising a snap-on device.

20. A coupler as claimed in claim 19, comprising an external optical fiber corresponding to an I/O waveguide, said coupler being configured receive said at least one external optical fiber laterally from at least one side of said integrated circuit.

\* \* \* \* \*